US006628417B1

United States Patent
Naito et al.

(10) Patent No.: US 6,628,417 B1
(45) Date of Patent: Sep. 30, 2003

(54) DATA COMMUNICATION APPARATUS, IMAGE SERVER, CONTROL METHOD, STORAGE MEDIUM, AND IMAGE SYSTEM

(75) Inventors: Kikuo Naito, Kawasaki (JP); Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/431,269

(22) Filed: Nov. 1, 1999

(30) Foreign Application Priority Data

Oct. 30, 1998 (JP) .......................................... 10-311466
Oct. 5, 1999 (JP) .......................................... 11-284680

(51) Int. Cl.$^7$ .............................................. G06K 15/00
(52) U.S. Cl. ...................................... 358/1.15; 358/1.2
(58) Field of Search .............................. 358/1.1, 1.15, 358/1.2, 1.16, 1.18, 402, 403, 449, 450, 451, 453; 707/10, 101, 104.1, 515, 516, 530

(56) References Cited

U.S. PATENT DOCUMENTS 5,479,584 A * 12/1995 Curry ........................ 358/1.2
6,278,528 B1 * 8/2001 Ohtsuka et al. ............ 358/1.15

* cited by examiner

Primary Examiner—Arthur G. Evans
(74) Attorney, Agent, or Firm—Fitzpatrick, Cella, Harper & Scinto

(57) ABSTRACT

This invention provides a service which allows the user of the client apparatus that submits a print request to preview an image to be printed, and can reduce the information volume with the client apparatus to achieve quick response, and prints a high-quality image with the requested size. For this purpose, a center server (102) on the network stores and manages display image data, and transfers requested display image data upon receiving a request from a client computer. Upon receiving a request including a print size from the client computer, the center server sends the print size and information that specifies an image to an image server which saves high-resolution images. Upon receiving the information, the image server processes high-resolution image data to have the designated size, and sends back the processed image data to the center server. The center server sends the received image data to a print server to make it print the data.

13 Claims, 43 Drawing Sheets

FIG. 10

| ORDER ID | SUB ORDER ID | IMAGE ID | STATUS |
|---|---|---|---|
| USR1/PC1/0002 | — | — | IMAGE RETRIEVAL IN PROGRESS |
| USR1/PC1/0002 | 0001 | — | IMAGE RETRIEVAL IN PROGRESS |
| USR1/PC1/0002 | 0001 | GANON/PS5/199801010758 | IMAGE RETRIEVAL IN PROGRESS |
| USR1/PC1/0002 | 0001 | GANON/PS5/199801050027 | IMAGE RETRIEVAL COMPLETED |

| SERVER ID 1101 | IMAGE RETRIEVAL PRIORITY ORDER 1102 | CONNECTED PRINTER 1103 | PRINTABLE SIZE 1104 | CORRESPONDING PRINTER 1105 |
|---|---|---|---|---|
| PS001 | 100 | PRT1 | A4,A3 | HIGH-QUALITY PAPER, GLOSSY PAPER,FILM |
| PS002 | 200 | PRT2 | A5,A4,A3 | NORMAL PAPER |
| IS001 | 300 | | | |

| IMAGE ID | SIZE (NUMBER OF PIXELS) | OWNER | SAVING LOCATION | ADDITIOAL INFORMATION |
|---|---|---|---|---|
| GANON/PS01/1998ABC001 | — | USR123 | IS01 | — |
| GANON/PS03/1998ABC002 | — | — | E:\spool\image1.jpg | USR13345/CENTER/0001 |
| GANON/PS03/1998ABC002 | — | — | IS02 | — |
| GANON/PS03/1998ABC004 | — | — | PS07 | — |

| 1201 | 1202 | 1203 | 1204 | 1205 |

{1211} {1212} {1213} {1214}

{1220}

| IMAGE ID | SIZE (NUMBER OF PIXELS) | OWNER | SAVING LOCATION | ADDITIONAL INFORMATION |
|---|---|---|---|---|
| GANON/IS01/1998ABC002 | 3072*2048 | — | D:\image\1998ABC002.jpg | — |
| GANON/IS03/1998ABC002 | 801*534 | — | E:\sendimage\image1.jpg | PRINT IMAGE |
| GANON/IS03/1998ABC003 | 3072*2048 | — | D:\image\1998ABC003_1.jpg | — |
| GANON/IS03/1998ABC003 | 1536*1024 | — | D:\image\1998ABC003_2.jpg | — |
| GANON/IS03/1998ABC003 | 768*512 | — | D:\image\1998ABC003_3.jpg | — |

| 1201 | 1202 | 1203 | 1204 | 1205 |

```
⟨CAML⟩
⟨TRANS ID="0001000353000001"⟩
    ⟨SENDER ID="SENTER" TIME="12/20/1997 11:26:03 JST" /⟩
    ⟨RECEIVER ID="PS01" /⟩
⟨/TRANS⟩
⟨ORDER ID="USR13345/CENTER/0001" SHOP="PS01" OPE="NEW"
       CUST="1001080353000101" DATE="19971220"
                                       CHARGE="2300" ⟩
    ⟨SUBODR ID="0001" QTY=2 SIZE="Actual" ⟩
        ⟨ODRITEM ID="0001" TYPE="Script" ⟩
            ⟨SCRIPT⟩
hIwDh7rugGmm6o0BBACV9jVs4R1SYjXkc07zjrMYbWQfobabMPPqGtnUdRmt
NzIYFophRIUXVq6D0I4iy1sFR6M7yoVnc4e7pfU82jwMWEdmB7PTyUZf67H
QIFRcQdULowKFW5mSFV65xc7JHmo0xTy02JOryme9p48Q1mM12IQu+AHP0
            ⟨/SCRIPT⟩
        ⟨/ODRITEM⟩
        ⟨ODRITEM ID="0002" TYPE="Image"
                         IMAGEID="GANON/PS01/19980101ABC123"
                         IMAGESIZE=90 * 60⟩
            ⟨CAMLLINK HREF="./image123.jpg" /⟩
        ⟨/ODRITEM⟩
    ⟨/SUBODR⟩
⟨/ORDER⟩
⟨FTPREQ ID="GANON/IS01/010353000051" /⟩
⟨REG ID="GANON/IS77/01587000011" OPE="NEW" CUST="USR77653" ⟩
    ⟨CAMLLINK HREF="./imagess556r4.jpg" /⟩
⟨/REG⟩
⟨REG ID="GANON/PS01/046880076554" OPE="DEL" CUST="USR980054" ⟩
⟨/REG⟩
⟨/CAML⟩
```
— 1311 (TRANS block)
— 1312 (ORDER block), 1321 (SCRIPT), 1322 (ODRITEM Image)
— 1313 (/ORDER)
— 1314 (REG blocks)
— 1301

```
⟨CAML⟩
⟨TRANS ID="000100035375364"⟩
    ⟨SENDER ID="PS04" TIME="12/25/1997 10:55:26 JST" /⟩
    ⟨RECEIVER ID="CENTER" /⟩
⟨/TRANS⟩
⟨REG ID="GANON/PS04/01580770054" OPE="NEW" CUST="USR986999"⟩
    ⟨CAMLLINK HREF="./image7769986.jpg" /⟩
    ⟨CAMLLINK HREF="./image7769986.pls" /⟩
⟨/REG⟩
⟨REG ID="GANON/PS04/04688000001" OPE="DEL" CUST="USR986999"⟩
⟨/REG⟩
⟨FTP ID="GANON/PS04/010353000051"⟩
    ⟨CAMLLINK HREF="./image5644dd.jpg" /⟩
⟨/FTP⟩
⟨REPORT ID="USR887761/CENTER/0007" STATUS="FINISH" /⟩
⟨/CAML⟩
```
— 1315, 1316, 1317, 1318
— 1302

1401 DOCUMENT

1403

1404

SAMPLE

```
#[imagetable
    imagetab( "GANON/IS03/1998ABC002", "./train.jpg");
    imagetab( "GANON/PS02/19980402BC66", "./ship.jpg");

#[document 0 0 297 210
#[page 1
        ·
        ·
        ·
    image( 5, 5, ("GANON/IS03/1998ABC002", 1, ((1,0)));
    image( 50, 5, ("GANON/PS02/19980402BC66", 1, ((1,0)));
        ·
        ·
#[page
#[document
```

1402 SCRIPT(PAGE DESCRIPTION LANGUAGE)

FIG. 16

```
<REG ID="/GANON/IS01/010353000051"
     OPE="NEW"
     CUST="1001080353000101"
     SHOP="1001">
    <CAMLLINK HREF="./im012345.jpg" />
    <CAMLLINK HREF="./im012345.pls" />
</REG>
```

FIG. 23

```
<CAML>
<TRANS ID="0001000353000001">
    <SENDER ID="IS04" TIME="12/20/1997 11:26:03 JST" />
    <RECEIVER ID="CENTER" />
</TRANS>
<ORDER ID="USR13345/CENTER/0001" SHOP="PS01" OPE="NEW"
    CUST="1001080353000101" DATE="19971220" CHARGE="2300" >
</ORDER>
<FTP ID="/GANON/IS01/010353000051" />
    <CAMLLINK HREF="./image123.jpg" />
</FTP>
</CAML>
```

F I G. 31
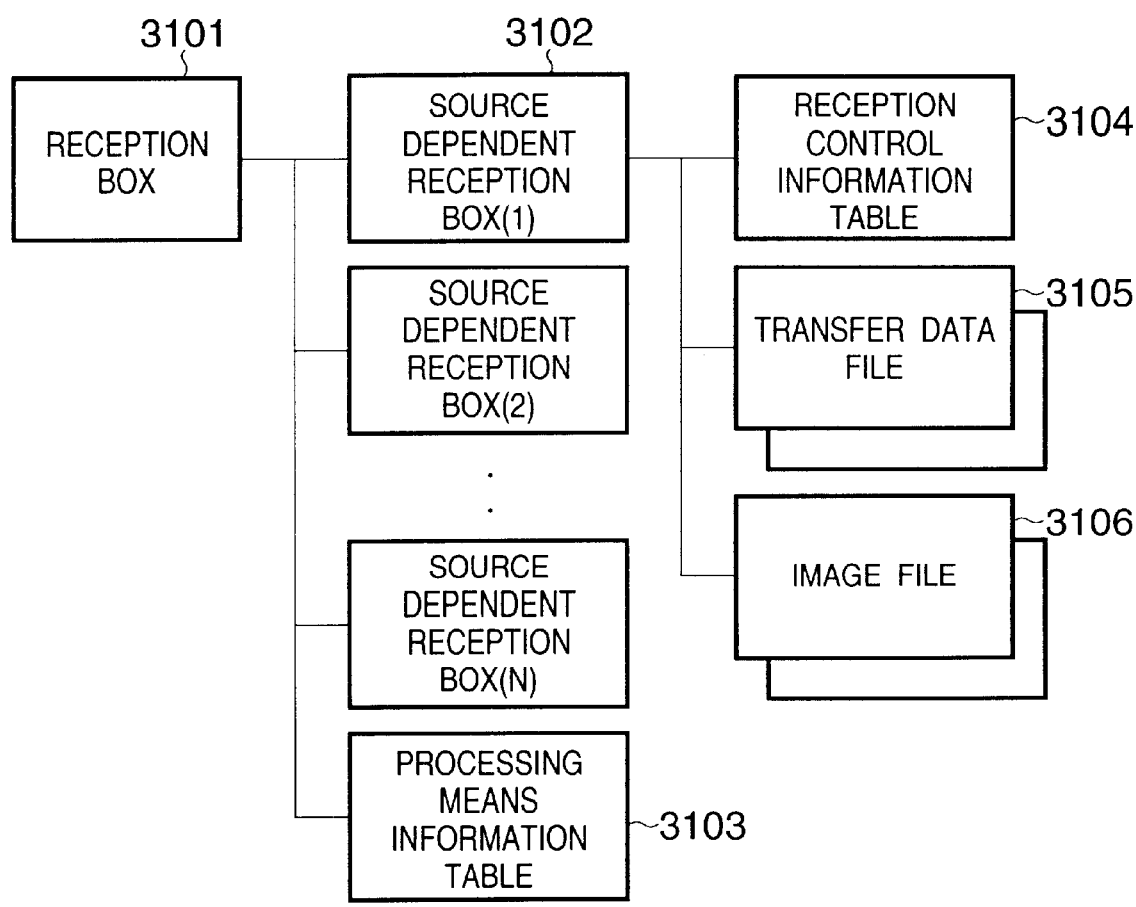

FIG. 32

| 3201 | 3202 | 3203 | 3204 | 3205 |
|---|---|---|---|---|
| TRANSFER FILE NAME | TRANSFER DATA FILE NAME | FILE SIZE | BOX STORAGE DATE | TRANSFER COMPLETION DATE |

FIG. 37

| IMAGE ID (3701) | USE PURPOSE (3702) | EMBEDDING TIMING (3703) | EMBED WATERMARK TYPE (3704) | EMBEDDED DATA (3705) | |
|---|---|---|---|---|---|
| GANON/IS03/1998ABC002 | ORIGINAL IMAGE | REGISTRATION | INVISIBLE | "COPYRIGHT 1998 abcd" | 3711 |
| GANON/IS03/1998ABC002 | DISPLAY/EDIT | TRANSMISSION | UNREMOVABLE VISIBLE | "SAMPLE" | 3712 |
| GANON/IS03/1998ABC002 | PRINT | TRANSMISSION | REMOVABLE VISIBLE | "#ORDER ID" | 3713 |
| GANON/IS03/1998ABC004 | ORIGINAL IMAGE | REGISTRATION | INVISIBLE | "COPYRIGHT 1998 abcd" | 3714 |
| GANON/IS03/1998ABC004 | DISPLAY/EDIT | REGISTRATION | INVISIBLE | "COPYRIGHT 1998 abcd" | 3715 |
| GANON/IS03/1998ABC004 | DISPLAY/EDIT | TRANSMISSION | UNREMOVABLE VISIBLE | "SAMPLE" | 3716 |
| GANON/IS03/1998ABC004 | PRINT | TRANSMISSION | REMOVABLE VISIBLE | "ALL RIGHTS RESERVED" | 3717 |

FIG. 38

| | 3801 | 3802 | 3803 | 3804 | |
|---|---|---|---|---|---|
| | PRINTER | OUTPUT TYPE | DPI | CORRECTION COEFFICIENT | |
| | PRT1 | GLOSSY PAPER | 1200 | 1.0 | ~3811 |
| | PRT1 | FILM | 1200 | 0.8 | ~3812 |
| | PRT2 | ⋮ | ⋮ | ⋮ | ~3813 |

FIG. 39

| IMAGE ID | PRINTER | SIZE (mm) | USE FEE (YEN) | |
|---|---|---|---|---|
| GANON/IS03/1998ABC002 | PRT1 | 420 * 297 | 2000 | ~3911 |
| GANON/IS03/1998ABC002 | PRT1 | 297 * 210 | 1500 | ~3912 |
| GANON/IS03/1998ABC002 | PRT1 | 210 * 149 | 1000 | ~3913 |
| GANON/IS03/1998ABC002 | PRT1 | 149 * 105 | 500 | ~3914 |
| GANON/IS03/1998ABC002 | PRT1 | — | 250 | ~3915 |
| GANON/IS03/1998ABC002 | PRT2 | 420 * 297 | 1800 | ~3916 |
| ⋮ | ⋮ | ⋮ | ⋮ | |
| GANON/IS03/1998ABC002 | PRT2 | — | 220 | ~3917 |
| GANON/IS03/1998ABC003 | — | — | 2500 | ~3918 |
| ⋮ | ⋮ | ⋮ | ⋮ | |

Columns: 3901 IMAGE ID, 3902 PRINTER, 3903 SIZE, 3904 USE FEE. Bracket: 3910.

| CORRECTION PRINTER | CORRECTION OUTPUT PAPER TYPE | CORRECTION COEFFICIENT | |
|---|---|---|---|
| PRT1 | GLOSSY PAPER | 1.1 | ~3921 |
| PRT1 | FILM | 1.5 | ~3922 |
| PRT2 | ⋮ | ⋮ | ~3923 |

Columns: 3905, 3906, 3907. Bracket: 3920.

GANON/IS03/1998ABC002      120 * 80 — 4001

GANON/IS02/19980402BC66    100 * 80 — 4002

DATA COMMUNICATION APPARATUS, IMAGE SERVER, CONTROL METHOD, STORAGE MEDIUM, AND IMAGE SYSTEM

BACKGROUND OF THE INVENTION

The present invention relates to a data processing system which performs data processes via a network and, more particularly, to a program on a processing apparatus such as a computer, which pertains to generation of an image contained in the data processed by the system, and a system including the program.

In recent years, as a result of remarkable improvements in computer performance, it is easy to view and edit images on a computer. Also, as the network technologies such as the Internet and the like have advanced and penetrated the society, image data are prevalently distributed via the network, and a pay distribution service of images and a service for printing image data on the network at a remote printer are available. In order to implement the print service, image data to be printed must be sent to a remote printer. In such case, it is a common practice to send an image saved in advance.

In this method, when a high-quality print result is required, image data to be printed must have higher resolution, and the data size increases accordingly. Even though the required print size is the postcard size, an information size that can assure image quality high enough even at A3 size may be sent, and the load on the network becomes consequently heavier.

SUMMARY OF THE INVENTION

The present invention has been made in consideration of the above problems, and has as its object to provide a data communication apparatus, image server, control method, storage medium, and image system, which allow the user at a client device who sends a print request to preview the image he or she wants to print, can reduce the information size between itself and the client device to implement quick response, and can provide a service for printing a high-quality image with a required size.

In order to achieve the above object, a data communication apparatus according to the present invention comprises the following arrangement.

That is, a data communication apparatus which serves as a server connected to a predetermined network, comprises:
  image saving means for saving first image data for display, and second image data having a higher resolution than the first image data;
  transmission means for sending the first image data to a client via the network in accordance with a request from the client on the network;
  reception means for receiving a print request including a print size from the client via the network;
  calculation means for calculating a size of print image data, which is to be generated from the second image data corresponding to the first image data, on the basis of the print size included in the print request, when the print request is received;
  processing means for processing the second image data to obtain print image data in accordance with the size calculated by the calculation means; and
  output means for outputting the print image data obtained by the processing means to predetermined print means.

According to a preferred embodiment of the present invention, this invention is characterized by having image saving means for saving images, data processing means capable of generating and editing an image to be stored in the saving means or a document using the image, order reception means for receiving a print order of a document edited by the data processing means, and submitting a print request to an output destination in accordance with the print order, print image size calculation means for calculating the optimal number of pixels of an image to be printed in accordance with characteristics of an output destination printer and an output size, print image transmission means for retrieving an image from the image saving means from the image size calculation means, and generating a print image, and print control means for receiving the print request submitted by the order reception means, and controlling to print.

According to another feature of the present invention, when an identical image is used a plurality of times in a print order, image data corresponding to a maximum-sized image is sent to the print control means.

According to still another feature of the present invention, the output size of the image contained in the print order is obtained when the data processing means analyzes the document.

According to still another feature of the present invention, the output size of the image contained in the print order is obtained when the order reception means analyzes the document.

According to still another feature of the present invention, a plurality of images having different numbers of pixels are saved in the image saving means, and upon generating a print image, an image which has a minimum number of pixels larger than that of the image to be generated is retrieved from the image saving means.

According to still another feature of the present invention, the print image generated by the print image transmission means is saved in the image saving means, and is used again.

According to still another feature of the present invention, when different kinds of information are appended to images in units of print orders, the print image generated by the print image transmission means is not saved in the image saving means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is an order status table;

FIG. 11 is a server management table;

FIG. 12 is an original image location management table;

FIG. 13 is an explanatory view of an example of a transfer data format used in the present invention;

FIG. 16 is an explanatory view of an example of image registration information transfer data;

FIG. 23 is an explanatory view of an example of the contents of an original image transmission data file;

FIG. 31 is a block diagram for explaining the data structure in a reception box;

FIG. 32 is an explanatory view of a transmission control information table in the transmission box and a reception control information table in the reception box;

FIG. 37 is an explanatory view of a watermark information management table;

FIG. 38 is a print image size calculation table;

FIG. 39 is an image use fee management table;

DETAILED DESCRIPTION OF THE PREFERRED EMBODIMENTS

Preferred embodiments of the present invention will be described in detail hereinafter with reference to the accompanying drawings.

<System Arrangement>

Figure 1:
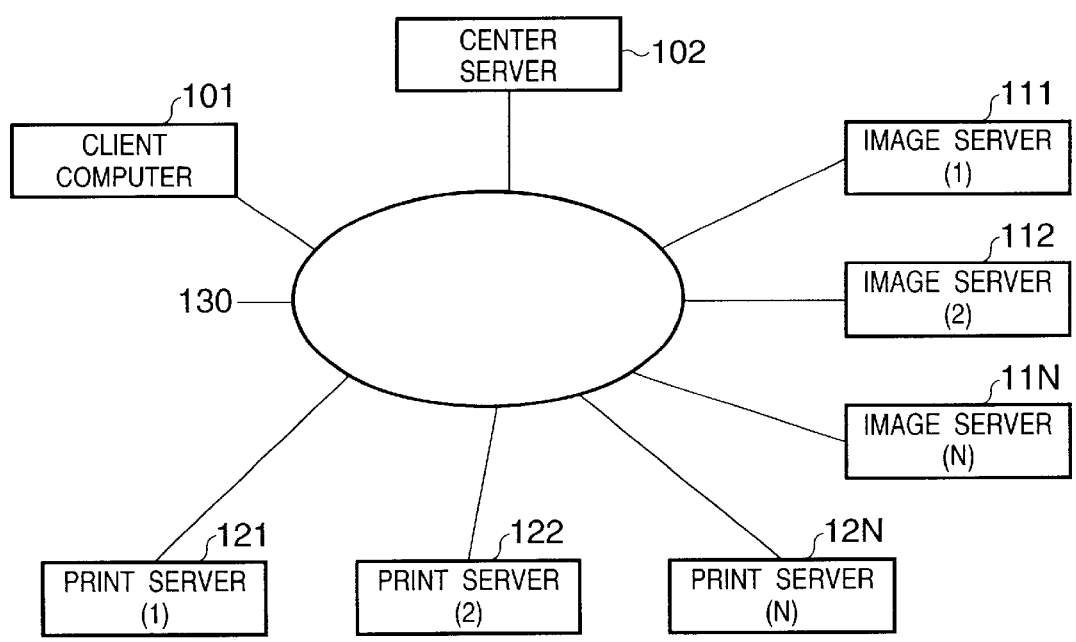
FIG. 1 is a block diagram showing the system arrangement according to the present invention.

FIG. 1 is a block diagram showing the arrangement of the overall system of this embodiment.

Referring to FIG. 1, reference numeral 130 denotes a network system to which various kinds of apparatuses to be described below are connected. Note that this network system 130 includes not only a local area network (LAN) but also the Internet, and will be simply referred to as a network hereinafter.

Reference numeral 101 denotes a client computer which uses a personal computer or workstation in this embodiment. As will be described in detail later, the client computer 101 serves as an information processing apparatus (a computer system constructed by a CPU, ROM, RAM, HDD, and the like; to be described later with reference to FIG. 2) set in, e.g., the user home. The client computer 101 has a function of viewing information such as images and the like stored in a center server 102 (to be described later) via the network, a function of retrieving information into the client computer 101, and a function of submitting an image print order in a print server 121 (to be described later) to the center server 102. Note that the image print order will be referred to as a print order or simply as an order hereinafter. FIG. 1 illustrates only one client computer 101 for the sake of simplicity, and a larger number of client computers may be connected.

Reference numeral 102 denotes an information processing apparatus which executes processes on the basis of requests mainly from the client computer 101, and will be referred to as a center server hereinafter.

The center server 102 has a function of holding an image to be transferred to the client computer 101 on the basis of a request from the client computer 101, and a function of receiving a print order from the client computer 101, retrieving an image on the basis of image storage location information, and issuing a print instruction to print servers 121, 122, . . . , 12N (to be described later).

Reference numerals 111, 112, . . . , 11N denote image processing apparatuses each of which has a function of transmitting a saved image to the center server 102 in response to a request from the center server 102, and will be referred to as an image server hereinafter.

Reference numerals 121, 122, . . . , 12N denote information processing apparatuses each of which has a function of printing an image on the basis of a print instruction from the center server 102, and a function of saving an image to use it in printing, and transmitting the saved image to the center server 102 in response to a request from the center server, and will be referred to as a print server hereinafter. Note that the print servers 121, 122, . . . , 12N need not have any function of saving an image.

Note that a single computer can physically serve as some of the client computer 101, center server 102, image servers 111, 112, . . . , 11N, print servers 121, 122, . . . , 12N, and the like.

<Arrangement of Client Computer, Center Server, and Image Server>

Figure 2:
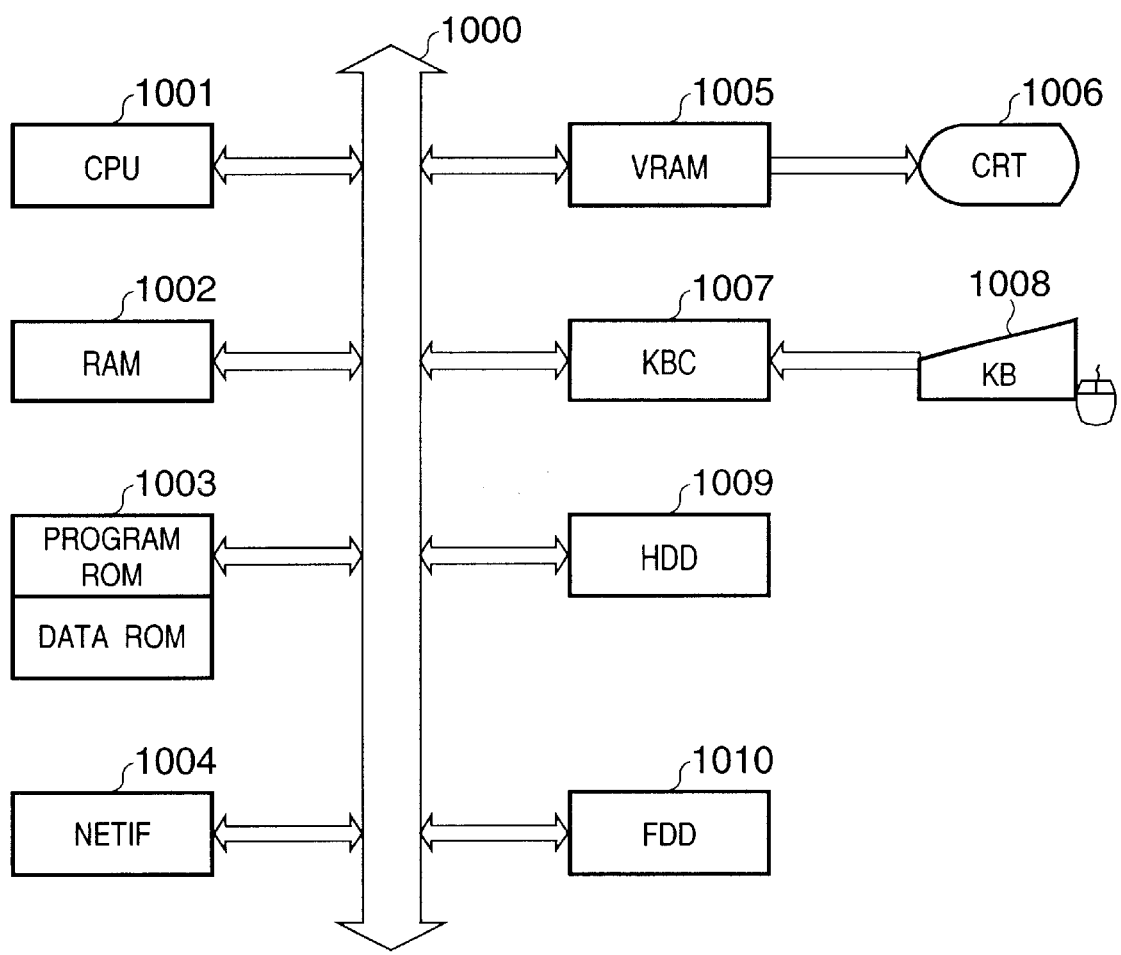
FIG. 2 is a block diagram showing the system arrangement of a center server, image server, and client computer.

FIG. 2 is a block diagram showing the system arrangement of each information processing apparatus exemplified as an embodiment of the present invention. In this embodiment, since the center server 102, image servers 111, 112, . . . , 11N, and client computer 101 can be constructed by versatile information processing apparatuses such as personal computers or the like, and have substantially the same internal hardware arrangement, they will be simultaneously described below with reference to FIG. 2.

Referring to FIG. 2, reference numeral 1001 denotes a central processing unit (to be abbreviated as a CPU hereinafter) for controlling the information processing apparatus.

Reference numeral 1002 denotes a random-access memory (to be abbreviated as a RAM hereinafter), which is used as a main memory of the CPU 1001, and serves as a program execution area and data area for implementing an OS and various functions.

Reference numeral 1003 denotes a read-only memory (to be abbreviated as a ROM hereinafter) that stores a BIOS and boot program. Upon power ON, the apparatus is started up in accordance with the program stored in the ROM 1003, and then serves as a client computer, center server, or the like via the procedures: loading and execution of an initial loader of an HDD 1009 (to be described later) onto the RAM 1002, loading and execution of an OS onto the RAM 1002 by the loader, and loading and execution of various processing programs onto the RAM 1002.

Reference numeral 1004 denotes a network interface (NETIF) which controls data transfer between information processing apparatuses via the network, and diagnoses connection status.

Reference numeral 1005 denotes a video RAM (VRAM) which rasterizes an image to be displayed on a screen of a display device 1006 (to be described below) which displays the running state of the information processing apparatus, and controls display of the image.

Reference numeral 1006 denotes a display device, which will be referred to as a CRT hereinafter.

Reference numeral 1007 denotes a controller for controlling an input signal from an external input device 1008 (to be described below).

Reference numeral 1008 denotes an external input device which accepts operations by the user of the information processing apparatus with respect to the information processing apparatus, and comprises, e.g., a keyboard or a pointing device such as a mouse or the like (to be simply referred to as a KB hereinafter).

Reference numeral 1009 denotes a hard disk drive (HDD), which stores the OS and application programs, and is also used to save data such as image information and the like. The application programs in this embodiment include software programs that implement various kinds of processing means that construct this embodiment, and the like. For example, in case of the client computer 101, as has been described above, the programs include a function program for browsing information such as images and the like stored in the center server 102 (to be described later) via the network, a function program for retrieving the information into the client computer 101, and a function program for submitting an image print order in the print server 121 (to be described later) to the center server 102. When the information processing apparatus serves as the center server 102, image server 111, or print server 121, programs for implementing the individual functions are stored in addition to the OS.

Reference numeral 1010 denotes an external input/output device which inputs/outputs information from a removable disk such as a floppy disk, CD-ROM, or the like, and is used to read out the application programs from a medium (to be simply referred to as an FDD hereinafter).

Note that the application programs and data to be stored in the HDD 1009 may be stored and used in the FDD 1010.

Reference numeral 1000 denotes an input/output bus (address bus, data bus, and control bus) for connecting the individual units.

<Block Diagram of Print Server>

Figure 3:
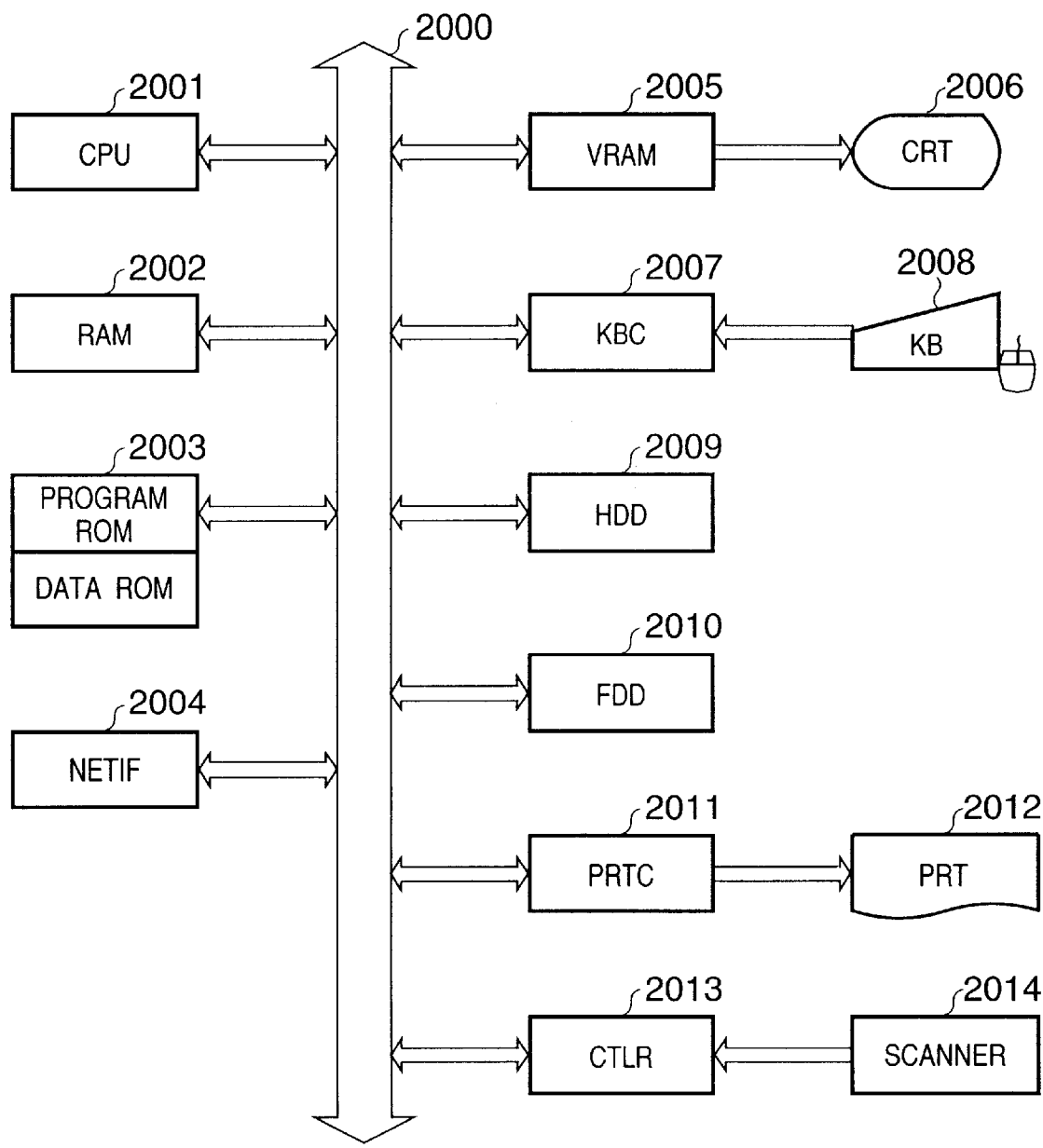
FIG. 3 is a block diagram showing the system arrangement of a print server.

FIG. 3 is a block diagram showing the system arrangement of the print server according to the present invention.

Referring to FIG. 3, reference numeral 2000 denotes an input/output bus (address bus, data bus, and control bus) for connecting the individual units. Reference numeral 2001 denotes a CPU for controlling the information processing apparatus serving as the print server. Reference numeral 2002 denotes a RAM which is used as a main memory of the CPU 2001, and serves as areas for an OS and execution program, and an execution area and data area of the program during operation.

Reference numeral 2003 denotes a ROM which stores a BIOS and boot program. Reference numeral 2004 denotes a network interface (NETIF) which controls data transfer with other information processing apparatuses such as the center server 101 and the like via the network, and diagnoses connection status. Reference numeral 2005 denotes a VRAM which rasterizes an image to be displayed on a screen of a CRT 2006 (to be described below) which displays the running state of the information processing apparatus, and controls display of the image. Reference numeral 2006 denotes a display device which will be referred to as a CRT hereinafter). Reference numeral 2007 denotes a controller for controlling an input signal from an external input device 2008 (to be described below).

Reference numeral 2008 denotes an external input device which accepts operations by the user of the information processing apparatus with respect to the information processing apparatus, and comprises, e.g., a keyboard or a pointing device such as a mouse or the like (to be simply referred to as a KB hereinafter).

Reference numeral 2009 denotes a hard disk drive (HDD) which stores the OS and an application program serving as a print server, and also stores a corresponding program when the HDD stores data such as image information and the like.

Reference numeral 2010 denotes an external input/output device which inputs/outputs information from a removable disk such as a floppy disk, CD-ROM, or the like, and is used to read out the application program from a medium (to be simply referred to as an FDD hereinafter).

Note that the application program and data to be stored in the HDD 2009 may be stored and used in the FDD 2010.

As described above, the arrangement shown in FIG. 3 is substantially the same as that shown in FIG. 2, except for the following units to serve as the print server.

Reference numeral 2011 denotes a printer controller for controlling an external output device 2012 (to be described below and controlling an image to be output (to be referred to as a PRTC hereinafter). Reference numeral 2012 denotes an external output device which is, e.g., a printer, and will be referred to as a PRT hereinafter). Reference numeral 2013 denotes an expanded external input/output device controller which controls an expanded external input/output device 2014 (to be described below), and will be referred to as a CTLR hereinafter. Reference numeral 2014 denotes an expanded external input/output device which has an external input function of image data by, e.g., scanning printed matter like a scanner (to be simply referred to as a scanner hereinafter).

<Center Server>

Figure 4:
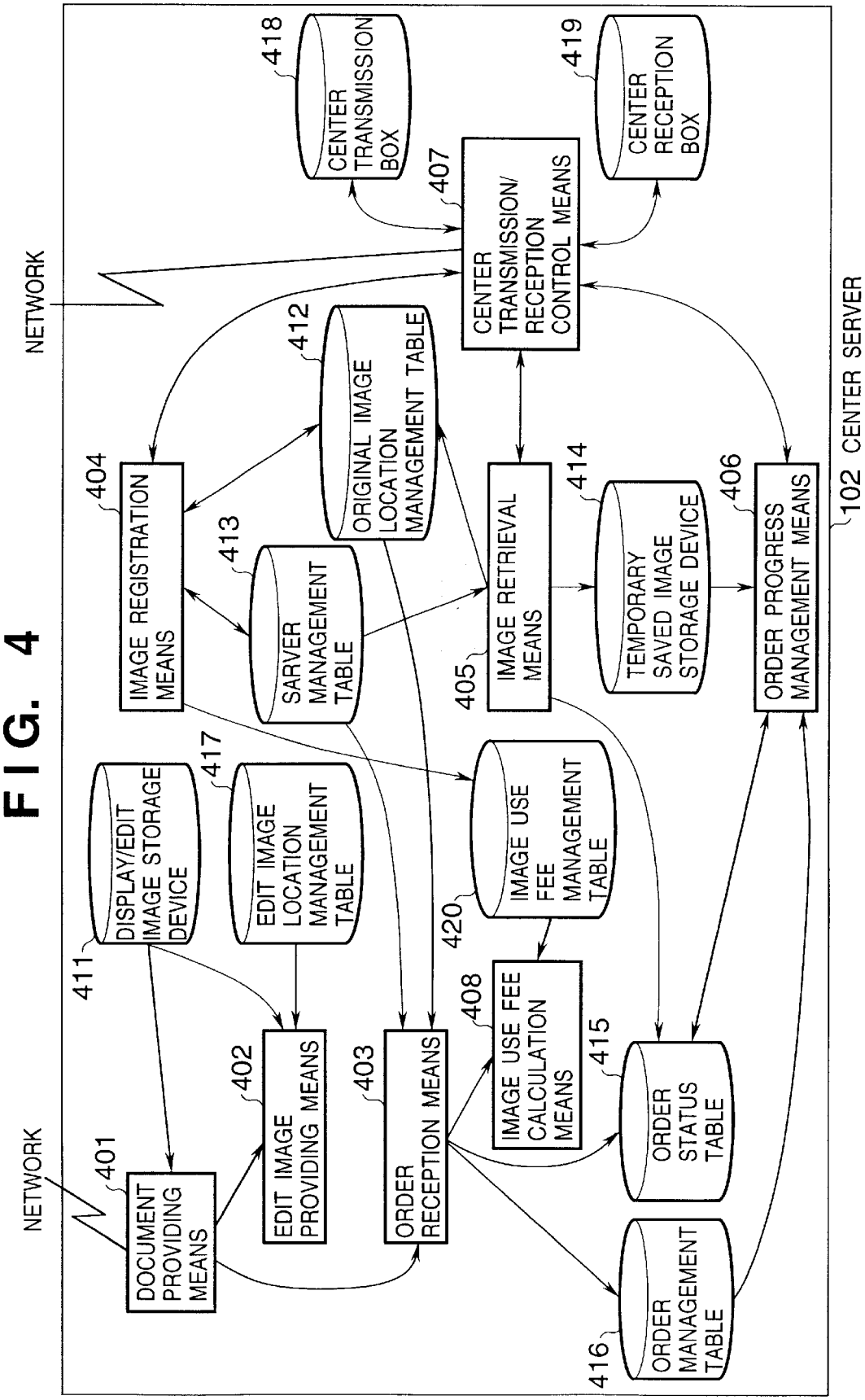
FIG. 4 is a diagram showing the module arrangement of a center server according to the present invention.

FIG. 4 is a diagram showing the individual processing means and management data in the center server 102.

Referring to FIG. 4, processing means 401, 402, 403, 404, 405, 406, 407, and 408 are application programs, which are loaded from the HDD 1009 or FDD 1010 and mapped and activated on the RAM 1002. Reference numerals 411, 412, 413, 414, 415, 416, 417, 418, 419, and 420 denote data stored in the HDD 1009.

A document providing means 401 is an application program which allows to search the HDD 1009 for a document (text, image, or a combination of text and image) required by the client computer 101 via the network such as the Internet or the like, and to send the found document to the client computer. Note that the client can view the image on its own CRT and can edit the image to some extent. However, the resolution of the display device is normally lower than that of a printer. Hence, the HDD 1009 of the center server 102 stores display image data in place of images which can be printed. As will be described in detail later, upon receiving a print instruction from the client, a transfer request of the designated image is issued to the image server or print server, which stores print image data (high-resolution image data) corresponding to the designated image, and the received print image data is transferred to the print server designated by the client, thus printing the image. That is, the center server stores and manages locations of all print image data stored in the image and print servers, and display image data (having resolution lower than print image data=image data with a small information size) corresponding to these print image data.

The document providing means 401 is an application program which is generally called an internet server program or WWW server program, and allows to map and activate an application program stored in the HDD 1009 or the like on the RAM 1002 in response to a request from the client computer, and to authenticate the user by the user ID in response to an external request so as to limit data to be sent as needed, in addition to transmission of a document.

An edit image providing means 402 is an application program which allows to search a display/edit image storage device 411 for a display/edit image required by the client computer 101 on the basis of a request from the client computer 101, and to transmit the found image to the client computer 101 via the document providing means 401.

An order reception means 403 is an application program which receives a print order submitted by the client computer 101, interprets the print order to store the order in an order management table 416 (to be described later), transmits the order reception result to the client 101 via the document providing means 401, and loads an image retrieval means 405 (to be described later) from the HDD 1009 or the like and maps and activates it on the RAM 1002 to retrieve an image used in the print order.

These edit image providing means 402 and order reception means 403 are application programs which are loaded from the HDD 1009 or the like and mapped and activated on the RAM 1002 by the document providing means 401, on the basis of a request from the client computer 101, and are generally called CGI programs.

An image registration means 404 is an application program which is loaded from the HDD 1009 or the like and mapped and activated on the RAM 1002 by a center transmission/reception control means 407 (to be described later), and has a function of receiving print image location change data (new registration, deletion, copy, movement) and an edit image transmitted from the image server 111 or print server 121, updating and managing a location management table 412 (to be described later), storing the edit image in the display/edit image storage device 411 (to be described later), and registering, updating, and managing data use fee management data of a pay image in an image use fee management table 420. Furthermore, when the location change data indicates movement of a print image, the image registration means 404 has a function of transmitting a print image transmitted from the image server 111 or print server 121 as a source to the image server 111 or print server 121 as a destination via the center transmission/reception control means 407 (to be described later).

The image retrieval means 405 is an application program, which is launched in response to an instruction from the order reception means 403 or center transmission/reception control means 407 (to be described later), and is loaded from the HDD 1009 or the like and mapped and activated on the RAM 1002. The image retrieval means 405 has a function of determining the storage location of a print original image required for printing in the order management table 416 (to be described later), a function of sending a print image retrieval request to the image server 111 or print server 121 as the storage location designated by that function via the center transmission/reception control means 407, a function of saving and managing in a temporary saved image storage device 414 a print image sent back from the image server 111 or print server 121 and digital watermark removing information if the image server 111 or print server 121 embedded a removable digital watermark in the print image, and a function of managing the retrieval state, and loading an order progress management means 406 (to be described below) from the HDD 1009 or the like and mapping and activating it on the RAM 1002 when all print images required for a print order have been retrieved.

The order progress management means 406 is an application program which is loaded from the HDD 1009 or the like and mapped and activated on the RAM 1002 by the image retrieval means 405 or center transmission/reception control means 407, and has a function of preparing print instruction data for the print server 121 on the basis of print order data in the order management table 416 and print image data in the temporary saved image storage device 414 (to be described later), and sending the print instruction data to the print server 121 via the center transmission/reception control means 407, and a function of updating the contents of the order management table on the basis of print completion report data received from the print server 121 via the center transmission/reception control means 407.

The center transmission/reception control means 407 has a function of managing data which are created by an application program such as the image retrieval means 405 or the like in the center server and are saved in a center transmission box 418 (to be described later), and extracting and sending transmission data for the image server 111 or print server 121 on the basis of a data transmission/reception start request received from the image server 111 or print server 121 via the NETIF 1004, and a function of storing reception data received from the image server 111 or print server 121 in a center reception box 419 (to be described later), analyzing the reception data, and loading an application program that processes the analyzed data from the HDD 1009 and mapping and activating it on the RAM 1002.

Since data are exchanged with the image server 111 or print server 121 on the basis of a transmission/reception start request from the image server 111 or print server 121, an optimal transmission/reception cycle can be assured in correspondence with the connection pattern (a full-time connection via a leased line, a temporary connection by a dial-up protocol, or the like) of the network.

The image use fee calculation means 408 calculates the use fee of pay image data registered in the image server 111 (to be described later). That is, the image use fee calculation means 408 is an application program which is launched in response to an instruction from the order reception means 403, calculates the use fee of pay images contained in the print order received by the order reception means on the basis of various kinds of information input by the order reception means and data stored in the image use fee management table 420 (to be described later), and informing the order reception means of the calculated use fee.

The display/edit image storage device 411 stores low-resolution images of all images that the user can access. That is, the display/edit image storage device 411 stores display images with lowest resolution, which are displayed on a network browsing means 502 in response to an image retrieval request from the user received via the network browsing means 502 and document providing means 401, or data which can provide edit images that a data processing means 501 uses. Image files are stored in different directories in units of user IDs in correspondence with transmission data limitations by the user IDs of the document providing means 401, and a table for searching for a corresponding image file based on an image ID (to be described later with reference to FIG. 9) is stored.

The original image location management table 412 manages the storage locations of print images, as will be described later with reference to FIG. 12.

A server management table 413 manages information of the image server 111 and print server 121, as will be described later with reference to FIG. 11.

The temporary saved image storage device 414 is a spool that saves a print image required for printing until printing is completed.

An order status table 415 stores an order status table for managing the progress of a print order, as will be described later with reference to FIG. 10.

The order management table 416 saves print order data (to be described later with reference to FIG. 8).

An edit image location management table 417 manages the path names of image files stored in the display/edit image storage device 411 in correspondence with image IDs using the same layout as that of the original image location management table (to be described later with reference to FIG. 12).

The center transmission box 418 and center reception box 419 are respectively devices for storing transmission data and reception data to/from the image server 111 or print server 121 in the HDD 1009.

The image use fee management table 420 has a data structure shown in FIG. 39 (to be described later). In this table, data required for calculating the use fee of pay image data are registered by the image registration means 404, and this table is looked up by the image use fee calculation means 408 upon calculating the use fee of image data.

<Client Computer>

Figure 5:
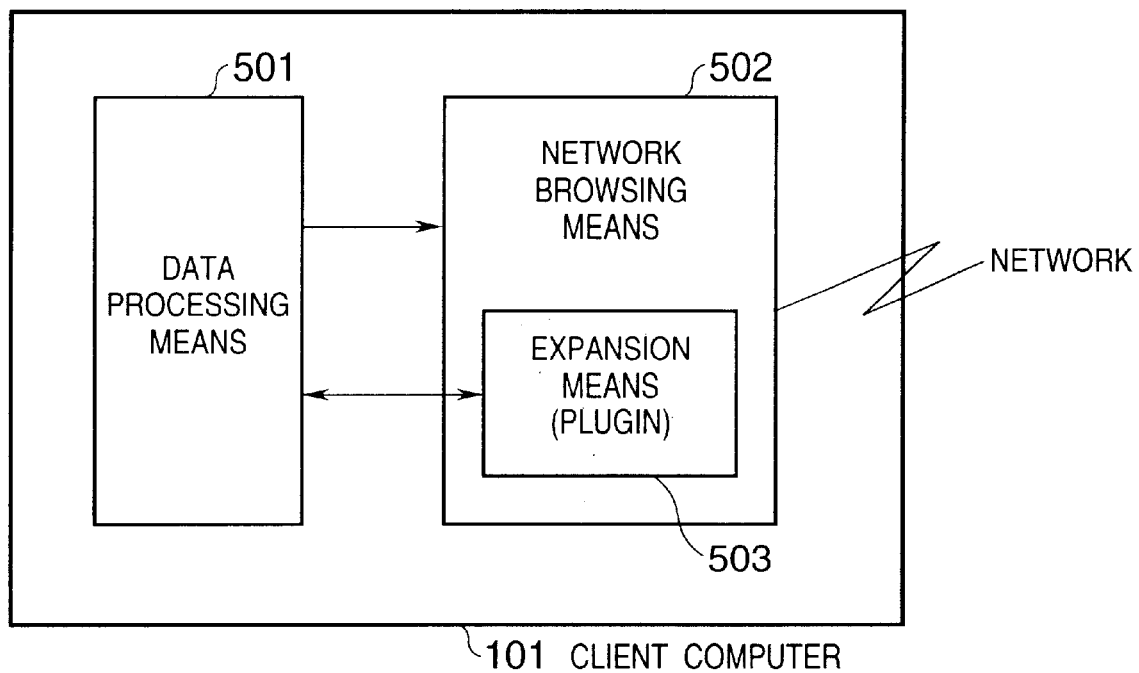
FIG. 5 is a diagram showing the module arrangement of a client according to the present invention.

FIG. 5 is an explanatory view showing the arrangement of the client computer 101 as an information processing apparatus that the user uses actually. The client computer 101 has the data processing means 501, the network browsing means 502, and an expansion means 503 of the means 502 as application programs which are loaded from the ROM 1003, HDD 1009, or FDD 1010 and are mapped and activated on the RAM 1002.

The data processing means 501 has a function of retrieving an edit image (which is also a display image) from the center server 102 via the expansion means 503 running in the network browsing means 502, generating a print order containing the edited page description language, calculating the size of an image contained in the print order, and submitting the print order to the center server via the expansion means 503, in addition to a function of creating and editing a document which includes data such as a character string, figures, images, and the like, and converting the document data into a page description language.

The network browsing means 502 is an application program which allows to receive external services from, e.g., the Internet via the network (i.e., a popular application program such as a so-called internet browser).

The network browsing means 502 can expand its functions by installing expansion means (plugin modules), and the expansion means (plugin) 503 is an application program appended to the network browsing means 503 in this way. Since the primary function of the network browsing means is to view documents such as images and the like on the network, and transfer chosen documents to a client computer, the network browsing means uses the expansion means 503 to link with an external application program such as the data processing means 501.

The expansion means 503 is an application program stored in the HDD 1009, which is ready to use when it runs on the RAM 1002 simultaneously with the network browsing means 502. The expansion means 503 has a function of retrieving data to be processed by the data processing means 501 from the network in cooperation with the network browsing means, a function of displaying the retrieved data via the CRT 1006, a function of transferring the retrieved data to the data processing means 501, and a function of submitting print order data generated by the data processing means onto the network.

Note that the print order submission function of the data processing means 501 may be implemented by the order reception means of the center server 102, and the data display function and print order data submission function of the expansion means may be implemented using the network browsing means 502. In this manner, the present invention can be practiced without the data processing means 501 and expansion means 503.

<Image Server>

Figure 6:
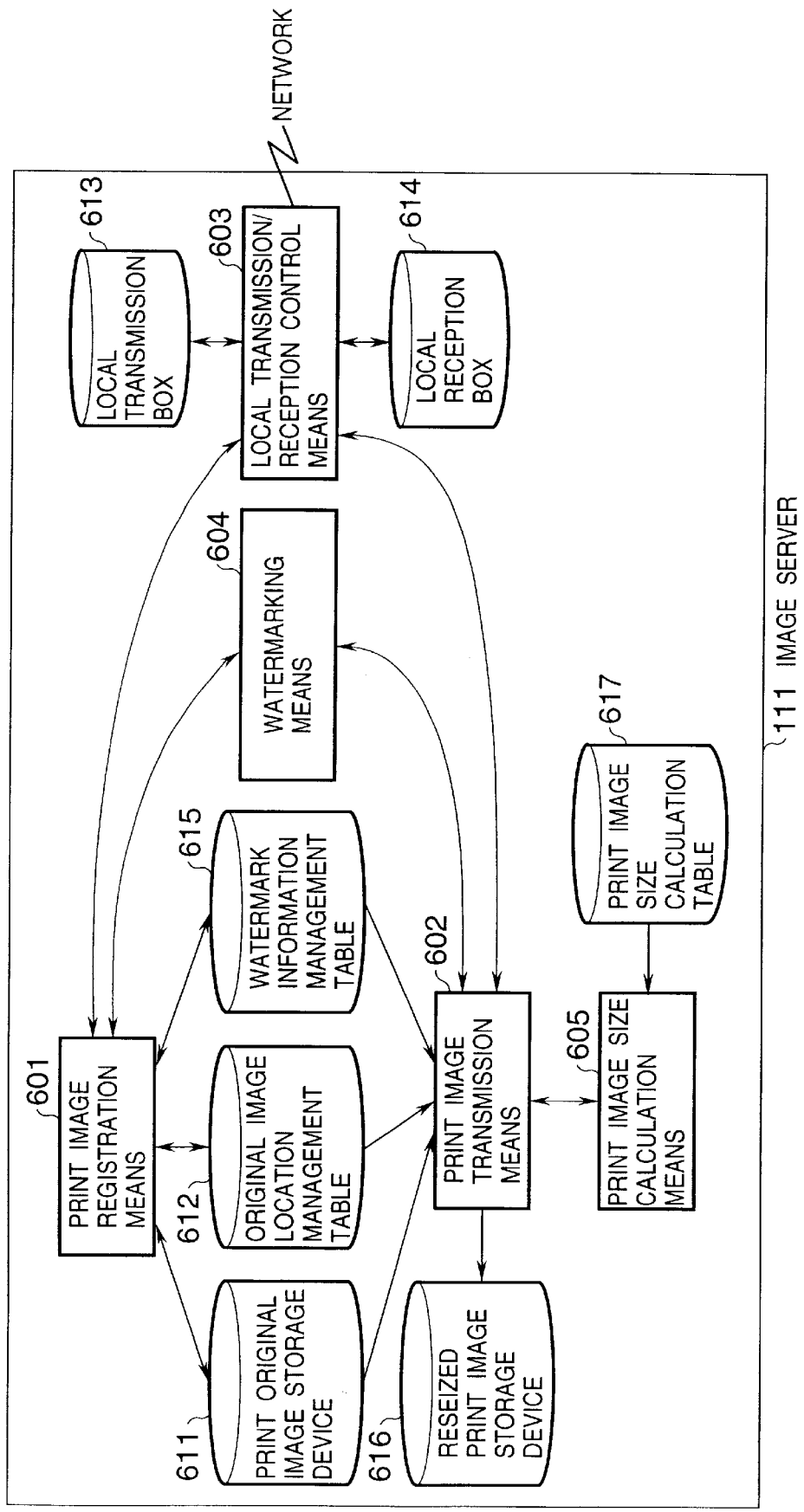
FIG. 6 is a diagram showing the module arrangement of an image server according to the present invention.

FIG. 6 is a diagram showing the arrangement of processing means and management data in each of the image servers 111, 112, . . . , 11N. Referring to FIG. 6, processing means 601, 602, 603, 604, and 605 are application programs, which are read out from the ROM 1003, HDD 1009, or FDD 1010, and are mapped and activated on the RAM 1002.

A print image registration means 601 is an application which performs new registration, movement, copy, and deletion of a watermark information management table 615 for managing various kinds of information that pertains to images and digital watermarks (to be described later) to be embedded in the images. That is, the print image registration means 601 has a function of reading out a print original image recorded in an external storage medium such as a CD-ROM via the FDD 1010, and saving the readout image in a print original image storage device 611 (to be described later) in accordance with operations done by a supervisor using the KB 1008, and a function of deleting images in the print original image storage device 611. The means 601 also has a function of updating an original image location management table 612 (to be described later), a function of generating a display/edit image, and a function of sending original image location information, display/edit image, and the like to the center server 102 via a local transmission/reception control means 603 (to be described later) (upon receiving such information, the center server manages display image data and image servers in correspondence with each other). Note that the means 601 searches the watermark information management table 615 upon storing a print original image and upon generating an edit/display image, and when embedding of a digital watermark in an image is designated, the means 601 launches a watermarking means 604 (to be described later), and requests it to embed a digital watermark.

A print image transmission means 602 is an application program having a function of analyzing a print image transmission request (characteristics (recording resolution and the like) of an output destination printer, and recording paper size) received by the local transmission/reception control means 603, calculating the required image size of a print image using a print image size calculation means 605 (to be described later), generating a print image on the basis of a print image which is found by search based on the original image management table 612 and stored in a resized print image storage device 616 (to be described later), and a print original image stored in the print original image storage device 611, storing the print image in the resized print image storage device 616 as needed, and transmitting the print image to the request source (center server in this embodiment) via the local transmission/reception control means 603. This means also searches the watermark information management table 615 upon generation of a print image prior to transmission of the print image. When embedding of a digital watermark in the print image to be sent is designated, the means 602 launches the watermarking means 604 and requests it to embed a digital watermark, as in the print image registration means 601.

The local transmission/reception control means 603 has a function of managing data which are created by an application program such as the print image registration means 601 in the image server and are saved in a local transmission box 613 (to be described later), sending a transmission/reception start request to the center server 102 via the NETIF 1004, and extracting and sending transmission data from the local transmission box 613, and a function of storing reception data received from the center server 102 in a local reception box 614 (to be described later), analyzing the reception data, and loading an application program that processes the analyzed data from the HDD 1009 or the like and mapping and activating it on the RAM 1002.

The watermarking means 604 is an application program which is launched by the print image registration means 601 and print image transmission means 602. This means has a function of embedding a digital watermark in an image in accordance with a request from the print image registration means 601 or print image transmission means 602, and sending back the image to the request source, and a function of sending watermark removing information to the request source when the embedded digital watermark is a removable one. The means 604 also has a function of removing a visible watermark from an image embedded with the removable visible water mark. However, since the image server need not remove any visible watermark, such function may be separated, and need not be installed.

The print original image storage device 611 stores high-resolution original image files used as a print image, and is held in the HDD 1009 or on a removable disk which can be accessed by the FDD 1010.

The print image size calculation means 605 is an application program launched by the print image transmission means 602. The means 605 calculates an optimal size of a print image requested by a print image transmission request using data stored in a print image size calculation table 617 (to be described later), and informs the print image transmission means 602 of the calculated image size.

The original image location management table 612 manages the path names of print original images and print images (to be described later with reference to FIG. 12), and is stored as a database or a searchable file in the HDD 1009.

The local transmission box 613 and local reception box 614 are devices for respectively storing transmission data and reception data to and from the center server 102 in the HDD 1009.

The watermark information management table 615 stores various kinds of information that pertains to digital watermarks (to be described later with reference to FIG. 37), and is stored as a database or a searchable file in the HDD 1009.

The resized print image storage device 616 stores a print image for the purpose of re-using a print image, which is generated by the print image transmission means 602 in response to a given image transmission request, in a print image transmission request other than the given print image transmission request, and is held in the HDD 1009 or on a removable disk that can be accessed by the FDD 1010.

The print image size calculation table 617 stores data with which the print size calculation means 605 calculates a print image size optimal to a print order for an image which is requested to be sent, and is stored as a database or searchable file in the HDD 1009.

<Print Server>

Figure 7:
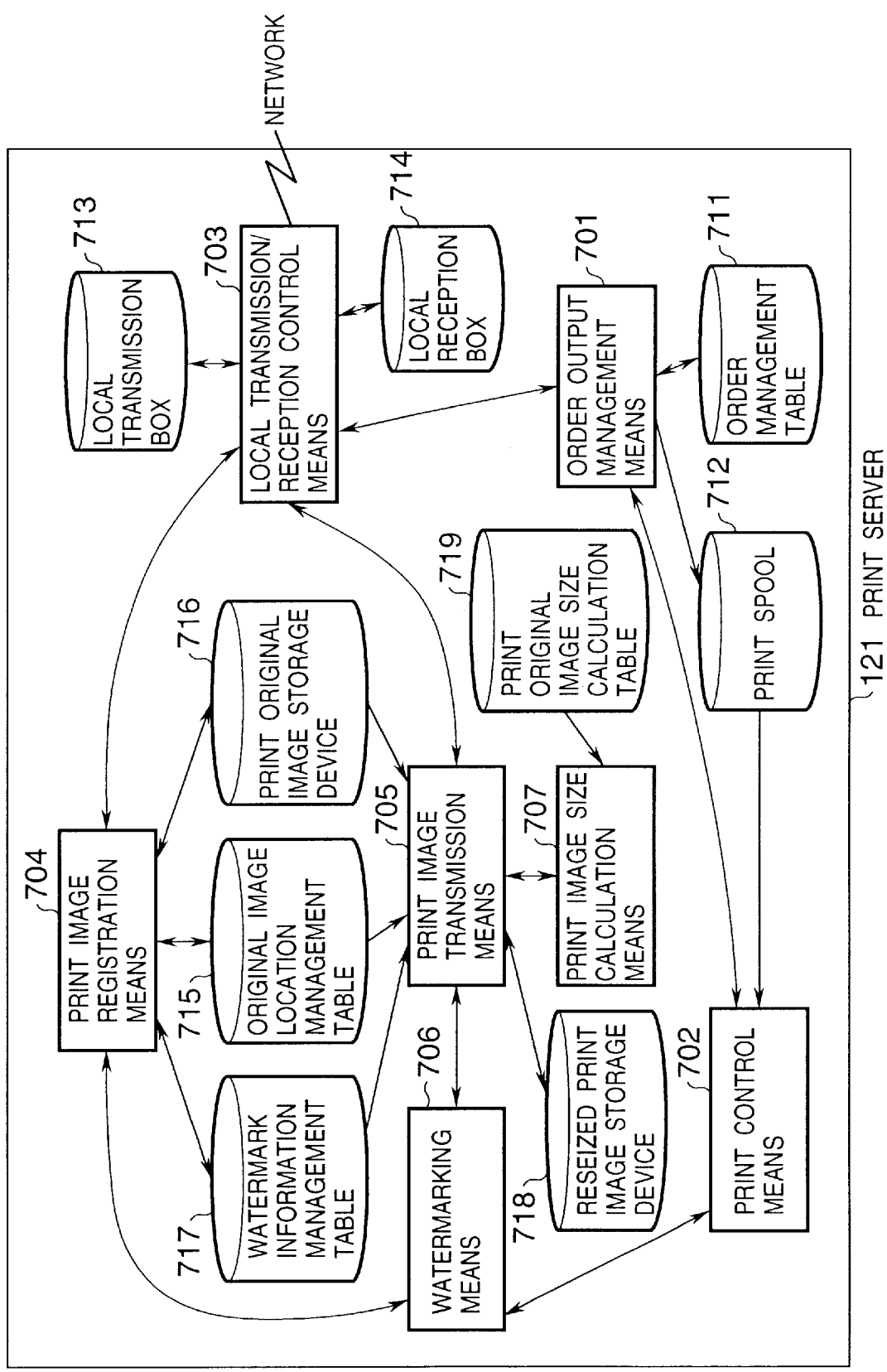
FIG. 7 is a diagram showing the module arrangement of a print server according to the present invention.

FIG. 7 is a diagram showing the arrangement of processing means and management data in each of the print servers 121, 122, . . . , 12N. Referring to FIG. 7, processing means 701, 702, 703, 704, 705, 706, and 707 are application programs, which are read out from the ROM 2003, HDD 2009, or FDD 2010, and are mapped and activated on the RAM 2002.

An order output management means 701 is an application program having a function of managing the progress of a print order submitted from the center server 102. More specifically, the means 701 has a function of receiving a print order from the center server 102 via a local transmission/reception control means 703 (to be described later), and analyzing and storing the print order in an order management table 711, a function of sending print data to a print control means 702 (to be described later) via a print spool 712 (to be described later) on the basis of print operation done by the operator using the KB 1008, and a function of preparing print completion message data upon receiving a print completion message from the print control means 702, and sending the print completion message data to the center server 102 via the local transmission/reception control means 703.

The print control means 702 is an application program having a function of preparing a final print image, and sending it to the PRTC 2011, thus printing an image. More specifically, the means 702 has a function of a final print image using a print original image stored in the print spool 712 on the basis of edit information stored in the print spool 712, a function of launching a watermarking means 706 and requesting it to remove a visible watermark so as to remove the visible watermark using visible watermark removing information stored in the print spool 712 together with an image, when the removable visible watermark is embedded in the print original image, and a function of sending a completion message to the order output management means 701 upon completion of a print process.

The local transmission/reception control means 703 is equivalent to the local transmission/reception control means 603 in the image server 111. That is, the means 703 has a function of managing data which are created by an application program such as the order output management means 701 or the like in the print server and are saved in a local transmission box 713 (to be described later), sending a transmission/reception start request to the center server 102 via the NETIF 2004, and extracting and sending transmission data from the local transmission box 713, and a function of storing reception data received from the center server 102 in a local reception box 714 (to be described later), analyzing the reception data, and loading an application program that processes the analyzed data from the HDD 2009 or the like and mapping and activating it on the RAM 2002.

A print image registration means 704 is an application which is equivalent to the print image registration means 601 in the image server 111, and is not mandatory for the print server, but performs new registration, movement, copy, and deletion of a watermark information management table 717 for managing various kinds of information that pertains to images and digital watermarks to be embedded in the images. That is, the print image registration means 704 has a function of reading out a print original image recorded in an external storage medium such as a CD-ROM via the FDD 2010, and saving the readout image in a print original image storage device 716 in accordance with operations done by a supervisor using the KB 2008, and a function of deleting images in the print original image storage device 716. The means 704 also has a function of updating an original image location management table 715 (to be described later), a function of generating a display/edit image, and a function of sending original image location information, display/edit image, and the like to the center server 102 via the local transmission/reception control means 703.

Note that the print image registration means 704 searches the watermark information management table 717 upon storing a print original image and upon generating an edit/display image. When embedding of a digital watermark in an image is designated, the means 704 launches the watermarking means 706 (to be described later), and requests it to embed a digital watermark.

A print image transmission means 705 is an application program which is equivalent to the print image transmission means 602 in the image server 111, and has a function of analyzing a print image transmission request received by the local transmission/reception control means 703, calculating the required image size of a print image using a print image size calculation means 707 (to be described later), generating a print image on the basis of a print image which is found by search based on an original image management table 715 and stored in a resized print image storage device 718 (to be described later), and a print original image stored in the print original image storage device 716, storing the print image in the resized print image storage device 718 as needed, and transmitting the print image to the request source via the local transmission/reception control means 703. This means also searches the watermark information management table 717 prior to transmission of a print image. When embedding of a digital watermark in the print image to be sent is designated, the means 705 launches the watermarking means 706 and requests it to embed a digital watermark, as in the print image registration means 704.

The watermarking means 706 is an application program which is nearly equivalent to the watermarking means 604 in the image server 111, and is launched by the print image registration means 704 and print image transmission means 705. This means has a function of embedding a digital watermark in an image in accordance with a request from the print image registration means 704 or print image transmission means 705, and sending back the image to the request source, a function of sending watermark removing information to the request source when the embedded digital watermark is a removable one, and a function of removing a visible watermark embedded in an image on the basis of the image requested by the print control means 702 and visible watermark removing information. Note that the print server requires a visible watermark removing function, since a print image embedded with a removable visible watermark is often stored in the print spool 712. In this embodiment, the watermarking means is expressed as a single means having a function of embedding and removing a watermark. However, in this invention, the embedding function and removing function may be separated, and may be implemented by independent means. In such case, this embodiment can be explained by simply calling a combination of a watermark embedding means and watermark removing means as a watermarking means.

The print image size calculation means 707 is an application program, which is equivalent to the print image size calculation means 605 in the image server 111, and is launched by the print image transmission means 705. More specifically, the means 707 calculates an optimal size of a print image requested by a print image transmission request using data stored in a print image size calculation table 719 (to be described later), and informs the print image transmission means 705 of the calculated image size.

The order management table 711 is a database or a searchable file stored in the HDD 2009, and stores print order data (to be described later with reference to FIG. 8), and an order status table for managing the progress of a print order (to be described later with reference to FIG. 10).

The print spool 712 temporarily stores edit information and all print original images required for the print process of the print control means 702, and also visible watermark removing information if a removable visible watermark is embedded in a print original image.

The local transmission box 713 and local reception box 714 are equivalent to the local transmission box 613 and local reception box 614 in the image server 111, and are devices for respectively storing transmission data and reception data to and from the center server 102 in the HDD 2009.

The original image location management table 715 is a table which is equivalent to the original image location management table 612 in the image server 111, and manages the path names of print images (to be described later with reference to FIG. 12), and is stored as a database or searchable file in the HDD 2009.

The print original image storage device 716 is equivalent to the print original image storage device 611 in the image server 111, stores high-resolution original image files to be printed, and is held in the HDD 2009 or on a removable disk which can be accessed by the FDD 2010.

The watermark information management table 717 is a table which is equivalent to the watermark information management table 615 in the image server 111, and stores various kinds of information that pertains to digital watermarks (to be described later with reference to FIG. 37), and is stored as a database or searchable file in the HDD 2009.

The resized print image storage device 718 is equivalent to the resized print image storage device 616 in the image server 111. That is, the device 718 stores a print image for the purpose of re-using a print image, which is generated by the print image transmission means 705 in response to a given image transmission request, in a print image transmission request other than the given print image transmission request, and is held in the HDD 2009 or on a removable disk that can be accessed by the FDD 2010.

The print image size calculation table 719 is a table, which is equivalent to the print image size calculation table 617 in the image server 111, and stores data with which the print size calculation means 707 calculates a print image size optimal to a print order for an image which is requested to be sent, and is stored as a database or searchable file in the HDD 2009.

Note that in this embodiment, the print server 121 contains the functions of the image server 111 for the purpose of further reducing the transmission load by providing print original images and their management function to the print server. Hence, even if the print server 121 does not have the functions 704, 705, 707, 715, 716, 717, 718, and 719 as those of the image server, this embodiment can be practiced.

When the NETIF 2004 of the print server 121 or the NETIF 1004 of the image server 111, and the network 130 are replaced by a digital communication system and digital communication device such as a mobile communication system and mobile communication device (e.g., Personal Handyphone System (PHS) or the like), the present invention can be implemented in a mobile communication environment.

<Print Image Size Calculation Table>

FIG. 38 shows the data structure of the print image size calculation table used in the image server or print server of this embodiment. The print image size calculation table is a data structure that stores information with which the print image size calculation means 605 or 707 calculates the size of a print image to be actually printed, which is sent from the image server 111 or print server 121. This table stores the characteristics of printers and the types of paper output by the printers. The data structure and terminology of the print image size calculation table in this embodiment will be explained below using FIG. 38.

Referring to FIG. 38, reference numeral 3801 denotes a printer type field (simply expressed by "PRINTER" in FIG. 38), which stores the addresses of the printer servers and the characteristics (which can be model names) of their printers. That is, the printer type field stores all the types of printers which are connected to the print servers 121, 122, . . . , 12N and print an image in accordance with a print order in this embodiment.

Reference numeral 3802 denotes an output paper type field in this embodiment, which is expressed by "OUTPUT PAPER TYPE" in FIG. 38. In this embodiment, the output paper type field 3802 stores the types of paper sheets such as high-quality paper, glossy paper, film, and the like, which can undergo printing by the printers stored in the printer type field 3801, and can be actually designated in a print order to be processed.

In this embodiment, the contents of the printer type field 3801 and output paper type field 3802 uniquely determine data managed by this table which is used to calculate the print image size.

Reference numeral 3803 denotes a printer resolution field, which is expressed by "DPI" in FIG. 38. The printer resolution field 3803 stores the output resolutions of the printers stored in the printer type field 3801 upon printing, and the output resolution is expressed by Dot Per Inch (DPI) in this embodiment. In this embodiment, a single resolution is set in a single printer type. For example, when the output resolution upon printing can be set at an arbitrary value like a high-quality print mode, standard print mode, and the like, all available resolutions are expressed by different records.

Reference numeral 3804 denotes a correction coefficient field for storing a correction coefficient used to finally determine the print image size in this embodiment. In this embodiment, both the characteristics of the printer type field 3801 and output paper type field 3802 are used to calculate an optimal number of pixels of a print image by finally correcting the number of pixels of an image automatically calculated based on the contents of the printer resolution field 3803 and the actual size of an image which is requested to be sent.

These data fields 3801 to 3804 form this table. The data will be explained below.

Referring to FIG. 38, reference numeral 3811, 3812, and 3813 denote data storage examples of the print image size calculation table. In the data example 3811, printer type= "PRT1", output paper type="glossy paper", printer resolution="1200DPI", and correction coefficient="1.0". Likewise, in the data example 3812, printer type="PRT1", output paper type="film", printer resolution="1200DPI", and correction coefficient="0.8". In the data example 3813, printer type="PRT2", and other items are omitted.

A size calculation example using these data will be explained later in <print image transmission process>.

<Image Use Fee Management Table>

FIG. 39 shows the data structure of the image use fee management table used in this embodiment. The image use fee management table is used when the image use fee calculation means in the center server 102 calculates the data use fee (to be also referred to as image use fee management data hereinafter) of a pay image in this embodiment. The data structure and terminology of the image use fee management table will be described below using FIG. 39.

This table is constructed by two tables, i.e., a basic fee table 3910 (FIG. 39(*a*)) and a correction table 3920 (FIG. 39(*b*)). The basic fee table 3910 manages image data use fees of pay images, which are classified in units of printer types and actual print sizes, in a table form. The fee correction table 3920 manages correction data used to correct a basic fee, which is obtained using the basic fee table 3910, on the basis of the printer type and paper type.

Referring to FIG. 39, data 3901 to 3904 make up the basic fee table 3910, and data 3905 to 3907 make up the fee correction table 3920.

The data configuration of the basic fee table 3910 will be explained below.

Reference numeral 3901 denotes an image ID field for storing an image ID that identifies an image, and unique numbers are assigned as image IDs in this embodiment, as will be described later with reference to FIG. 9. Note that the image ID identifies an image, and an identical image ID is assigned to a plurality of image files located at remote places if they store identical images. Also, an identical image ID is assigned to images having different use purposes such as a display/edit image, print image, and the like.

Reference numeral 3902 denotes a printer type field which is expressed by "PRINTER" in FIG. 39. In this embodiment, the printer type field stores all the types of printers which are connected to the print servers 121, 122, . . . , 12N, and print in accordance with a print order.

Reference numeral 3903 denotes an actual print size field, which is expressed by "SIZE (mm)" in FIG. 39. The actual print size field 3903 indicates the actual size of an image to be printed, and stores several sizes defined by a fee system. Since the fee system in this embodiment classifies print sizes at given intervals, and a given fee is set for the size range from a given size (inclusive) to another size (exclusive), the actual print size field 3903 stores a minimum size of a given fee. Hence, in data whose "SIZE (mm)" column is blank in FIG. 39, the minimum size of that fee is close to 0 (mm). When a portion of pay image data is used as a close-up image, if the entire image of that close-up image is to be printed, image data larger than the actual print size is used. In this case, two methods, i.e., a method of determining the use fee of image data based on the actual print size, and a method of determining the use fee of image data based on the size of the entire image data may be used. In this embodiment, either or both of these methods may be used. In this embodiment, even when only a portion of image data is used as, e.g., a close-up image, the print fee is determined by the actual size, for the sake of simplicity.

Reference numeral 3904 denotes a data use fee field, which is expressed by "USE FEE (YEN)" in FIG. 39. This data stores a data use fee determined by the contents of the image ID field 3901, printer type field 3902, and actual print size field 3903. Note that this data indicates a basic fee, and is often corrected to a final data use fee by the correction table (to be described below).

The data configuration of the basic fee table 3910 has been explained. The data configuration of the fee correction table 3920 will be explained below.

Reference numeral 3905 denotes a correction printer type field, which is expressed by "CORRECTION PRINTER" in FIG. 39. As in the printer type field 3902, the correction printer type field 3905 stores all the types of printers which are connected to the print servers 121, 122, . . . , 12N and print an image in accordance with a print order in this embodiment. Note that this table includes only printers for which the image data use fee indicated by the basic fee table is to be corrected.

Reference numeral 3906 denotes an output paper type field in this embodiment, which is expressed by "CORRECTION OUTPUT PAPER TYPE" in FIG. 39. In this embodiment, the output paper type field 3906 stores the types of paper sheets such as high-quality paper, glossy paper, film, and the like, which can undergo printing by the printers stored in the correction printer type field 3905, and can be actually designated in a print order to be processed, and especially stores only paper types which require correction of data use fees.

Reference numeral 3907 denotes a fee correction coefficient field, which is expressed by "CORRECTION COEFFICIENT" in FIG. 39. This data stores a correction coefficient which is defined by the correction printer type field 3905 and correction output paper type field 3906, and is used to correct a data use fee calculated using the basic fee table on the basis of the printer and output paper used.

Data examples 3911 to 3918 of the basic fee table will be explained below.

Reference numerals 3911 to 3918 denote data examples of the basic fee table in this embodiment.

In the data example 3911, the image ID indicates image data "GANON/IS03/1998ABC002", the designated printer is "LPT1 (which specifies the print server name; the same applies to the following description), the actual print size is equal to or larger than "420 (mm: horizontal)×297 (mm: vertical)", and the image data use fee of the size equal to or larger than this data is uniformly 2000 (YEN), as indicated by the data use fee field 3904, since the largest size among those of data indicated by the image ID field 3901 and printer type field 3902 is stored as the upper limit value of the actual size.

The data example 3912 has different contents of the actual print size field 3903 and data use fee field 3904 compared to the data example 3911. In this data example, image data with an image ID="GANON/IS03/1998ABC002" is designated, and the designated printer is "LPT1" as in the data example 3911. However, the actual print size is smaller than "420 (mm: horizontal)×297 (mm: vertical)" and is equal to or larger than "297 (mm: horizontal)×210 (mm: vertical)" and, hence, the image data use fee is 1500 (YEN).

Likewise, the data use fees are set stepwise from the data example 3913 to data example 3915 in which the actual print size in the field 3903 indicates the smallest size.

The data examples 3916 and 3917 store basic fee data of image data which have an image ID="GANON/IS03/1998ABC002 as in the data examples 3911 to 3915 but are to be printed by printer type="PRT2" in the field 3902. Note that the data example 3916 includes data for the largest size, the data example 3917 includes data for the smallest size, and some data between these data examples are omitted.

The data example 3918 stores data for an image with an image ID="GANON/IS03/1998ABC003", and the printer type field 3902 and actual print size field 3903 are blank. A blank printer type field 3902 means that the fee system does not vary even when different printers are used, i.e., a uniform fee system is used irrespective of printer types. Likewise, a blank actual print size field 3903 means that a uniform fee system is used irrespective of the actual print size. In this way, when the printer type field 3902 and actual print size field 3903 are blank, a uniform use fee system can be expressed by excluding all or some of factors that determine the image data use fee.

Data examples of the fee correction table 3920 will be explained below.

In a data example 3921, when the correction printer type is "PRT1" and the output paper type is "glossy paper", the basic fee calculated by the basic fee table is multiplied by a correction coefficient=1.1. For example, the image data use fee in the data example 3911 in the basic fee table 3910 is 2000 (YEN). In this case, when glossy paper is selected as output paper, since the correction coefficient is 1.1, the basic fee is multiplied by 1.1, i.e., the final image data use fee is 2200 (YEN).

Likewise, in a data example 3921, when an image is to be printed on "film", the basic fee is multiplied by a correction coefficient=1.5. A data example 3923 indicates correction data when the designated printer is "PRT2", and the contents of the output paper type field 3906 and correction coefficient field 3907 will be omitted.

The fee correction table in this embodiment stores only data to be corrected. For example, if correction data for the correction printer type="PRT1" in the field 3905 are only those stored in the data examples 3921 and 3922, when the output paper type is "high-quality paper", which is not shown in FIG. 39, the image data use fee is not corrected, and the final image data use fee is 2000 (YEN).

<Watermark Information Management Table>

FIG. 37 shows the data structure of the watermark information management table (in the image server or print server) used in this embodiment. The watermark information management table is a data structure which stores information for embedding a digital watermark in an image to be processed in this embodiment, and data according to an instruction of a copyright holder are registered by the print image registration means 601 and 705 upon registering print images in the print original image storage devices 611 and 716 in the image servers 111, 112, . . . , 11N and print servers 121, 122, . . . , 12N. At this time, the print image registration means 601 or 704 and print image transmission means 602 or 705 search data registered by the copyright holder in units of use purposes of images to be used upon registration of a print original image, upon transmission of a print image, or upon transmission of a display/edit image to retrieve corresponding data, and pass the retrieved data to the watermarking means 604 or 706 together with the image, thus embedding a digital watermark in the image.

The data structure and terminology of the watermark information management table in this embodiment will be explained below using FIG. 37.

Referring to FIG. 37, reference numeral 3701 denotes an image ID field for storing an image ID that identifies an image, and unique numbers are assigned as image IDs in this embodiment, as will be described later with reference to FIG. 9. Note that the image ID identifies an image, and an identical image ID is assigned to a plurality of image files located at remote places if they store identical images. Also, an identical image ID is assigned to images having different use purposes such as a display/edit image, print image, and the like.

A field 3702 stores use purposes of an image in this embodiment. When an image having a given image ID in the field 3701 is re-classified according to its use purposes, different digital watermarks can be embedded in correspondence with the use purposes. The use purposes in this embodiment include "print original image" stored in the print original image storage devices 611 and 716, "display/edit image" sent from the image servers 111, 112, ..., 11N or print servers 121, 122, ..., 12N, and stored in the display/edit image storage device 411 in the center server 102, and "print image" sent from the image servers 111, 112, ..., 11N or print servers 121, 122, ..., 12N, and used in printing in the print servers 121, 122, ..., 12N.

A field 3703 stores the embedding timing of a digital watermark in this embodiment. In this embodiment, the embedding timing includes two different timings, i.e., "registration timing" indicating the registration timing of a print original image by the print image registration means 601 or 704, and "transmission timing" indicating the generation timing of an image upon transmission of an image by the print image transmission means 602 or 705. In this embodiment, both "registration timing" and "transmission timing" can be registered for a single image ID and a single use purpose. Also, in this embodiment, since the print image registration means 601 or 704 generates a display/edit image at the registration timing of an image for the purpose of transmission, the registration timing agrees with the transmission timing. In such case, digital watermarks registered for "registration timing" and "transmission timing" are embedded at the same time in the order of "registration timing" and "transmission timing".

A field 3704 stores the type of embedding method of a digital watermark. In this embodiment, the type of embedding method of a digital watermark includes three types, i.e., "invisible" indicating an invisible digital watermark which is invisible after the digital watermark is embedded, "unremovable visible" indicating an unremovable visible watermark which is visible and cannot be removed after the digital watermark is embedded, and "removable visible watermark" indicating a removable visible watermark, which is visible and can be removed using the watermarking means 604 or 706.

A field 3705 stores embedded data to be embedded by a digital watermark. In this embodiment, a character string is designated. This data field can store external reference data after an extension code. In this case, the watermarking means 604 or 706 externally retrieves data to be embedded in place of data stored in this data field, and embeds the retrieved data. In FIG. 37, a character string is placed in " " to clearly specify it. Also, an extension code is expressed using #. The embedded data in the field 3705 is a character string in this embodiment, but the format of embedded data is determined by a digital watermark to be used. Therefore, when data embedded as a digital watermark is image data, the entity of image data to be embedded, the path to an image data file, or the like is stored in the field 3705. When the format of embedded data varies depending on digital watermarking schemes, data may be expressed by a character string like in this embodiment, and may be converted into a data format corresponding to the required digital watermarking scheme when a watermark is to be actually embedded. Furthermore, the field 3705 may accept a plurality of data formats such as a character string, image data, and the like.

The aforementioned data form one record in the watermark information management table. In FIG. 37, reference numerals 3711, 3712, 3713, 3714, 3715, 3716, and 3717 denote data examples.

The data example 3711 stores watermark information that pertains to an image which has an image ID="GANON/IS03/1998ABC002" stored in the image ID field 3701, and a use purpose="original image" stored in the use purpose field 3702, i.e., a print original image stored in the print original image storage device 611 or 716. As can be seen from the contents of the following embedding timing field 3703, embedded watermark type field 3704, and embedded data field 3705, embedded data "COPYRIGHT 1998 abcd" is embedded as an invisible watermark in this image upon registering the image by the print image registration means 601 or 705. Likewise, the data example 3712 stores watermark information that pertains to an image which has an image ID="GANON/IS03/1998ABC002" and a use purpose="display/edit image", and in which embedded data "SAMPLE" is embedded as an unremovable visible watermark upon transmission from the image server 111, 112, or 11N, or print server 121, 122, or 12N. Embedded data in the data example 3713 refers to external data, and a print order (to be described later with reference to FIG. 8) is used as embedded data. Since the data examples 3715 and 3716 indicate that watermarks are embedded in a display/edit image with an image ID="GANON/IS03/1998ABC004" at both the registration and transmission timings, the watermarks are embedded at the same time in actual operation in the order of "registration timing" and "transmission timing" in the embedding timing field 3703, as has been described above in the paragraph of the embedding timing field 3703.

<Print Order Data>

Figure 8:
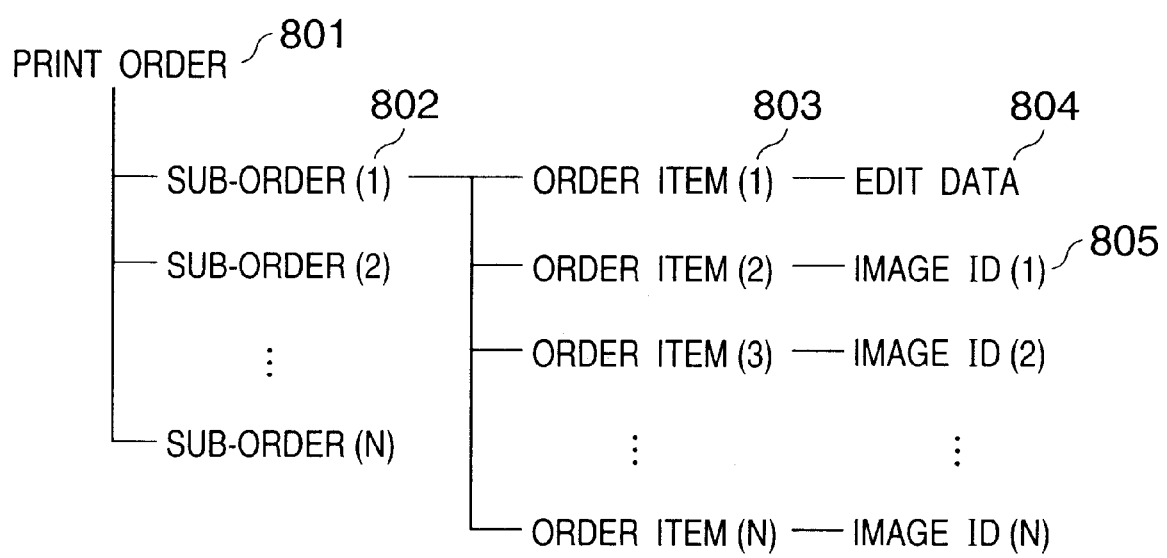
FIG. 8 shows the data structure of print order data used in the present invention.

FIG. 8 shows the data structure of print order data used in this embodiment. The print order data is a data structure that stores information of an order placed by the user in this embodiment. The print order data is stored in the order management table 416 by the order reception means 403, and is managed by the order output management means 406 in the center server 102. Also, in the print server 121, the print order data is stored in the order management table 711 and managed by the order output management means 701. The data structure of a print order and terminology used in this embodiment will be explained below using FIG. 8.

Referring to FIG. 8, reference numeral 801 denotes a print order which is a unit of printing that the user can request, and is identified by a unique order ID in this embodiment. The print order 801 is formed by one or more sub-orders 802, and has an identifier of a print server from which the user wants to output, and the like as information in units of print orders.

The order ID combines the user ID of the user who placed the print order, an identifier (IP address upon connecting the network) of a client computer from which the user placed the order, and the time the order was placed.

Reference numeral 802 denotes a sub-order which is a unit of printing by the print server, and is identified by a sub-order ID as one of unique serial numbers (001, 002, ... ) in a given order. Each sub-order consists of one or more order items 803, and has a paper size, the number of copies to be output, and the like as information in units of sub-orders.

Reference numeral 803 denotes an order item. Edit information 804, image ID 805, and the like respectively serve as order items, and form one sub-order 802.

Reference numeral 804 denotes edit information which is a script that describes print positions of images using a page description language.

Reference numeral 805 denotes an image ID which identifies an image to be printed. The image ID forms a sub-order as one of order items. Unique numbers are assigned as image IDs in this embodiment, as will be described later with reference to FIG. 9. Note that the image ID identifies an image, and an identical image ID is assigned to a plurality of image files located at remote places if they store identical images. This item stores the actual print size together with an image ID. When an image identified by a single image ID is used a plurality of times in one sub-order, the image ID is registered only once irrespective of the number of times of use, and data indicating a maximum size is stored as the actual print size in such case.

In practice, although the order 801, sub-orders 802, and order items 803 have information of the user, charge information, and the like, they are not particularly necessary upon explaining the present invention, and a detailed description thereof will be omitted.

<ID System>

Figure 9:
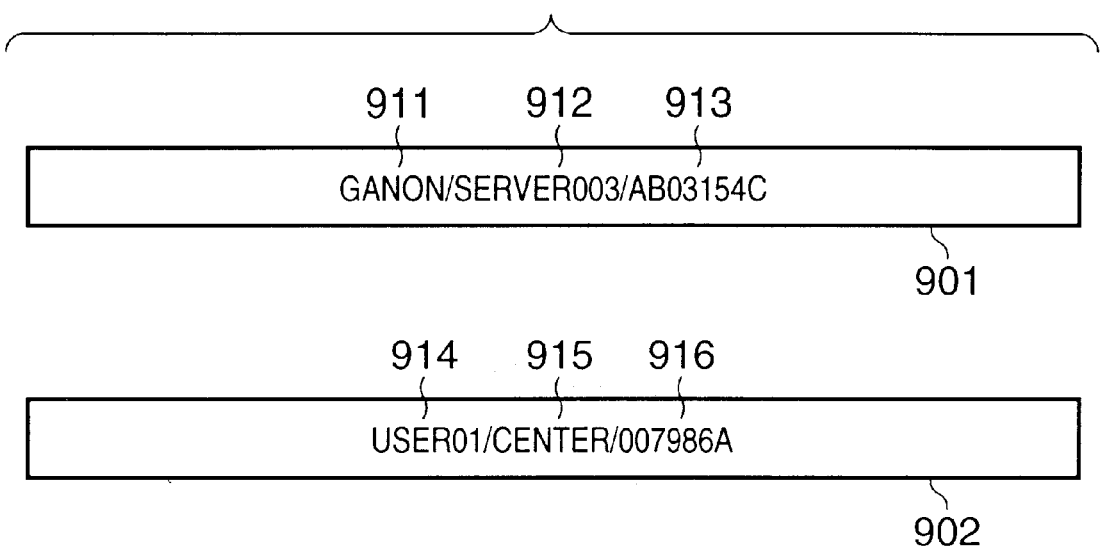
FIG. 9 is an explanatory view of an example of an image ID.

FIG. 9 is a view for explaining the image ID and order ID in this embodiment.

Referring to FIG. 9, reference numeral 901 denotes an image ID which is divided into three parts by slashes ('/'). The image ID is an identifier which is assigned to each print original image upon registering the original image so as to identify the print original image.

Reference numeral 911 denotes a center server name that identifies the center server 102.

Reference numeral 912 denotes an ID that indicates a server that has registered a print original image corresponding to a given image ID. In this embodiment, the ID 912 is indicated by a server ID of one of the image server 111 and print server 121. Note that the server IDs use identifiers uniquely assigned to the image server 111 and print server 121 connected to the center server 102, and the center server 102 also has a server ID.

Note that the server ID is used to maintain uniqueness of an image ID, and need not always match that of the server which saves a given original image.

Reference numeral 913 denotes a number which is assigned to uniquely specify an original image registered by a registration process in a server that executes the registration process, and is issued using, e.g., the execution time of the registration process.

As described above, in this embodiment, uniqueness of a print original image is held using 911, 912, and 913.

Referring to FIG. 9, reference numeral 902 denotes an order ID, which is divided into three parts by slashes ('/'). The order ID is an identifier which is assigned to each print order by the center server 102 upon reception of that print order, so as to identify the print order submitted by the user in this embodiment.

Reference numeral 914 denotes a user ID which is an identifier for identifying the user who submitted a given print order. Reference numeral 915 denotes a server ID of the center server 102 that received the print order. Reference numeral 916 denotes a number which is assigned to uniquely specify a print order received in the center server 102 that performs an order reception process, and is issued using, e.g., the execution time of the order reception process.

As described above, in this embodiment, uniqueness of a print original image is held using 914, 915, and 916.

<Order Status Table>

FIG. 10 is an explanatory view of the order status table 415 used in this embodiment. As described previously, the status table 415 is held as a database or a searchable file in the HDD 1009 of the center server 102, and is mainly used by the image retrieval means 405 to manage the retrieval states of print images of individual print orders and to control the processes to be described using the processing flows later. The status table 415 can be held on the RAM 1002 on the center server when it is used.

Referring to FIG. 10, a field 201 stores order IDs for identifying print orders which were received by the center server, and are in progress or complete. A field 202 stores building components of the order identified by the order ID field 201, and sub-order IDs for identifying sub-orders are stored in this embodiment. A field 203 stores image IDs of print original images used as items which are building components of sub-orders identified by the sub-order ID field 202. A field 204 stores status data indicating retrieval states of a print original image, and print original images of the corresponding order and sub-orders, i.e., values indicating states such as "image retrieval in progress", "image retrieval completed", and the like.

Reference numerals 211, 212, 213, and 214 denote examples of data stored in the order status table 415.

In FIG. 10, "–" in a column indicates no entry, so that states in units of orders and sub-orders can be managed in addition to preparation states of print images. For example, in FIG. 10, the data example 214 in the fourth line indicates that status of an image with an image ID="GANON/PS5/199890020027" of a sub-order with a sub-order ID="0001" in an order with an order ID="USER1/PC1/002" is "image retrieval completed", and its print image data has already been stored in the center server, and is ready to be sent to the print server, i.e., preparation is complete. On the other hand, the data example 213 in the third line indicates that a print image of an image with an image ID "GANON/PS5/1998901010758" in the sub-order with the sub-order ID="0001" is not ready. The data example 212 in the second line stores only sub-order ID="001" to indicate that an image is not ready to be sent, and the data example 211 in the first line stores only an order ID="USR1/PC1/0002" and indicates that an image is not ready to be sent.

Note that one print order may be held as one data structure. However, in this embodiment, data of one print order are separately held in the order management table and order status table, so as to minimize changes in processing flow to cope with modifications such as addition of additional information to a print order and the like.

<Server Management Table>

FIG. 11 is an explanatory view of the server management table used in this embodiment. As described previously, the server management table is held as a database or searchable file in the HDD 1009 of the center server 102, and manages information of all image servers and print servers connected to the center server 102. Also, this table manages the printers connected, corresponding paper sizes, and paper types of the print servers. In this embodiment, the server management table is used in an original image location determination process which will be described later with reference to the processing flow in FIG. 15. The server management table can also be held on the RAM 1002 on the center server.

Referring to FIG. 11, reference numeral 1101 denotes a server ID field for storing server IDs which are identifiers for uniquely identifying all the image servers and print servers connected to the center server.

Reference numeral 1102 denotes an image retrieval priority order field, which stores numerical values used as discrimination criteria when an original image corresponding to a given image ID is saved in a plurality of image servers or print servers. As the image retrieval priority order, a relative value corresponding to transmission cost required for transmitting image data to the center server is set in advance when an original image is retrieved, as will be described later. Note that the transmission cost means a total cost, i.e., includes not only cost required for transmission, but also the time required until an image is sent in response to a request from the center server. The image retrieval priority order field 1102 stores values ranging from 1 to 999, and a smaller value indicates lower transmission cost required for image retrieval.

For example, a value "100" is set if the image or print server of interest is located with an identical LAN (local area network) to which the center server belongs. On the other hand, a value "200" is set if the image or print server of interest is not located within the identical LAN, but is connected to the network all the time. Furthermore, a value "300" is set if the image or print server of interest is not located within the identical LAN and is not always connected to the network (e.g., that server is connected to the network using a dial-up protocol). Moreover, a value "20" is added to such value for a server which is located within the identical LAN but has poor processing efficiency due to high access frequency.

Reference numeral 1103 denotes a connected printer field which stores the types of printer connected to the printer servers. Reference numeral 1104 denotes a printable size field which stores paper sizes that a given print server can print. Reference numeral 1105 denotes a corresponding paper field which stores the types of paper such as high-quality paper, glossy paper, and the like that a given print server can print.

Since the fields 1103 to 1105 store data in case of the print server, no data is stored for the image server.

<Original Image Location Management Table>

FIG. 12 is an explanatory view of the original image location management table used in this embodiment.

The original image location management table is held as a database or searchable file in the HDDs 1009 of the center server 102 and image server 111, and the HDD 2009 of the print server 121, and is used to specify the storage location of an original image required for printing in the individual processing flows to be described later. Note that the original image location management table on the center server stores accessible print image data stored in all the image and print servers connected to the center server, and print image data stored in the temporary saved image storage device 414. On the other hand, the original image location management table on the image or print server stores print original image data stored in the HDD 1009 or 2009 or FDD 1010 or 2010 of that server and print image data before transmission stored in the resized print image storage device 616 or 718. The original image location management table can be assured on the RAM 1002 or 2002 of each server.

Reference numeral 1210 in FIG. 12(*a*) denotes a data example of the original image location management table on the center server 102; and 1220 in FIG. 12(*b*), a data example on the image server 111 or print server 121. This table has common building data although the range of images to be managed varies depending on servers. Note that some building data need not be stored and some other building data have slightly different meanings depending on servers. The building data will be explained below together with such differences.

Reference numeral 1201 denotes an image ID field that stores the image IDs of accessible print images. Reference numeral 1202 denotes an image size field (number of pixels) which stores the numbers of pixels of images to be registered. This data is registered when a print original image is registered on the server of interest. For example, this data need not be registered when a print original image present on the image server 111 or print server 121 is registered in the original image location management table on the center server 102.

Reference numeral 1203 denotes an owner field that stores the user IDs of owners of individual print images, which IDs are uniquely determined in correspondence with the image IDs. In case of a pay or free image which is open to general users other than the owner, this field is blank. Reference numeral 1204 denotes a saving location field which holds the saving locations of print image data of the corresponding image IDs. In case of the location management table on the center server 102, a plurality of values can be stored in correspondence with a single image ID value as the server ID of the image server 111 or print server 121 or the path name of a print image saved on the HDD 1009 on the center server. In case of the image server 111 or print server 121, the saving location of a print original image and that of a print image are expressed by path names.

Reference numeral 1205 denotes an additional information field which stores various kinds of additional information such as the ID of a print order which has a temporary print file, identification information of a print original image and print image, original image file deletion control information, and the like.

Note that the registration date, image size, and the like may be held as items other than the aforementioned items, but they are not directly related to this invention and a description thereof will be omitted.

Original image location management data 1211, 1212, 1213, and 1214 in the data example 1210 on the center server 102 are examples of original image location management data stored in the original image location management table.

For example, the original image location management data 1211 represents that print image data of an image identified by an image ID="GANON/PS01/1998ABC001" belongs to a user identified by a user ID="USR123", and is saved on the HDD 2009 or FDD 2010 on a print server identified by a server ID On the other hand, the original image location management data 1212 represents that print image data of an image identified by an image ID="GANON/IS03/1998ABC002" is saved as an image file identified by a path name= "E:¥spool¥image1.jpg" on the HDD 1009 or FDD 1010 on the center server 102.

As will be described later, when the original image location management table on the center server stores the path name as a saving location like in the original image location management data 1212, the corresponding image file is temporarily saved before it is sent to the print server. The temporarily saved image is possessed for each print order stored in the additional information field and, for example, this data is possessed by "USR13345/CENTER/ 0001".

The original image location management data 1213 represents that print original image data of an image identified by an image ID="GANON/IS03/1998ABC002" is saved in an image server="IS02". Likewise, the original image location management data 1214 represents that print original image data of an image identified by an image ID="GANON/PS03/1998ABC004" is saved in a print server="PS07".

The data example 1220 will be described below. Original image location management data 1221, 1222, 1223, 1224, and 1225 are examples of original image location management data stored in the original image location management table in the image server 111 or print server 121.

For example, the data 1221 represents an image identified by an image ID="GANON/IS03/1998ABC002" and having an image size (number of pixels)=3072*2048. Print image data is an image open to general users other than the owner since the user ID field is blank, and its saving location is a file identified by "D:¥image¥1998ABC002.jpg" of that server. Since the additional information field is blank, it indicates a print original image in this embodiment. The data 1222 represents the image identified by the image ID="GANON/IS03/1998ABC002" like in the original image location management data 1221. However, this image file has an image size (number of pixels)=801*534, is saved at "E:¥snedimage¥image1.jpg", and is a print image generated from the print original image since "print image" is stored in the additional information field.

The data 1223, 1224, and 1225 indicate that image files of an image identified by an image ID="GANON/IS03/ 1998ABC003" are print original images but have different image sizes (numbers of pixels).

<Transfer Data Format>

FIG. 13 is a view for explaining the transfer data format used in this embodiment. Transfer data is exchanged between the center server 102 and the image server 111 and print server 121 as a file having the format shown in FIG. 13.

The transfer data format used in this embodiment uses "Standard Generalized Markup Language" (SGML) specified by ISO8879.

Reference numeral 1301 in FIG. 13(*a*) denotes an example of the transfer file sent from the print server 121 to the center server 102; and 1302 in FIG. 13(*b*) is an example of the transfer file sent from the center server 102 to the print server 121.

As can be seen from the transfer file 1301, a transfer file stores tags that represent the contents various transfer data in a field bounded by a <CAML> start tag and </CAML> end tag. In FIG. 13, reference numerals 1311, 1312, 1313, 1314, 1315, 1316, 1317, and 1318 denote transfer data. When transfer data has a hierarchical structure such as lower-order transfer data, a tag of the lower-order transfer data is stored between the start and end tags of that transfer data like in a <SUBODR> tag of the transfer data 1312. The first character string of each tag indicates a tag name, which serves as an identifier representing the contents of that tag.

One transfer file can store a plurality of arbitrary kinds of transfer data.

In FIG. 13, reference numeral 1311 denotes transmission/reception header transfer data, which is stored as the first transfer data in each transfer data file. One transmission/reception header transfer data 1311 is stored per transfer data file.

Reference numeral 1312 denotes order transfer data for transferring a print order submitted by the user to the print server 121. The order transfer data is used to transfer the print order 801 that has been explained with reference to FIG. 8, and has lower-order tags <SUBODR> and <ODRITEM> to store the data structure of the print order 801. Reference numeral 1313 denotes original image transmission request transfer data used when the center server 102 requests the image server 111 or print server 121 to send a print original image file. Reference numeral 1314 denotes image registration information transfer data used when the center server 102 requests the image server 111 or print server 121 to newly register or delete a print original image.

Reference numeral 1315 denotes transmission/reception header transfer data, which is equivalent to the transmission/reception header transfer data 1311. Reference numeral 1316 denotes original image registration process transfer data used when the print server 121 requests the center server 102 to newly register a print original image, to send the image to another print server or the image server 111, or to delete the image. Reference numeral 1317 denotes original image transmission data used when the print server 121 sends a print original image to the center server 102 in response to the original image transmission request transfer data 1313 sent from the center server 102. Reference numeral 1318 denotes print result notification data used when the print server notifies the center server 102 of the print process result of the print order in accordance with the order transfer data 1312 sent from the center server 102.

Reference numeral 1321 denotes an example when various data are stored in the transfer data file.

If data to be stored includes a character '<' or the like, such character may often result in a determination error of the start of a transfer data tag upon analyzing transfer data by the center transmission/reception control means 407 or the like. Hence, when data other than the transfer data tag is stored, it is converted into internal code data like in the example 1312, and the converted code data is stored.

Reference numeral 1322 denotes an example when image data or the like is transferred as a file independently from the transfer data file. In the example 1322, a parameter in the tag stores the file name of that independent file.

<Script>

Figure 14:
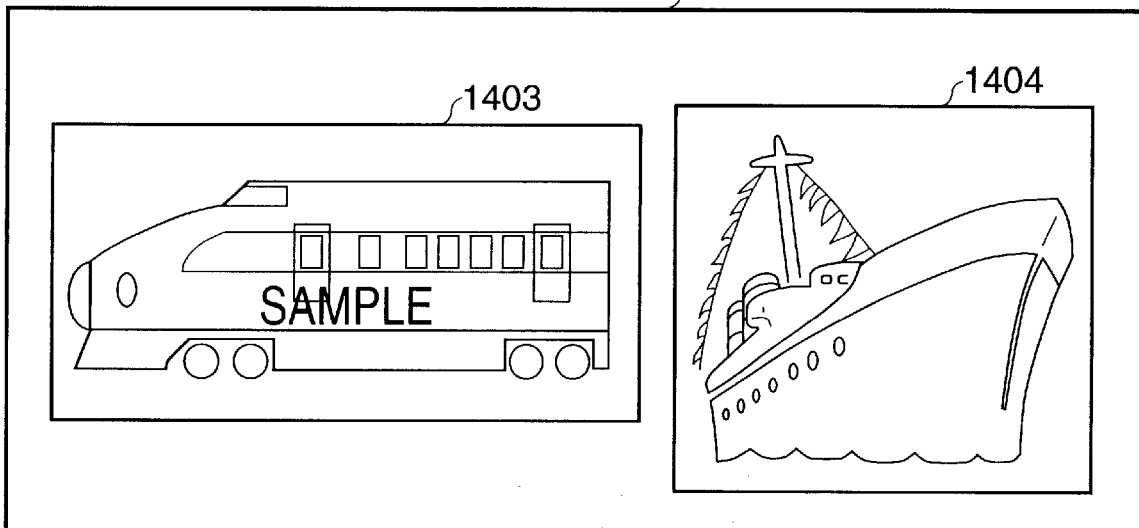
FIG. 14 is an explanatory view of an example of a script described in a page description language used in the present invention.

FIG. 14 is an explanatory view of a script described in the page description language used in this embodiment.

Referring to FIG. 14, reference numeral 1401 denotes a document which is created by the data processing means 501 of the client computer 101, and is finally printed by the print server 102. Reference numerals 1403 and 1404 denote image data contained in the document 1401. Especially, the image data 1403 is embedded with an unremovable visible watermark using watermark management information 3712 shown in FIG. 37.

Reference numeral 1402 denotes a script obtained by converting the document 1401 into a page description language by the data processing means 501. The script 1402 is created by the data processing means 501 of the client computer 101, is transferred to the print server 102 via the center server 102, and is analyzed by the print control means 702.

The data processing means 501 edits a document by retrieving a low-resolution edit image from the center server, thus reducing transfer data on the network and the memory size required for editing.

The data processing means 501 stores the image IDs of the image data 1403 and 1404 in image descriptions (image ( ) portions) in the script 1402. Since the data processing means 501 uses a low-resolution edit image, and the print control means 702 uses a print original image, the path name of an image file used by the data processing means 501 or print control means 702 is stored in a corresponding table imagetab( ) at the beginning of the script 1402.

<Image Size Transmission Data>

Figure 40:
FIG. 40 shows image size transmission data.

FIG. 40 is a view for explaining the image size transmission data sent from the client computer 101 to the center server 102 in this embodiment. When the data processing means 501 submits a print order of a given document to the center server 102, it analyzes the size of the image data contained in that document and transmits the image size transmission data to the center server 102. Then, the image size transmission data is used in the processes for calculating the data use fee of pay image data, and determining the size of a print image to be sent to the print server 121. In the data structure, an image ID and the actual image size of an image identified by that image ID are paired, and such pairs are formed in correspondence with all images having image IDs contained in the document.

When an image is to be partially printed, since a print image larger than an actual print size is required, the entire size of the image is sent as an actual print size in such case.

In FIG. 40, reference numerals 4001 and 4002 denote data examples of the image size transmission data.

The data example 4001 represents that the actual print size of an image identified by an image ID="GANON/IS03/1998ABC002" is 120 (mm)* 80 (mm). Likewise, the data example 4002 represents that the actual print size of an image identified by an image ID="GANON/PS02/19980402BC66" is 100 (mm)* 80 (mm).

<Transmission Box>

Figure 30:
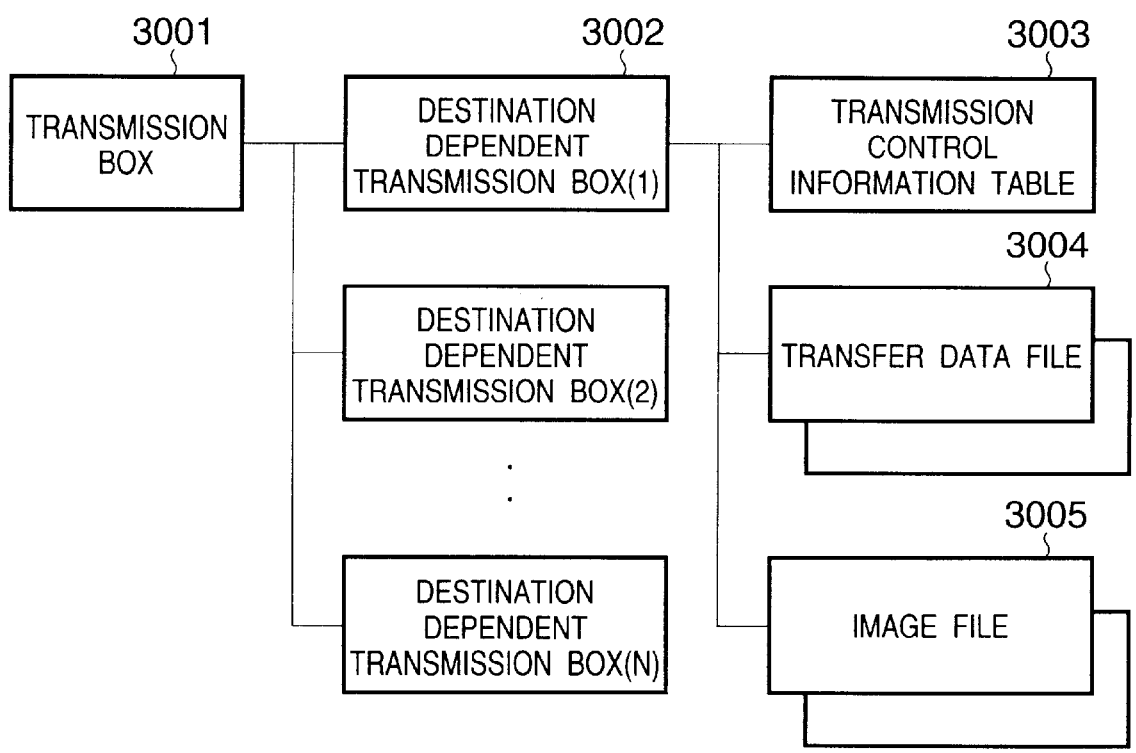
FIG. 30 is a block diagram for explaining the data structure in a transmission box.

FIG. 30 is a block diagram for explaining the internal data storage structure of the center transmission box 418 of the center server 102, the local transmission box 613 of the image server 111, and the local transmission box 713 of the print server 121.

Since the transmission boxes 418, 613, and 713 have the same functions, their internal structure will be explained using a transmission box 3001 shown in FIG. 30.

The transmission box is a data group stored in the HDD 1009 or 2009, and can be stored using, e.g., a commercially available relational database. However, this embodiment uses a hierarchical file system (file storage method) which is prevalently used. The file system can store files in storage units called hierarchical directories.

In FIG. 30, reference numeral 3001 denotes a transmission box, which is equivalent to the center transmission box 418 of the center server 102, the local transmission box 613 of the image server 111, and the local transmission box 713 of the print server 121. The transmission box 3001 is a directory.

Reference numeral 3002 denotes destination dependent transmission boxes, which are lower directories (subdirectories) of the transmission box 3001, and store transmission data in units of destinations by assigning the server IDs of destinations as their directory names.

Reference numeral 3003 denotes a transmission control information table, which is a file held in each destination dependent transmission box. The transmission control information table 3003 stores information such as the file name of a transmission data file 3004 to be sent, and the like.

Reference numeral 3004 denotes a transfer data file which has a format that has been explained with reference to FIG. 13. One destination dependent transmission box 3002 stores a plurality of transfer data files 3004.

Reference numeral 3005 denotes a file having a format other than that which has been explained with reference to FIG. 13, i.e., a file which is referred to by a <CAMLLINK> tag in the transfer data file 3004. This file is, for example, an image file, and will be simply referred to as an image file hereinafter. One destination dependent transmission box 3002 stores a plurality of image files 3005.

<Reception Box>

FIG. 31 is a block diagram for explaining the internal data storage structure of the center reception box 419 of the center server 102, the local reception box 614 of the image server 111, and the local reception box 714 of the print server 121. Since the reception boxes 419, 614, and 714 have equivalent functions, their functions will be explained using a reception box 3101 shown in FIG. 31.

The reception box is a data group stored in the HDD 1009 or 2009, and can be stored using, e.g., a commercially available relational database. However, this embodiment uses a hierarchical file system (file storage method) which is prevalently used. The file system can store files in storage units called hierarchical directories.

In FIG. 31, reference numeral 3101 denotes a reception box which is equivalent to the center reception box 419 of the center server 102, the local reception box 614 of the image server 111, and the local reception box 714 of the print server 121. The reception box 3101 is a directory.

Reference numeral 3102 denotes source dependent reception boxes, which are lower directories (subdirectories) of the reception box 3101, and can store reception data in units of sources by assigning the server IDs of sources as their directory names.

Reference numeral 3103 denotes a processing means information table which holds the names of processing means to be launched in accordance with the tags of transfer data in a transfer data file 3105, their launching methods, and the like, when the center transmission/reception control means 407, local transmission/reception control means 603, or local transmission/reception control means 703 receives the transfer data file 3105.

Reference numeral 3104 denotes a reception control table, which is a file held in each source dependent reception box. The reception control information table 3103 stores information such as the file name of the received transfer data file 3104 and the like.

Reference numeral 3105 denotes a transfer data file which has a format that has been explained with reference to FIG. 13. One source dependent reception box 3102 stores a plurality of transfer data files 3105.

Reference numeral 3106 denotes a file having a format other than that which has been explained with reference to FIG. 13, i.e., a file which is referred to by a <CAMLLINK> tag in the transfer data file 3105. This file is, for example, an image file, and will be simply referred to as an image file hereinafter. One source dependent reception box 3102 stores a plurality of image files 3106.

<Transmission/reception Control Information Table>

FIG. 32 shows data items stored in the transmission control information table 3003 and reception control information table 3104. Since the transmission control information table 3003 and reception control information table 3104 store identical data items, the control information table 3003 and reception control information table 3104 will be generally referred to as a transmission/reception control information table in the following description.

The transmission/reception control information table stores a plurality of data records each of which includes a data group that will be explained below with reference to FIG. 32. Each data record is uniquely identified by the value in a transfer file name field 3201.

Referring to FIG. 32, reference numeral 3201 denotes a transfer file name field, which stores the file name of a file stored as the transfer data file 3004, transfer data file 3105, image file 3005, or image file 3106.

Reference numeral 3202 denotes a transfer data file name field, which stores the file name of the transfer data file 3004 or 3105 that contains a <CAMLLINK> tag indicating an image file 3005 or 3106 when the value in the transfer file name field 3201 indicates the image file 3005 or 3106. When the value in the transfer file name field 3201 indicates the file name of the transfer data file 3004 or 3105, the transfer data file name field 3202 has no entry.

Reference numeral 3203 denotes a file size field which stores the size of a file indicated by the transfer file name field 3201 as the number of bytes.

Reference numeral 3204 denotes a box storage date field, which stores date and time data when a file indicated by the transfer file name field 3201 was stored in the transmission box 3001 or reception box 3101.

Reference numeral 3205 denotes a transfer completion date field which stores date and time data when transmission or reception of a file indicated by the transfer file name field 3201 is completed.

In this manner, the transmission/reception control information table stores the attributes of the individual transfer data file 3004, transfer data file 3105, image file 3005, or image file 3106.

<Processing Means Information Table>

Figure 33:
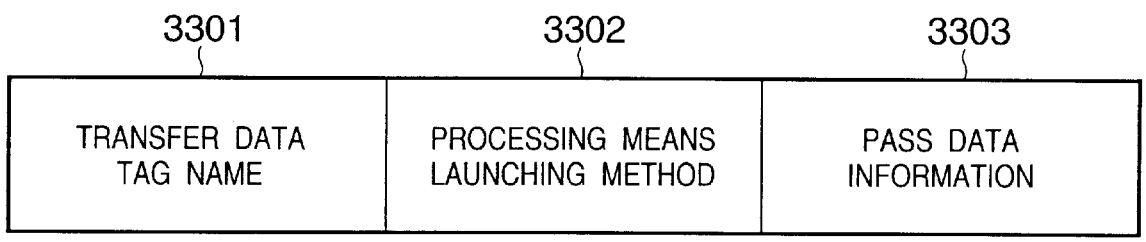
FIG. 33 is an explanatory view of a processing means information table in the reception box.

FIG. 33 shows data items stored in the processing means information table 3103 in the reception box 3101.

The processing means information table 3103 stores a plurality of data records each of which includes a data group that will be described below with reference to FIG. 33. Each data record is uniquely identified by a value stored in a transfer data tag name field 3301. In this embodiment, the processing means information table 3103 stores data records having correct values in advance.

Referring to FIG. 33, reference numeral 3301 denotes a transfer data tag field, which stores a tag name for identifying various transfer data, which have been explained in the transfer data format shown in FIG. 13.

Reference numeral 3302 denote a processing means launching method field, which stores the launching method of a processing means which is to process transfer data identified by the value in the transfer data tag name field 3301. For example, when an application program is mapped and activated on the RAM 1002, the launching method field stores the program file name of that application program, so that the center transmission/reception control means 407, local transmission/reception control means 603, or local transmission/reception control means 703 can read out the corresponding processing means from the HDD 1009 or 2009 and map and activate it on the RAM 1002 or 2002.

Reference numeral 3303 denotes a pass data information field which stores the name of a data item that the center transmission/reception control means 407, local transmission/reception control means 603, or local transmission/reception control means 703 passes to a given processing means via the RAM 1002 or 2002 after it launches that processing means in accordance with the contents of the processing means launching method field 3302. The name of the data item to be stored is, for example, the file name of the transfer data file 3105.

<Description of Operation>

The overall operation will be explained below using FIG. 1 on the basis of the aforementioned arrangements and individual functions of the respective apparatuses.

Initially, prior to registration of print original images in a given server, the image server 111 or print server 121 assigns identifiers (image IDs) for management to images, and registers watermark management information on the basis of an instruction of the copyright holder of the images to be registered. If the image to be registered is a pay image, an image data use fee is also registered.

The image server 111 or print server 121 registers a print original image. The image server 111 mainly registers images that all users can access such as images provided by a corporation which is operating the server, and the print server 121 normally registers a personal image of the user, i.e., an image that only the user can access, but can also register the same print image as that registered in the image server 111 to reduce the transfer load of a print image. Subsequently, a low-resolution display/edit image, which is browsed/edited by the user on the client computer 101, is prepared. Upon registering a print original image and preparing a display/edit image, a digital watermark is embedded on the basis of watermark management information if required.

The image server 111 or print server 121 sends the display/edit image, image registration information, and an image data use fee to the center server 102. The center server 102 saves the received display/edit image, image registration information, and image data use fee in the image use fee management table.

The user retrieves information of accessible print edit images and the print servers 111, 112, . . . , 11N held in the center server 102 using the client computer 101, makes desired edit designation, and then submits a print order of one or more images or a document containing images to the center server 102 by selecting a desired print server 121. Upon submitting the order, the client computer 101 sends image size transmission data to the center server 102, which calculates the image data use fee of a pay image based on the received transmission data, and settles that fee together with a print fee if necessary.

The center server 102 saves the information of the received print order, specifies the storage locations of print images identified by image IDs contained in the print order using image registration information held in the center server 102, and sends image retrieval requests to the image servers 111, 112, . . . , 11N, or print servers 121, 122, . . . , 12N in accordance with the specified information.

Upon receiving the image retrieval request, a relevant image or print server specifies an image to be sent using image registration information in that server, calculates an optimal size of a print image based on the image size retrieved from the image size transmission data, embeds a digital watermark in a print image based on watermark information, and then sends the print image to the center server 102.

The center server 102 receives the print image sent from the image or print server, and saves it in the center server 102.

When all print images required for the aforementioned print order have arrived at the center server 102 or the print server 121 as a print destination, the center server 102 sends the print order and print original images to the designated print server, e.g., the print server 121.

Upon receiving the print order and print images from the center server 102, the print server 121 removes a watermark if a removable visible watermark is embedded in a given print image, then executes a print process according to the print order, and sends a print completion message to the center server 102.

Upon receiving the print completion message from the print server 121, the center server 102 deletes the print images retrieved for that print order, and updates the image registration information, as needed.

<Image Registration in Print Server>

The flow of the registration process of a print original image from the print server 121 will be explained below. A shop such as a DPE shop is assumed as a location where the print server 121 is equipped. In that shop, a process for registering image data brought in by the user in the system of this embodiment is done.

The print server 121 registers user image data, watermark management information instructed by a copyright holder to the image to be registered, and an image data use fee if that image data is pay image data, using the print image registration means 704, and sends transfer data indicating the registered information to the center server 102 using the local transmission/reception control means 703. Data to be sent is registered in the transmission/reception control means by storing a transfer data file in the local transmission box 713. In a series of registration processes, digital watermarks corresponding to use purposes are embedded using the watermarking means 706 in accordance with the watermark management information.

The print image registration means 704 also processes instruction inputs of deletion of an already registered original image, and movement or copy of an original image to another print server 122 or image server 112 in addition to registration of a new original image. However, since such processes are not necessary upon explaining the present invention, a detailed description thereof in this embodiment will be omitted.

Assume that the user in this embodiment has acquired an account such as a user ID that grants permission of use of the system of this embodiment from the center server in advance.

Figure 15:
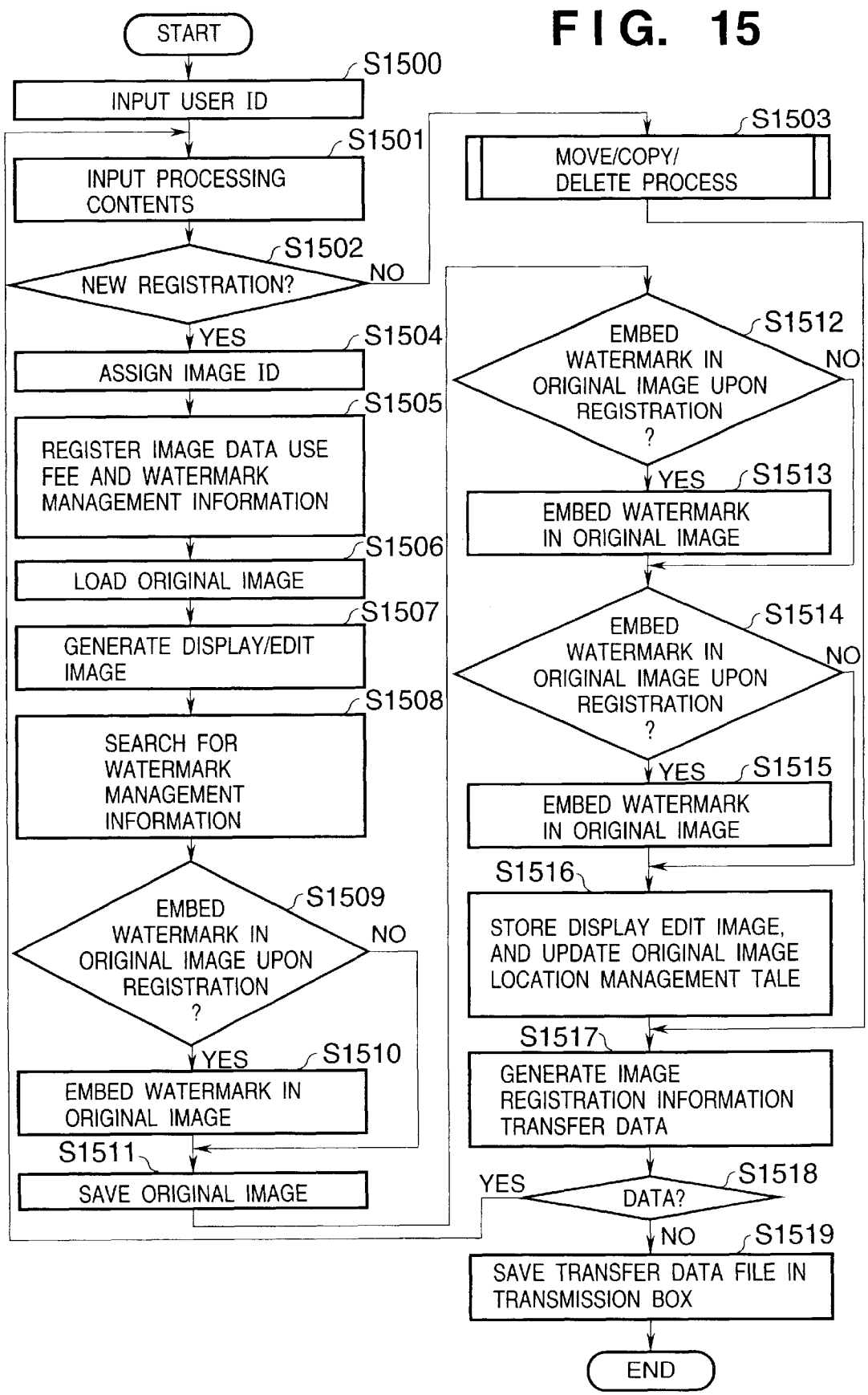
FIG. 15 is a flow chart showing an original image registration process in the print server.

FIG. 15 is a flow chart showing the flow of the image registration process in the print image registration means 704. The image registration process in the print image registration means 704 will be described below with reference to FIG. 15.

In step S1500, the user has already acquired a user ID in this embodiment, and inputs the user ID at the KB 2008 with reference to, e.g., a membership card or the like, thus storing the user ID in the RAM 2002. In step S1501, the user inputs a code (to be referred to as a "processing code" hereinafter) that identifies the contents of a process to be executed at the KB 2008, thus storing the processing code in the RAM 2002.

In step S1502, the processing code stored in step S1501 is checked. If the processing code indicates "new registration", the flow advances to step S1504; otherwise, the flow advances to step S1503.

In step S1503, a movement, copy, or deletion process of an image that has already been registered in the print server 121 is done, and the flow advances to step S1517. Since the detailed contents of step S1503 are not directly related to the present invention, a detailed description thereof will be omitted.

In step S1504, prior to registration of a new image, a unique value in the print server 121 is generated based on the current time, and the like to prepare an image ID (FIG. 9) to be assigned to that image, and the prepared image ID is stored on the RAM 2002.

In step S1505, the user inputs the embedding timings, digital watermark types, and digital watermark data to be embedded in units of use purposes at the KB 2008 in accordance with an instruction of the image copyright holder with respect to all new images to be registered, and registers them in the watermark information management table 717. If a digital watermark need not be embedded, the user inputs that message at the KB 2008, and no information is registered in the watermark information management table.

Since it is ready to receive a new image in the steps so far, a main process of image registration starts from the next step.

In step S1506, an original image to be registered is loaded from a removable disk that stores the image onto the RAM 2002 via the FDD 2010. Or a printed image is scanned by the scanner 2014, and is loaded onto the RAM 2002.

In step S1507, a display/edit image is prepared based on the original image loaded on the RAM 2002 in step S1506 by image conversion for lowering the resolution and reducing the image and file sizes, and is stored on the RAM 2002 or the HDD 2009 as a temporary file. The display/edit image is prepared in step S1507 to have a format that the data processing means 501 and expansion means 503 on the client computer can process. As the image format at that time, an image format such as JFIF (JPEG Interchange Format) or the like as one of image data formats using the JPEG compression algorithm, which allows to write additional information such as a comment or the like, is used, and the image ID of the image prepared in step S1507 and stored in the RAM 2002 is written as the additional information.

In step S1508, the watermark information management table 717 is searched for watermark management information having an embedding timing ="registration timing" for the print original image, and that having embedding timing= "registration timing" and "transmission timing" for the display/edit image generated in step S1507. In this embodiment, since transmission is defined by the transmission timing from the registration server, and registration is defined by the registration or generation timing in a new registration process, both data for the registration and transmission timings are retrieved for the display/edit image. As a result of the search, the presence/absence of these three different data is stored on the RAM 2002.

In step S1509, the presence/absence of watermark management information for the registration timing of the print original image stored on the RAM 2002 is checked. If the watermark management information is present, it is determined that a digital watermark is to be embedded, and the flow advances to step S1510 to embed a digital watermark for the registration timing in the print original image. If the copyright holder determines that a digital watermark for the registration timing need not be embedded in the print original image, since no watermark management information is registered in step S1505, the flow jumps to step S1511.

In step S1510, a digital watermark for the registration timing is embedded in the print original image. Watermark management information having a use purpose "print original image" and embedding timing="registration timing" of those of the corresponding image ID is read out from the watermark information management table 717, and is stored on the RAM 2002. The watermarking means 706 is launched, and the storage address of the image loaded in step S1506 on the RAM 2002, the watermark management information stored on the RAM 2002, and an output destination of the image embedded with a watermark are passed to the watermarking means 706, thus requesting it to embed a digital watermark. In this embodiment, the image embedded with the watermark is formed by notifying the RAM 2002 of the position. Note that in this invention, information may be sent to the watermarking means 706 by either a standard scheme provided by application programs that implement the individual means or a unique notification scheme. Furthermore, in this embodiment, an image is input/output via the RAM 2002, but the HDD 2009 or a removable disk on the FDD 2010 may be used to store an image file or may be combined with the RAM 2002.

The watermarking means 706 embeds a digital watermark in the received image in accordance with the received watermark management information, and outputs the image embedded with the digital watermark onto the RAM 2002 designated by the print image registration means 704. Upon completion of the digital watermark embedding process, the watermarking means 706 sends an end message to the print image registration means 704 and then ends. When the type of watermark embedded by the watermarking means 706 is a removable visible watermark, the removing information of the embedded watermark is simultaneously output.

As the output destination of the removing information in this embodiment, the HDD 2009 and FDD 2010 can be used in addition to the RAM 2002 as that for images. When image data uses a format having a comment field such as the JFIF format, the removing information can be stored in the comment field of that format. In this embodiment, the removing information is embedded in the comment field of image data for the sake of easy data communications and a simple description of the present invention.

Upon receiving the end message, the print image registration means deletes the watermark management information which stores the location of the output destination on the RAM 2002.

In step S1511, the print original image embedded with the watermark stored in the RAM 2002 or the image loaded in step S1506 is saved in the HDD 2009 or a removable disk on the FDD 2010. The supervisor of the print server 121 designates the storage location using the KB 2008 and stores it on the RAM 2002.

In step S1512, the presence/absence of watermark management information for the registration timing of the display/edit image stored on the RAM 2002 is checked. If the watermark management information is present, it is determined that a digital watermark is to be embedded, and the flow advances to step S1513 to embed a digital watermark for the registration timing in the display/edit image. If the copyright holder determines that a digital watermark for the registration timing need not be embedded in the display/edit image, since no watermark management information is registered in step S1505, the flow jumps to step S1514.

In step S1513, a digital watermark for the registration timing is embedded in the display/edit image in substantially the same procedure as that in step S1510. That is, watermark management information having a use purpose="display/edit image" and embedding timing="registration timing" of those of the corresponding image ID is read out from the watermark information management table 717, and is stored on the RAM 2002. The watermarking means 706 is launched, and the storage address of the image loaded in step S1506 on the RAM 2002 or the temporary file mane created on the HDD 2009 or the like, the watermark management information stored on the RAM 2002, and an output destination of the image embedded with a watermark are passed to the watermarking means 706, thus requesting it to embed a digital watermark.

The watermarking means 706 embeds a digital watermark in the received image in accordance with the received watermark management information, and outputs the image embedded with the digital watermark on the RAM 2002 designated by the print image registration means 704. Upon completion of the digital watermark embedding process, the watermarking means 706 sends an end message to the print image registration means 704 and then ends.

Upon receiving the end message, the print image registration means deletes the watermark management information which stores the location of the output destination on the RAM 2002.

In step S1514, the presence/absence of watermark management information for the transmission timing of the display/edit image stored on the RAM 2002 is checked. If the watermark management information is present, it is determined that a digital watermark is to be embedded, and the flow advances to step S1515 to embed a digital watermark for the transmission timing in the display/edit image. If the copyright holder determines that a digital watermark for the transmission timing need not be embedded in the display/edit image, since no watermark management information is registered in step S1505, the flow jumps to step S1516.

In step S1515, a digital watermark for the registration timing is embedded in the display/edit image in substantially the same procedure as that in step S1513. That is, watermark management information having a use purpose="display/edit image" and embedding timing="transmission timing" of those of the corresponding image ID is read out from the watermark information management table 717, and is stored on the RAM 2002. The watermarking means 706 is launched, and the storage address of the image output from the watermarking means on the RAM 2002 if step S1513 is executed or the storage address of the image generated in step S1507 on the RAM 2002 if step S1513 is skipped, or the temporary file name created on the HDD 2009 or the like, the watermark management information stored on the RAM 2002, and an output destination of the watermark management information and the image embedded with a watermark stored on the RAM 2002 are passed to the watermarking means 706, thus requesting it to embed a digital watermark.

The watermarking means 706 embeds a digital watermark in the received image in accordance with the received watermark management information, and outputs the image embedded with the digital watermark on the RAM 2002 designated by the print image registration means 704. Upon completion of the digital watermark embedding process, the watermarking means 706 sends an end message to the print image registration means 704 and then ends.

Upon receiving the end message, the print image registration means deletes the watermark management stored on the RAM 2002.

In step S1516, the image generated in step S1507 if both the steps S1513 and S1516 are skipped, the image embedded with the digital watermark for the registration timing in step S1513 if step S1516 is skipped, or the image embedded with the digital watermark for the transmission timing if step S1516 is processed is stored in the local transmission box 713 as a display/edit image.

The user ID, image ID, and storage location stored on the RAM 2002 respectively in steps S1500, S1504, and S1511 are stored in the original image location management table 715, which has been described previously with reference to FIG. 12. The saving location field 1204 stores the path name of the original image file saved in step S1511 or the volume name and path name of the removable disk.

In step S1517, image registration information transfer data shown in FIG. 16 is prepared on the basis of the user ID and image ID which are stored or prepared in the respective steps above, the path name of an image file created in the local transmission box 713, and the server ID of the print server 121 recorded in advance in the HDD 2009, and is stored on the RAM 2002.

In step S1518, the number of original images to be processed is checked for the user, and if images to be processed still remain, the flow returns to step S1501.

In step S1519, all the image registration information transfer data prepared in step S1512 and stored on the RAM 2002 are combined to form a transfer data file, and the transfer data file is stored in the local transmission box 713. Transfer control information ("TRANS" tag; in FIG. 13) is appended to the header of the transfer data file.

If the image saving location is moved or copied within the print server 121, data in the original image location management table 715 is updated, and no image registration information transfer data is prepared and sent.

FIG. 16 shows an example of image registration information transfer data prepared in step S1507. A tag "<REG>" indicates that this tag is image registration information transfer data, and "OPE" represents the processing code (new registration, deletion, movement, copy) of the transfer data. On the other hand, parameters "ID", "CUST", and "SHOP" respectively indicate the image ID, the user ID, and the server ID of the print server 121.

Also, "./im012345.jpg" is the path name of the image file saved in the local transmission box 713 in step S1516. If the processing code is "deletion", since no image file need be transmitted, this item is not created. Furthermore, "./im012345.pls" is the path name of an image data use fee management data file corresponding to the image file saved in the local transmission box 613 in S1505 in image registration in the image server 111 (to be described later). Note that this item is not created if the processing code is other than "new registration".

<Image Registration in Image Server>

The flow of the print original image registration process in the image server 111 will be explained below. Original images to be registered on the image server 111 are mainly pay or fee images that all users can access. These images are normally brought in by the copyright holder or his or her agent using a removable disk such as a CD-ROM or the like.

The image server 111 registers the image data using the print image registration means 601, and sends transfer data indicating registration information to the center server 102 using the local transmission/reception control means 603. Transmission data is registered in the transmission/reception control means by storing a transfer data file in the local transmission box 613.

Since the process in the print image registration means 601 is nearly equivalent to that in the print image registration means 704 in the print server 121, that has been explained with reference to FIG. 15, only the difference will be explained below using the flow chart in FIG. 15 and the transfer data example in FIG. 16.

Since the process in the print image registration means 601 is done regardless of "user", and all users can retrieve display/edit images at their client computers 101, step S1500 is skipped.

Also, upon assigning image IDs in step S1504, neither comparison checking between the owner field 1203 in the original image location management table 612 and user ID nor selection upon display are required.

In step S1505, if the image to be newly registered is a pay image, an image data use fee is input at the KB 2008, and is saved as a file in the local transmission box 613 in the format of image use fee management data.

Furthermore, no "CUST" parameter in FIG. 16 is generated in the image registration information transfer data prepared in step S1517. Also, the file path of the image use fee management data file is appended, as shown in FIG. 16.

The processes other than those described above are the same as those of the print image registration means 704 of the print server 121.

<Image Registration in Center Server>

The image registration process in the center server 102 will be explained below using FIG. 4.

The image registration process in the center server 102 registers image information in the center server on the basis of image registration information transfer data and display/edit images sent by the image registration processes in the print server 121 and image server 111 described above. Note that "tags" or "parameters" in parentheses are values in the transfer data shown in the example of FIG. 13 or 16.

The center transmission/reception control means 407 receives the image registration information transfer data files and display/edit image files, and the image data use fee management data files if a new pay image is registered, which are sent from the image server 111 or print server 121, and stores them in the center reception box 419. The file to be stored is an image file embedded with a digital watermark if the digital watermark has been embedded by the image server 111 or print server 121.

The center transmission/reception control means 407 analyzes the transfer data files stored in the center reception box 419 in turn. If the analyzed transfer data file contains image registration information transfer data (<REG> tag), the means 407 extracts that transfer data from the transfer data file, and stores it in a temporary file on the HDD 1009. The control means 407 loads the image registration means 404 of the center server 1002 from the HDD 1009 or the like and maps and activates it on the RAM 1002. Also, the control means 407 passes the file name of the temporary file of the transfer data stored in the HDD 1009 and the source server ID described in the <TRANS> tag in the header in the transfer data file to the image registration means 404.

Figure 17:
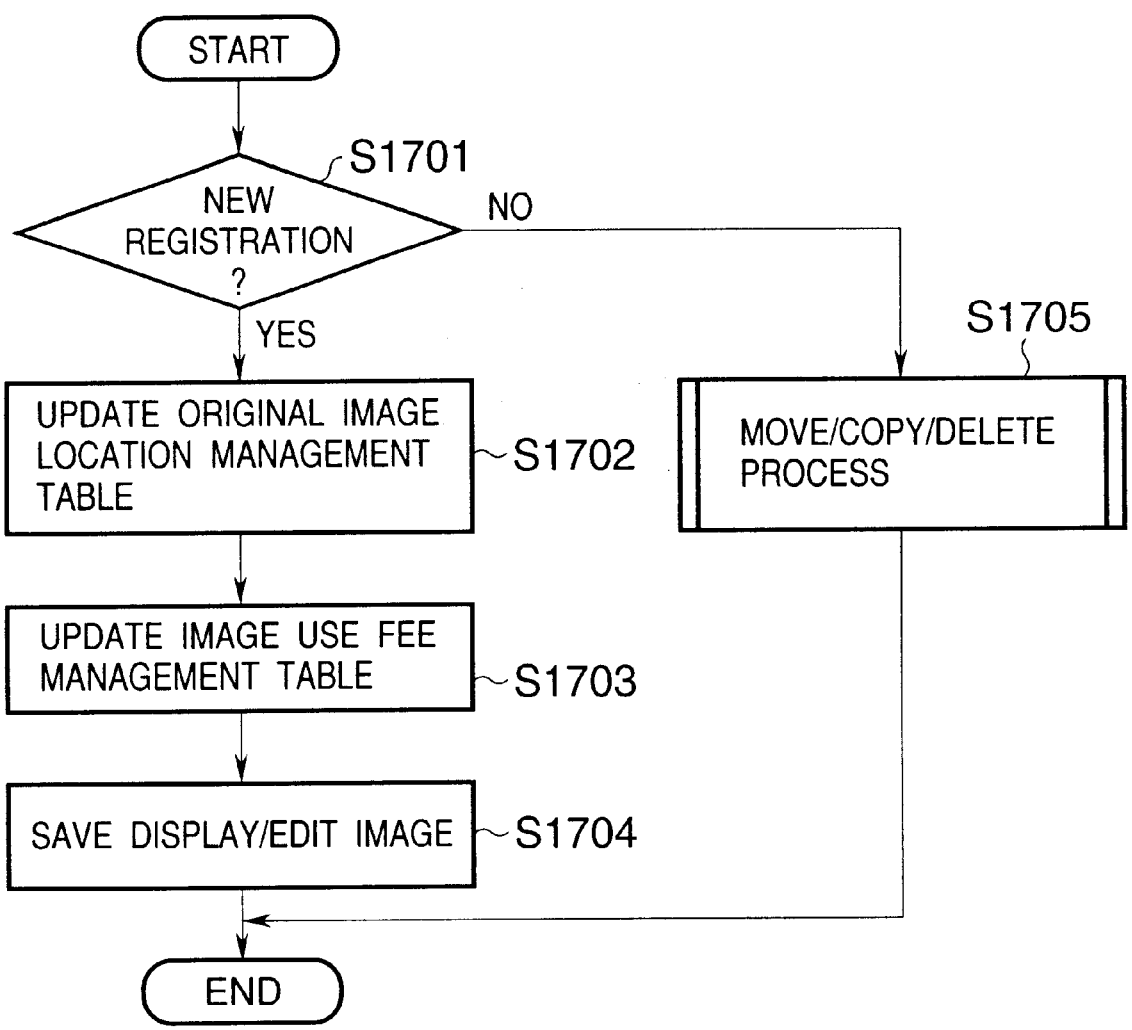
FIG. 17 is a flow chart showing an original image registration process in the center server.

FIG. 17 is a flow chart for explaining the image registration process in the image registration means 404 in the center server 102. The image registration means 404 executes processes for loading image registration information transfer data from the image server 111 or print server 121, reflecting that information in the original image location management table 412, and so forth.

The image registration means 404 opens the transfer file with the temporary file name passed from the center transmission/reception control means 407 upon launching, analyzes its contents, and stores the file in the RAM 1002. After that, the means 404 executes the process shown in the flow chart in FIG. 17. The process of the image registration means 404 will be explained using FIG. 17.

In step S1701, the processing code (<OPE> parameter) in the image registration information transfer data on the RAM 1002 is checked. If the processing code indicates "new registration" ("NEW"), the flow advances to step S1702; otherwise, the flow advances to step S1705.

In step S1702, the image ID (<ID> parameter) described in the image registration information transfer data, and the source server ID passed from the center transmission/reception control means 407 upon launching are added as new data to the original image location management table 412. At this time, if the user ID ("CUST" parameter) is included in the image registration transfer data, that value is stored in the owner field 1203 of the data added to the original image location management table 412.

In step S1703, an image file tag (<CAMLLINK>) in the image registration information transfer data is analyzed, and if an image data use fee management data file indicated by that tag is present, image data use fee management data is registered from that file in the image use fee management data 420.

In step S1704, an image file tag (<CAMLLINK>) in the image registration information transfer data is analyzed, a display/edit image file indicated by that tag is extracted from the center reception box 419, and is transferred to the display/edit image storage device 411. At this time, if the user ID ("CUST" parameter) is included in the image registration transfer data, the corresponding display/edit image file is stored in a directory, which can undergo access limitation in units of users by the document providing means 401. If no user is described in the image registration transfer data, the corresponding display/edit image file is stored in a directory, which can be viewed by all users.

Furthermore, in step S1704, the path name of the display/edit image file stored in the above process, and the image ID of that image are added as new data in the edit image location management table 417.

If display image information and edit image information are designated as independent image files in the image registration information transfer data, step S1704 is executed for the individual image files. The display and edit images are stored in different directories.

In step S1705, a movement, copy, or deletion process other than registration is done. A detailed description of this process will be omitted.

<Transmission File Registration Process>

Figure 34:
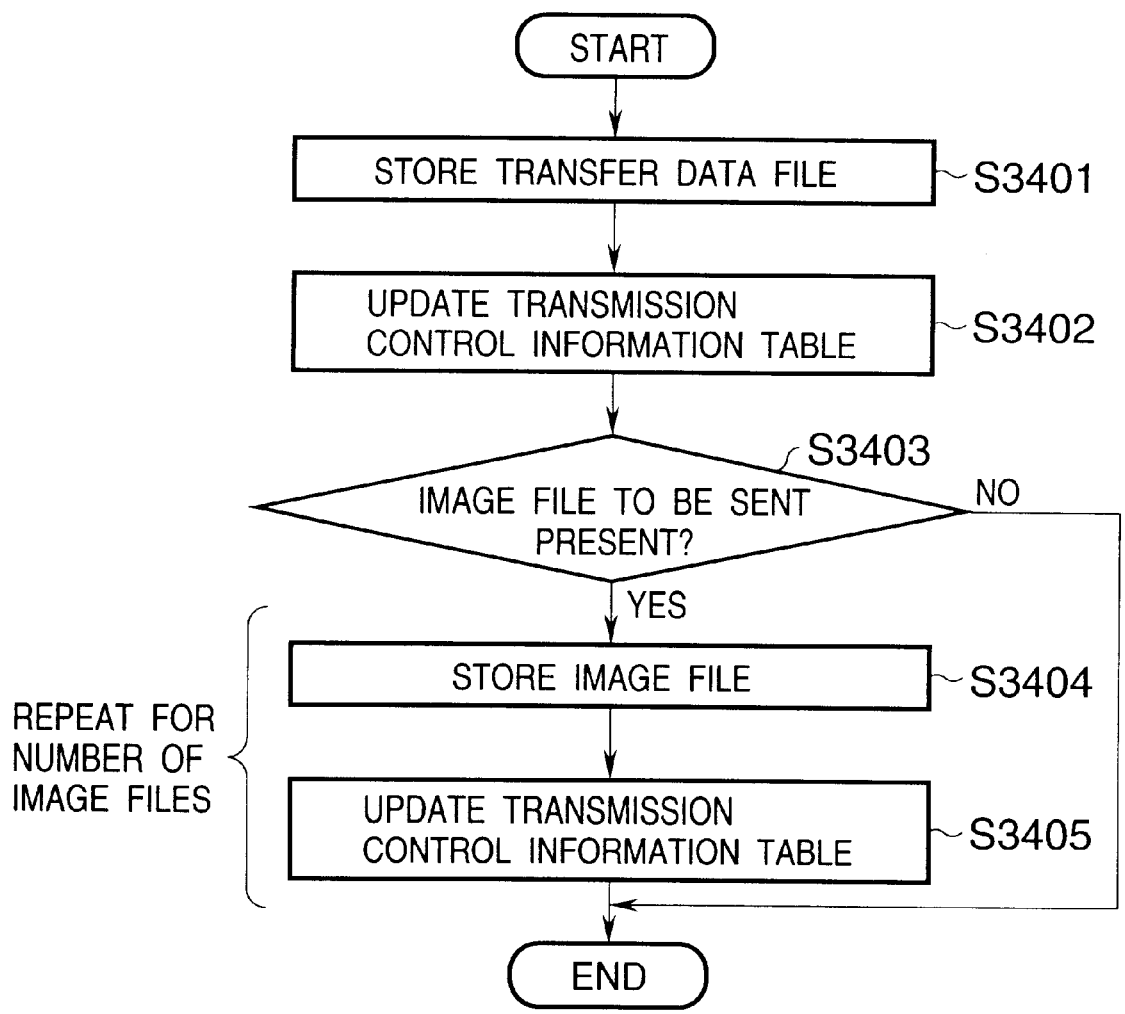
FIG. 34 is a flow chart showing a transmission file registration process in the transmission box.

FIG. 34 is a processing flow chart for explaining the transmission file registration process in the center server 102, image server 111, or print server 121. The transmission file registration process registers a transfer data file to be sent or the like in the transmission box 3001, and is done by the respective processing means such as the image retrieval means 405 and the like on the center server 102, image server 111, or print server 121. The processing means that executes the process must have already prepared transfer data to be sent, must be able to store the transfer data as the transfer data file 3004 with the format shown in FIG. 13, and must hold the destination server ID on the RAM 1002 or 2002. In addition, the file names of the transfer data file 3004 and image file 3005 to be stored must not become the same as those of already stored files by, e.g., using the processing time and random numbers in the file names.

In step S3401, transfer data to be sent is stored as a transfer data file 3004 in a destination dependent transmission box 3002 having the same name as the destination server ID held on the RAM 1002 or 2002.

In step S3402, transmission/reception control information data described above with reference to FIG. 32 is prepared on the basis of the file name of the transfer data file 3004 stored in step S3401, the file size of that file, and the current processing time, and is written in the transmission control information table 003.

It is checked in step S3403 if the transfer data includes a <CAMLLINK> tag. If YES in step S3403, the flow advances to step S3404; otherwise, this process ends.

Steps S3404 and S3405 are repeated in correspondence with the number of files such as images and the like indicated by the <CAMLLINK> tags in the transfer data so as to process the individual files.

In step S3404, a file designated in the <CAMLLINK> tag in the transfer data is stored as an image file 3005 in the destination dependent transmission box 3002 having the same name as the destination server ID held in the RAM 1002 or 2002.

In step S3405, transmission/reception control information data described above with reference to FIG. 32 is prepared on the basis of the file name of the image file 3005 stored in step S3404, the file name of the transfer data file 3004 stored in step S3401, the file size of that image file, and the processing time, and is written in the transmission control information table 3003.

<Data Transmission/reception Process in Print Server>

The center server 102 and print server 121 can be connected via the network 130, and dial-up connection or full-time connection from the print server 102 can be made. The network 130 can use arbitrary network forms, and this embodiment uses the Internet which is prevalently used. Also, the transfer protocol in the network 130 can use arbitrary protocols, and this embodiment uses the HyperText Transport Protocol (HTTP), File Transfer Protocol (FTP), and the like, which are popularly used on the Internet. The local transmission/reception control means 703 of the print server 121 and the center transmission/reception control means 407 are connected to each other via the network 130 using the aforementioned method, and execute a data transmission/reception process. Assume that the connection method from the print server 121 to the center server 102 is set in advance in the print server 121.

Figure 35:
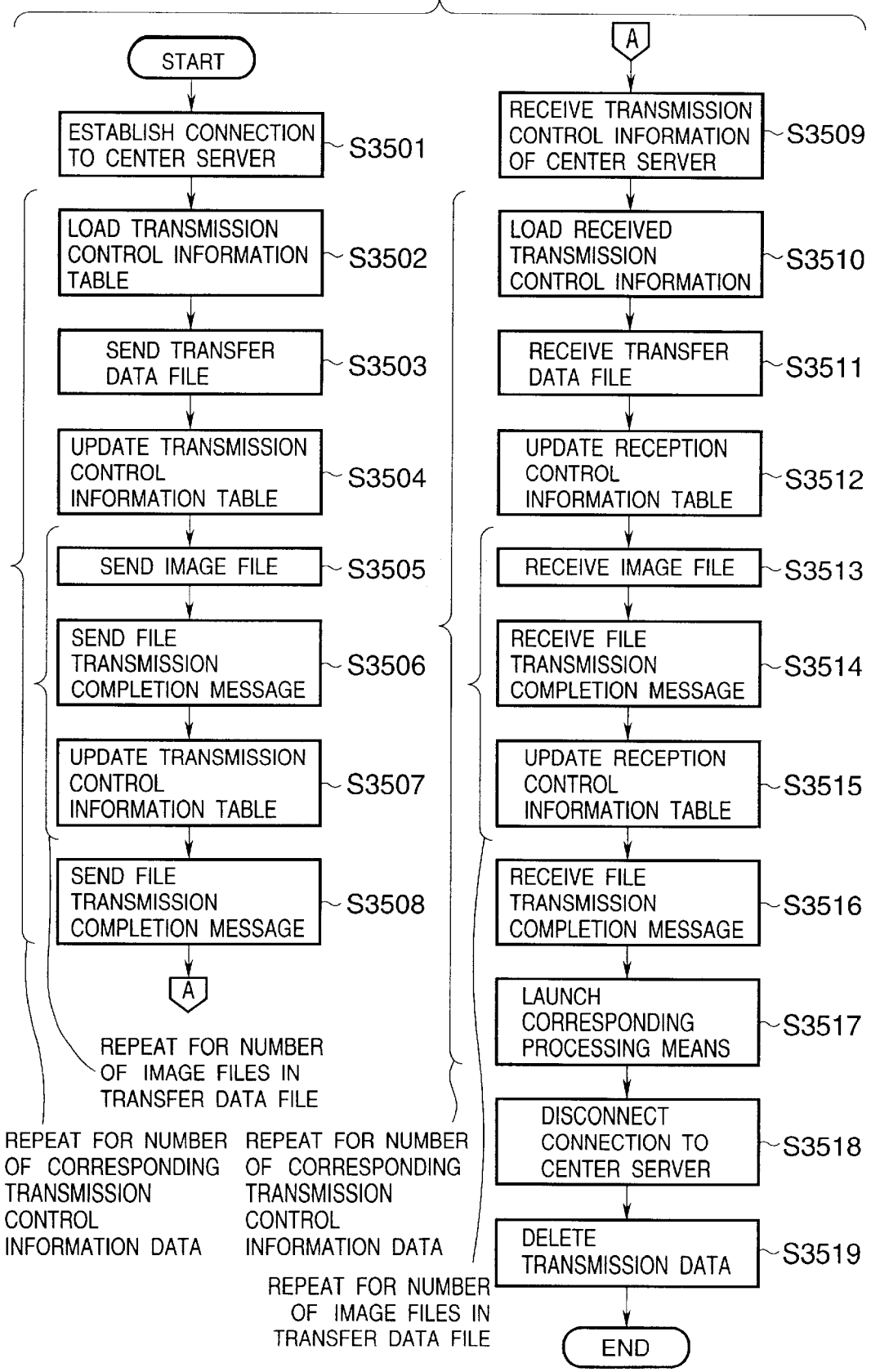
FIG. 35 is a flow chart showing a data transmission/reception process in the print server.

FIG. 35 is a flow chart showing the processing flow of the data transmission/reception process done by the local transmission/reception control means 603 of the image server 111 or the local transmission/reception control means 703 of the print server 121. Since the processes of the local transmission/reception control means 603 and 703 are equivalent to each other, the following explanation will be given using the local transmission/reception control means 703 of the print server 121. Note that the process of the center transmission/reception control means 407 of the center server 102 corresponding to this process will be described later with reference to FIG. 36.

In FIG. 35 and the following description, "message" is text data containing the server ID of the print server 121, a processing request and the like, and is exchanged by the HTTP or the like. Also, a file is exchanged using the FTP.

The local transmission/reception control means 703 of the print server 121 is loaded from the HDD 2009 or the like and is mapped and activated on the RAM 2002 by operating the KB 2008 by the operator or at a given time interval set in advance.

In step S3501, a connection to the center server 102 is established by sending, e.g., a dial-up connection request to the center server 102 in accordance with the connection method to the center server 102 set in advance in the print server 121. Then, a message that requests the directory names of the source dependent reception box 3102 and destination dependent transmission box 3002 for the print server 121 is sent to the center server, and a message containing the directory names is received from the center server 102 and is stored on the RAM 2002.

Steps S3502 to S3507 are repeated for transmission control information data, which have no entries in their transfer data file name field 3202 and transfer completion date field 3205, of those stored in the transmission control information table 3003 in the destination dependent transmission box 3002, i.e., for the individual data of transfer data files which are not sent yet. Note that the transmission control information data to be processed are processed in ascending order of value in the box storage date field 3204, i.e., in the order they were stored in the transmission box.

In step S3502, one transmission control information data that satisfies the condition in step S3502 is loaded from the transmission control information table 3003 in the destination dependent transmission box 3002 for the center server 102, and is stored on the RAM 2002.

In step S3503, a transfer data file 3004 indicated by the contents of the transfer file name field 3201 in the transmission control information data stored in step S3502 is loaded, and is sent so that it is stored in the directory of the source dependent reception box 3102 of the center server 102, which is stored in step S3501.

In step S3504, the current date and time are set in the transmission completion date field 3205 in the transmission control information data stored in step S3502, and the transmission control information table 3003 is updated by overwriting that transmission control information data on data, which has the same value in the transfer file name field 3201 as the transfer data file name of that transmission control information data, in the transmission control information table 3003.

Steps S3505 to S3507 are repeated for transmission control information data, which have the same value in their transfer data file name field 3202 as the transfer data file name of the transfer control information data stored in step S3502, of those in the transmission control information table 3003.

In step S3505, one transmission control data that satisfies the aforementioned condition is loaded from the transmission control information table 3003, and is stored on the RAM 2002. An image file 3005 designated by the value in the transfer file name field 3201 of the stored transmission control information data is loaded, and is sent so that it is stored in the directory of the source dependent reception box 3102 in the center server 102, which is stored in step S3501.

In step S3506, a message which includes the transmission control information data stored in step S3505 and informs completion of file transmission is sent.

In step S3507, the current date and time are set in the transmission completion date field 3205 in the transmission control information data stored in step S3505, and the transmission control information table 3003 is updated by overwriting that transmission control information data on data, which has the same value in the transfer file name field 3201 as the transfer data file name of that transmission control information data, in the transmission control information table 3003.

In step S3508, a message which includes the transmission control information data, which is stored in step S3502 and whose processing is underway, and informs completion of file transmission is sent.

In step S3509, the transmission control information table 3003 in the source dependent reception box 3102 for the print server 121 in the center server 102 is received as a file. The received file is temporarily saved in a temporary area on the HDD 2009.

Steps S3510 to S3517 are repeated for transmission control information data which have no entries in their transfer data file name field 3202 and transfer completion date field 3205, of those stored in the transmission control information table 3003 saved in the HDD 2009 in step S3509 and received from the center server 102, i.e., data of transfer data files which are not sent yet. Note that the transmission control information data to be processed are processed in ascending order of value in the box storage date field 3204, i.e., in the order they were stored in the transmission box.

In step S3510, one transmission control information data that satisfies the condition in step S3510 is loaded from the transmission control information table received from the center server 102, and is stored on the RAM 2002.

In step S3511, a transfer data file designated by the value in the transfer file name field 3201 in the transmission control information data stored in step S3510 is received from the center server 102, and is stored as a transfer data file 3105 in the source dependent reception box 3102 for the center server.

In step S3512, the current date and time are set in the transfer completion date field 3205 in the transmission control information data stored in step S3510, and that transmission control information data is added to the reception control information table 3104 in the source dependent reception box 3102 for the center server.

Steps S3513 to S3515 are repeated for transmission control information data, which have the same value in their transfer data file name field 3202 as the transfer file name of the transmission control information data stored in step S3510, of those received from the center server 102.

In step S3513, one transmission control information data that satisfies the above condition is loaded from the temporary area on the HDD 2009 saved in step S3509, and is stored on the RAM 2002. An image file designated by the value in the transfer file name field 3201 in that transmission control information data is received from the center server 102, and is stored as an image file 3106 in the source dependent reception box 3102 for the center server.

In step S3514, a message which includes the transmission control information data stored in step S3513 and informs completion of file reception is sent.

In step S3515, the current date and time are set in the transfer completion date field 3205 in the transmission control information data stored in step S3513, and that transmission control information data is added to the reception control information table 3104 in the source dependent reception box 3102 for the center server.

In step S3516, a message which includes the transmission control information data, which is stored in step S3510 and whose processing is underway, and informs completion of file reception is sent.

In step S3517, the transfer data file 3105 received and stored in step S3511 is read out onto the RAM 2002, and its contents are analyzed to extract all transfer data tags indicated by <ORDER> tags in FIG. 13 and the like. The processing means information table 3103 is searched using the individual values of the transfer data tags to extract processing means information data having the same values in their transfer data tag name field 3301 as those of the transfer data tags extracted in the above process, and the corresponding processing means are launched in accordance with the contents of the processing means launching method field 3302 and pass data information field 3303.

In step S3518, if the print server is connected to the center server 102 by the dial-up protocol, connection to the center server 102 is disconnected.

In step S3519, the transmission control information table 3003 in the destination dependent transmission box 3002 for the center server 102 is searched to delete transmission control information data in which the value in the transfer completion date field 3205 is a predetermined period before the current time from the transmission control information table 3003, and to delete the transfer data file 3004 or image file 3005 designated by the value in the transfer file name field 3201 in that transmission control information data. The transmission control information data and transmission files are not deleted immediately after completion of transmission since they may be re-sent upon occurrence of transfer errors.

Note that the processing means such as the order output management means 701 or the like launched in step S3517 deletes a transfer data file 3105 and image file 3106 located under that transfer data file from the reception box 3101 upon completion of the processing of that transfer data file 3105, and deletes data, which has the same value in the transfer file name field 3201 as the file name of the deleted file, in the reception control information table 3104.

When the processing is interrupted by any network failure during data transmission/reception in this embodiment, it is redone from the beginning. Even in such case, the already sent or received image file is never re-sent or re-received.

<Data Transmission/reception Process in Center Server>

Figure 36:
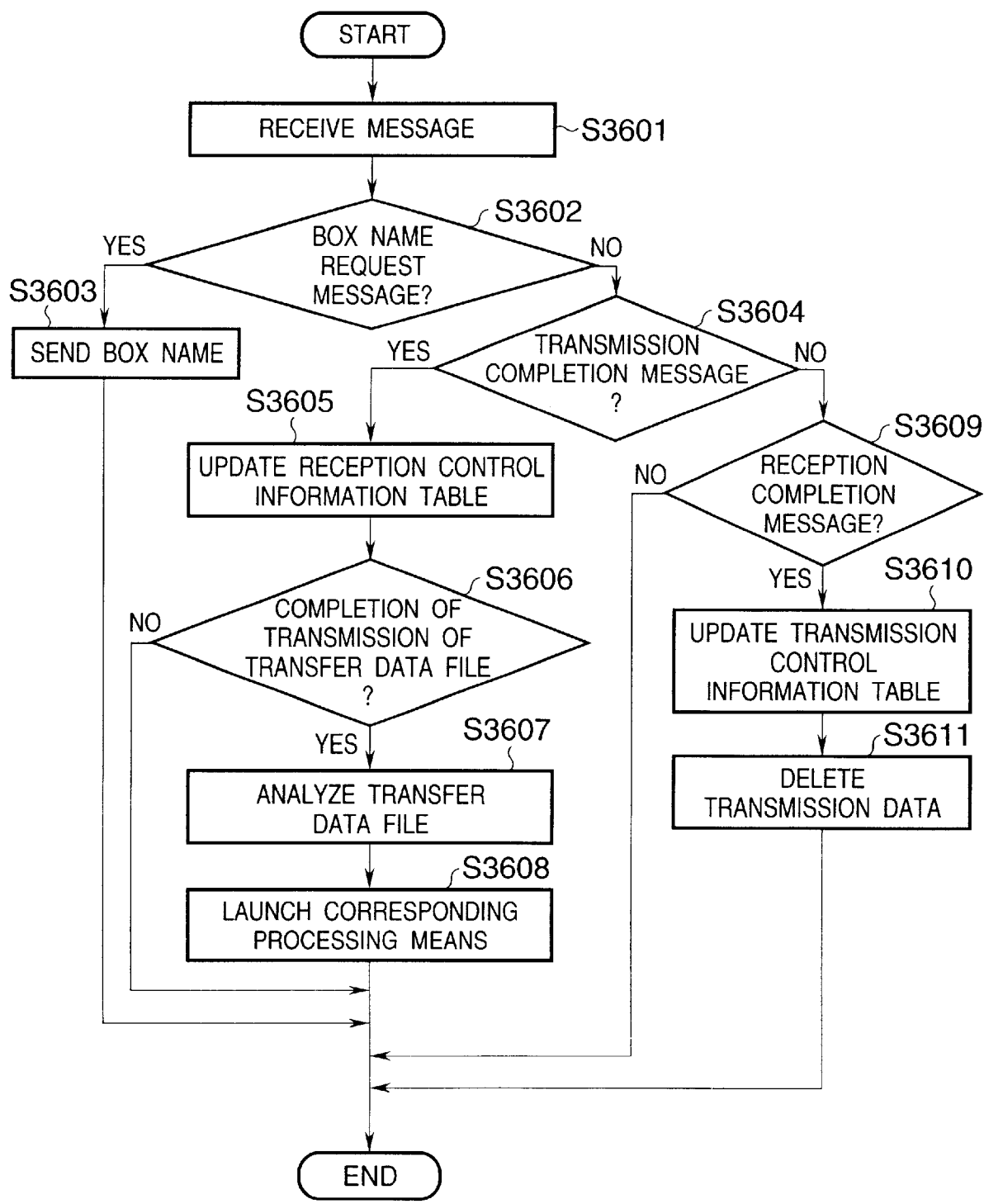
FIG. 36 is a flow chart showing a data transmission/reception process in the center server.

FIG. 36 is a processing flow chart for explaining the data transmission/reception process in the center transmission/ reception control means 407 of the center server 102.

The center transmission/reception control means 407 receives a message sent from the local transmission/ reception control means 603 of the image server 111 or the local transmission/reception control means 703 of the print server 121, and executes its processing. In this embodiment, since the HTTP is used as a protocol, the document providing means 401 receives the sent message, and maps and launches the center transmission/reception control means 407 on the RAM 1002 so as to make the means 407 execute the processing. The launching method is the same as that of the edit image providing means 402; actual data transmission/reception is done by the document providing means 401, and transmission/reception data is exchanged between the center transmission/reception control means 407 and local transmission/reception control means 703. The transmission/reception control means ends upon completion of the processing for one message.

Referring to FIG. 36, a message received from the document providing means 401 via the RAM 1002 is analyzed in step S3601 to check the contents of the message.

It is checked in step S3602 if the contents of the message checked in step S3601 are a message which is sent in step S3501 in FIG. 35 and requests the transmission/reception box directory names. If YES in step S3602, the flow advances to step S3603; otherwise, the flow advances to step S3604.

In step S3603, the directory name of the destination dependent transmission box 3002 and that of the source dependent reception box 3102, which have as the directory name the server ID of the image server 111 or print server 121 as a message source contained in the message analyzed in step S3601, are checked based on that server ID, and the found directory names are passed to the document providing means 401 via the RAM 1002, thus sending back the directory names.

It is checked in step S3604 if the contents of the message checked in step S3601 are a message, which is sent in steps S3505 and S3508 in FIG. 35, and informs completion of file transmission. If YES in step S3604, the flow advances to step S3605; otherwise, the flow advances to step S3609.

In step S3605, the transmission control information data contained in the message analyzed in step S3601 is added to the reception control information table 3104.

In step S3606, the value of the transfer data file name field 3202 in the transmission control information data contained in the message analyzed in step S3601 is checked. If the transfer data file name field has no entry, the flow advances to step S3607; otherwise, the processing ends.

In step S3607, a transfer data file 3105 designated by the value in the transfer file name field 3201 in the transmission control information data contained in the message analyzed in step S3601 is read out onto the RAM 1002, and its contents are analyzed to extract all transfer data tags such as <REG> tags and the like in FIG. 13. The processing means information table 3103 is searched using the individual values of the transfer data tags to extract processing means information data having the same values in their transfer data tag name field 3301 as those of the transfer data tags extracted in the above process, and the corresponding processing means are launched in accordance with the contents of the processing means launching method field 3302 and pass data information field 3303.

It is checked in step S3609 if the contents of the message checked in step S3601 are a message which is sent in steps S3512 and S3515 in FIG. 35 and informs completion of file reception. If YES in step S3609, the flow advances to step S3610; otherwise, the processing ends.

In step S3610, the reception control information table 3104 is searched based on the value in the transfer file name field 3201 in the transmission control information data contained in the message analyzed in step S3601 so as to write the current date and time in the transfer completion date field of the corresponding transmission control information data.

In step S3611, the transmission control information table 3003 in the destination dependent transmission box 3002 for the server ID of the message source, which is contained in the message analyzed in step S3601, is searched to delete transmission control information data in which the value in the transfer completion date field 3205 is a predetermined period before the current time from the transmission control information table 3003, and to delete the transfer data file 3004 or image file 3005 designated by the value in the transfer file name field 3201 in that transmission control information data. The transmission control information data and transmission files are not deleted immediately after completion of transmission since they may be re-sent upon occurrence of transfer errors.

The center transmission/reception control means 407 can directly communicate with the local transmission/reception control means 603 or 703 without the intervention of the document providing means 401, when it resides on the RAM 1002. In such case, the means 407 repeats a process for waiting for data transmission, executing the processing flow in FIG. 36 upon receiving data, and then waiting for data transmission.

<Order Submission Process>

Figure 18:
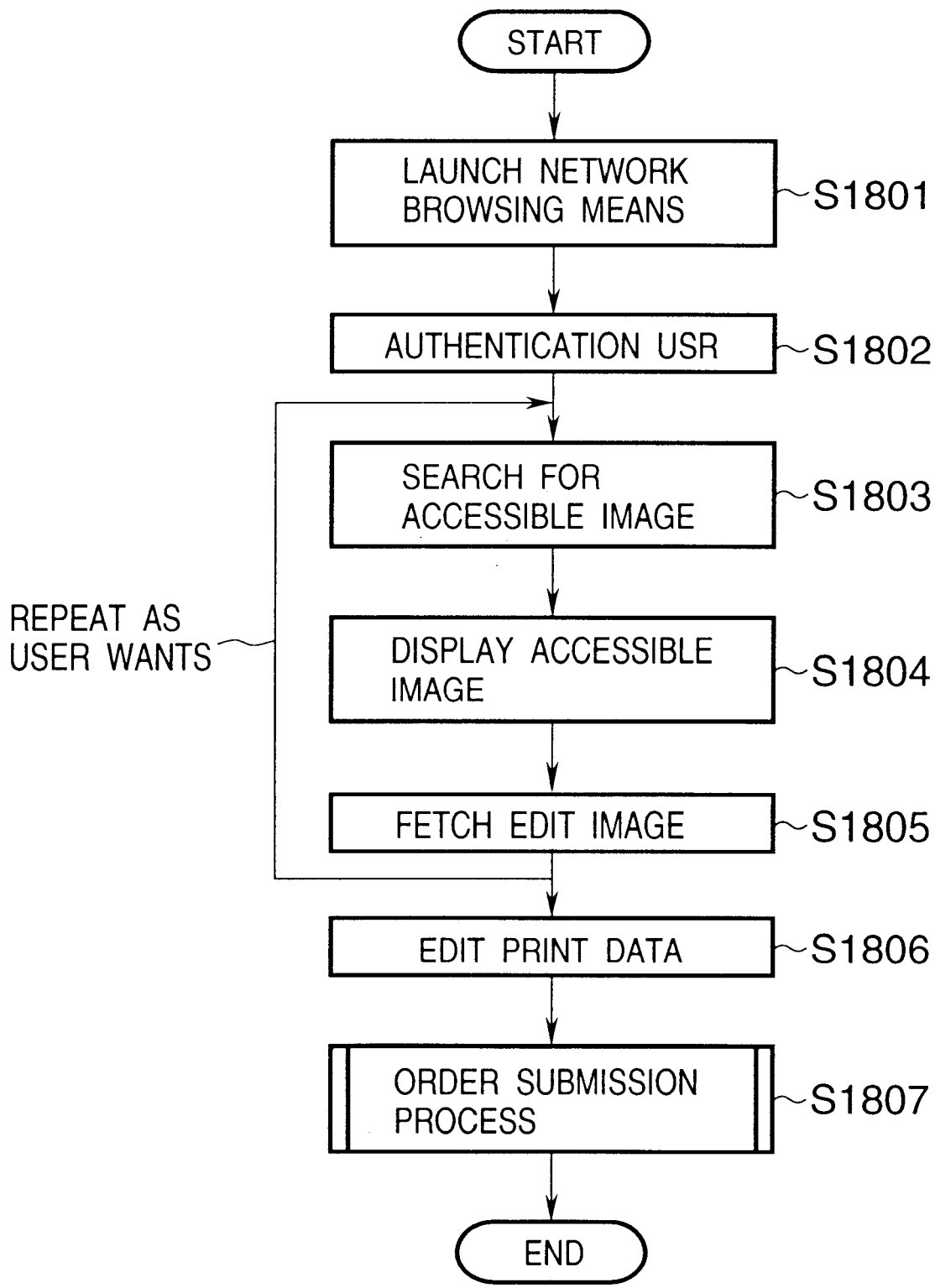
FIG. 18 is a flow chart showing a print order submission and reception process.

FIG. 18 is a processing flow chart for explaining the print order submission process from the client computer 101 and the order reception process in the center server 102. Note that the network browsing means 502 in the client computer 101 and the document providing means in the center server 102 communicate with each other using the HyperText Transfer Protocol (HTTP) and File Transfer Protocol (FTP) as transfer protocols prevalently used in the Internet, and the data processing means 501 and expansion means 503 exchange data using an inter-process communication function.

In step S1801, the user loads the network browsing means 502 from the HDD 1009 or the like using the function of the data processing means 501, maps and activates it the means 502 on the RAM 1002, and makes the network browsing means 502 connect to the center server 102. Furthermore, the network browsing means 502 loads the expansion means 503 from the HDD 1009 or the like, and maps and activates it on the RAM 1002.

In step S1802, the function of the document providing means 401 of the center server 102 makes the user input the user ID and password to authenticate the user. If the user authentication fails, an error is produced, and the subsequent steps are canceled.

In step S1803, the document providing means 401 loads the edit image providing means 402 from the HDD 1009 and maps and activates it on the RAM 1002, and the edit image providing means 402 searches the edit image location management table 417 for images that the user can access and returns the image IDs and URLs (the names that the network browsing means 502 and expansion means 503 can refer to) of those images to the expansion means 503. In this case, accessible images to be processed are those which are registered from the print server 121 and entitled to that user, and those which are registered from the image server 111, and can be accessed by all users. Since there are a plurality of images to be processed, the user inputs a display condition at the KB 2008, and the expansion means 503 sends that display condition to the edit image providing means 402 to reduce the number of pairs of image IDs and URLs sent from the edit image providing means 402 to the expansion means 503.

In step S1804, the expansion means 503 requests the document providing means 401 to provide images using the URLs retrieved from the edit image providing means 402 in step S1803, the document providing means 401 extracts designated display/edit image files from the display/edit image storage device 411 and sends them to the expansion means 503, and the expansion means 503 displays the obtained image files on the CRT 1006 via the network browsing means 502.

In step S1805, the user selects a desired one of the images displayed on the CRT 1006 in step S1804 at the KB 1008, and the expansion means 503 sends the designated image ID and a display/edit image file corresponding to that image to the data processing means 501. The data processing means 501 saves the display/edit image file in a temporary area in the HDD 1009, prepares a correspondence table of the image ID and the saved image file name, and stores it on the RAM 2002. In this case, if the display/edit image file has, for example, the JFIF format or the like, in which additional information can be written, and the image ID is written in the image file upon generation of an image in the image server 111 or print server 121, or upon sending the image from the center server 102 to the client computer 101, that correspondence table may be omitted.

Steps S1803 to S1805 are repeated until the user fetches all desired image files in the data processing means 501.

In step S1806, the user creates document data as a print image using the edit images and the like fetched in step S1805 by making input operations and the like to the data processing means 501 at the KB 1008. The document data is the document 1401 shown in the example in FIG. 14, and the edit images fetched in step S1805 are displayed on the CRT 1006 as image data 1403 and 1404. The data processing means 501 generates script data (1402 in the example in FIG. 14) that describes the edit contents of the edited document data. The data processing means 501 searches the correspondence table of the edit image files and image IDs stored in step S1805 or reads out image IDs written in the edit image files, and stores the image IDs corresponding to the image data used in the document 1401 in the script 1402. The script 1402 is saved in a temporary area on the HDD 1009 or in the RAM 1002 upon completion of editing.

The user repeats step S1806 a desired number of times to prepare document data.

If the display/edit images handled in steps S1804 to S1806 are stored in the center server 102 with digital watermarks embedded, they are handled with the digital watermark like image data 1403 in FIG. 14.

In step S1807, a tentative order submission process and order reception process are done. The tentative order submission process sends sub-orders 802 and order items 803 that form a print order from the client computer 101 to the center server 102 and stores them in the center server 102.

In step S1807, the user submits an order of a document to be printed to the center server 102. The order submission process will be described in detail below with reference to FIG. 41.

<Status Transition of Order Submission Process>

Figure 41:
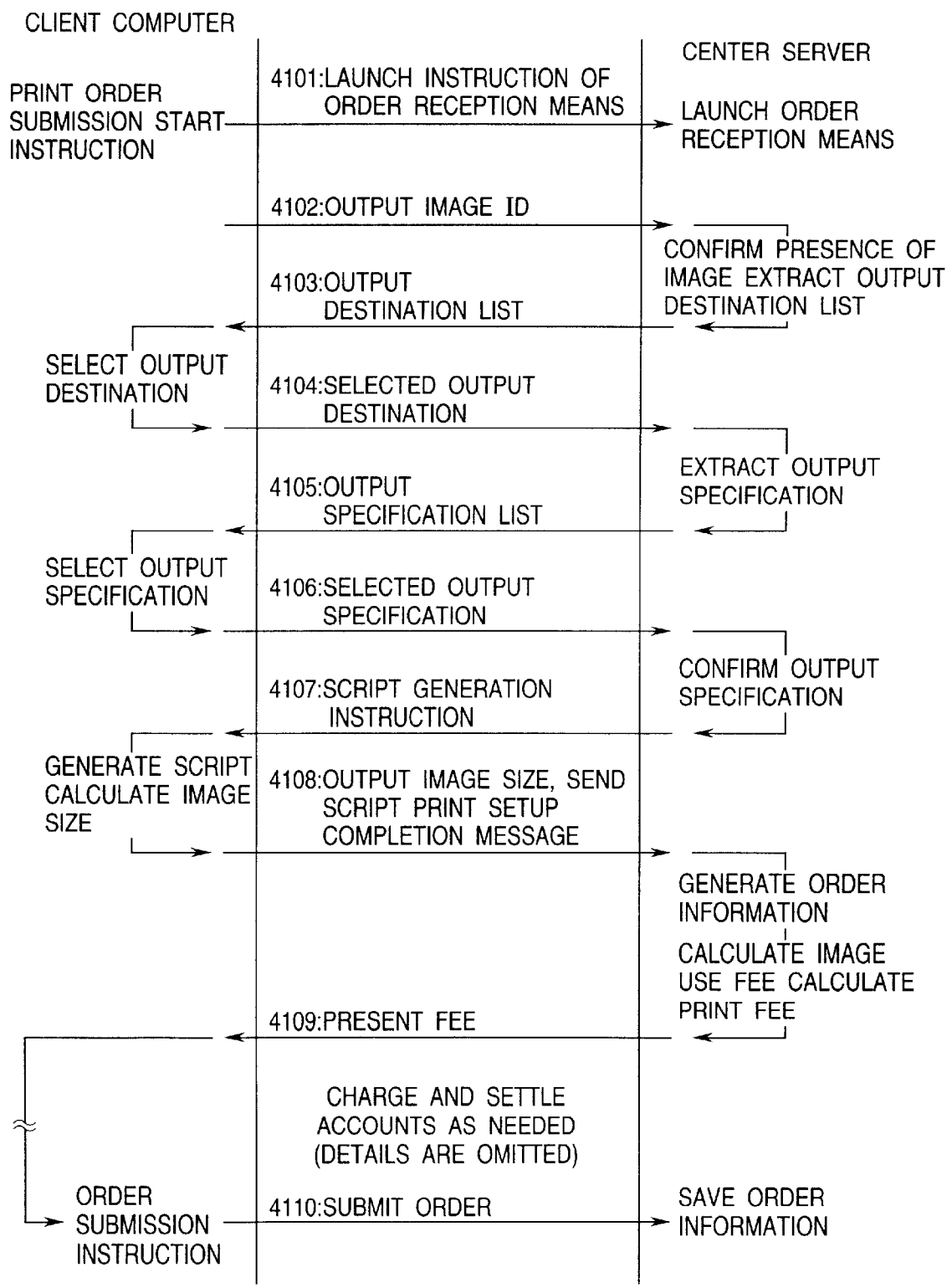
FIG. 41 is a status transition chart upon executing the order submission process.

FIG. 41 is a status transition chart between the client computer 101 and center server 102 in the order submission process.

The user selects one or more documents to be printed at the client computer 101, and issues an order submission start instruction to the data processing means 501. The data processing means 501 reads out document data that the user has designated by the above operation from the HDD 1009 or RAM 1002, extracts all image IDs of image data contained in that document data, and sends them to the expansion means 503. The expansion means 503 sends a launch instruction of the order reception means 403 to the document providing means 401 of the center server 102. Then, the expansion means 503 sends the image ID sequence contained in that document to the document providing means 401. Upon receiving the launch instruction, the document providing means 401 loads the order reception means 403 from the HDD 109 or the like, maps and activates it on the RAM 1002, and passes the image ID sequence received from the expansion means 503 to the activated order reception means 403 (4101 and 4102 in FIG. 41).

The order reception means 403 receives the image ID sequence from the document providing means 401 in step S1807, and searches the original image location management table 412 to confirm if images identified by the image IDs contained in the image ID sequence are present. This is to prevent print errors produced when images have already been deleted by the deletion process, and if the image IDs are not found, an error message is sent to the expansion means 503, which displays the contents of the error message on the CRT 1006, thus informing the user of the error contents. The order reception means 403 generates an order ID 902 on the basis of the user ID of the user and the like, and stores it on the RAM 1002. The order reception means 403 then searches the server management table 413 to read out the server IDs of the print servers, and sends them to the expansion means 503 together with the order ID (4103 in FIG. 41).

The expansion means 503 displays the server ID list on the CRT 1006, and the user selects a desired print server using the KB 1008 as a print-out destination in the expansion means 503. The expansion means 503 sends the server ID of the selected print server to the order reception means 403 (4104 in FIG. 41).

Upon receiving the server ID of the selected print server, the document providing means 401 passes the server ID to the order reception means 403. The order reception means 403 stores the server ID on the RAM 1002, retrieves data that stores the printable size 1104 and corresponding paper 1105 corresponding to the server ID from the server management table 413, and sends them to the expansion means 503 (4105 in FIG. 41).

The expansion means 503 displays a printable size list and corresponding paper list on the CRT 1006, and selects a desired print paper size and corresponding paper using the KB 1008 in the expansion means 503. Also, the user designates the number of copies, and the expansion means 503 sends the selected print size and corresponding paper to the order reception means 403 (4106 in FIG. 41).

The order reception means 403 confirms based on the selected print size and corresponding paper if data is printable, and then stores them on the RAM 1002 together with the number of copies. The order reception means 403 then sends a generation instruction of a script and image size transmission data to the expansion means 503 together with the printer type and print size (4107 in FIG. 41).

The expansion means 503 requests the data processing means to generate a script corresponding to the printer type and print size sent from the order reception means 403 for the document in the print order in accordance with the received instruction, and to generate image size transmission data on the basis of the actual print size of image data used in the document, which is calculated upon generating the script. The image size transmission data is sent as an image size transmission data file to the order reception means 403 via the expansion means 503 together with the script. Then, a print setup end message is sent (4108 in FIG. 41).

In response to the end message received by the document providing means 401, the script and image size transmission data file received from the expansion means 503 are passed to the order reception means 403. The order reception means 403 analyzes the script received from the document providing means 401 to extract information such as edit information, image IDs, and the like that form sub-orders 802 explained previously with reference to FIG. 8, and stores them in the order management table 416 as order information of the order ID stored in the RAM 1002. Also, the order reception means 403 extracts the actual print sizes of images from the image size transmission data, and stores them in items having the image IDs in the corresponding sub-orders 802. Furthermore, the order reception means 403 stores in the order information the number of copies, paper size, and corresponding paper stored in the RAM 1002.

The order reception means 403 loads the image use fee calculation means 408 from the HDD 1009 or the like and maps and activates it on the RAM 1002, and passes the printer type, print paper size, corresponding paper, and image size transmission data file stored in the RAM 1002 to the image use fee calculation means 408. The image fee calculation means 408 calculates the image use fees of pay images on the basis of the data passed from the order reception means 403. This calculation process will be explained in detail later with reference to the corresponding flow chart.

The order reception means 403 calculates a print fee in addition to the data use fees of pay images, stores them on the RAM 1002, and also sends them to the expansion means 503 (4108 in FIG. 41).

The expansion means 503 displays the print fee and data use fees of pay images on the CRT 1006. The user settles accounts as needed. Finally, an order submission instruction indicating the end of the order submission process is sent to the document providing means 401.

Upon receiving the order submission instruction, the document providing means 401 informs the order reception means 403 of reception of that instruction, and stores the print fee in the order information as needed, thus ending the processing.

With the aforementioned process, the order submission process in step S1807 in FIG. 18 is completed, and the control advances to the next image retrieval source determination process to print the document.

In this embodiment, the data processing means 501 calculates the image size. However, the present invention is not limited to this, and upon receiving the script, the order reception means 403 may calculate the image size by analyzing the script.

<Image Data Use Fee Calculation Process>

In the order submission process, if an image contained in the document to be printed is a pay image, the data use fee is calculated on the basis of various conditions such as the printer as the print destination, paper type, and the like, and the actual size of the image upon printing.

Figure 42:
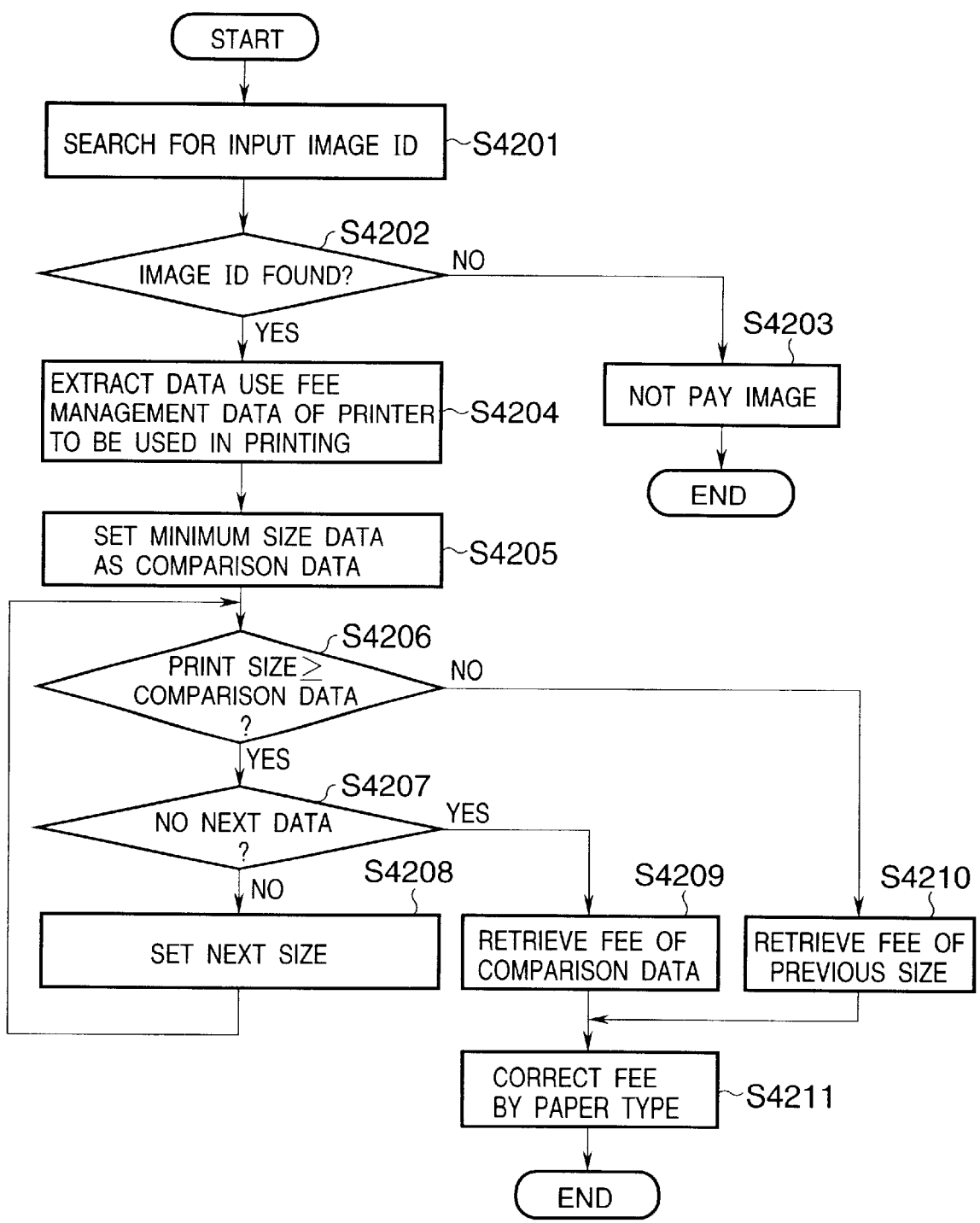
FIG. 42 is a flow chart showing a pay image data use fee calculation process in the center server.

FIG. 42 is a flow chart for explaining the data use fee calculation process of pay image data in the image use fee calculation means 408. FIG. 42 shows the process for one image. In the transition state 4108 in FIG. 41 above, the image use fee calculation means 408 is called with respect to a plurality of images having image IDs stored in the image size transmission data file. In this case, the following process shown in FIG. 42 is repeated for all the image IDs, i.e., all the images which must undergo the calculation process. Also, this process is executed under the condition that the order reception means 403 inputs an image ID, actual print size, print destination printer type, and corresponding paper to the image use fee calculation means 408.

In step S4201 in FIG. 42, the basic fee table 3910 in the image use fee calculation table 420 is searched using the input image ID so as to check if the input image ID to be processed indicates pay image data.

In step S4202, the search result in step S4201 is checked, and if the corresponding data is not found by search, the flow advances to step S4203. On the other hand, if the image ID is found, the flow advances to step S4204.

Step S4203 is executed when the corresponding image ID is present. That is, since the image ID is not present in the basic fee table 3910, it is determined that the corresponding image is not a pay image, and a message indicating that is output, thus ending this process.

In step S4204, all basic fee data, which have image IDs that match the input image ID and have the designated printer type, in the basic fee table 3910 are extracted onto the RAM 1002. At this time, the extracted data are stored as a data sequence in ascending order of the value in the actual print size field 3903.

In step S4205, the first data in the data sequence is set as data to be compared. In step S4206, the input actual print size is compared with the value in the actual print size field 3903 of the basic fee data to be compared to check if the input actual print size is equal to or larger than that of the data to be compared. If the input actual print size is equal to or larger than that of the data to be compared, the flow advances to step S4207; otherwise, the flow advances to step S4210. In this embodiment, when the input actual print size is smaller than the data to be compared in the first comparison, it means that the data use fee must be charged irrespective of the actual print size when the pay image data is used. Hence, such situation does not normally occur.

It is checked in step S4207 if the basic fee data sequence extracted in step S4204 includes data next to the current data to be compared. If data to be compared still remains, the flow advances to step S4208; otherwise, the flow advances to step S4209.

In step S4208, the next data is set to be the basic fee data to be compared, and the flow returns to step S4206.

Step S4209 is executed when no more larger actual print size value 3903 is present. That is, the value in the data use fee field 3904 of the current basic fee data to be compared is stored in the RAM 1002 as the basic fee, and the flow advances to step S4211.

Step S4210 is executed when it is determined in step S4206 that the input actual print size is smaller. That is, the value in the data use fee field 3904 in the previous basic fee data of the current data to be compared in the basic fee data sequence extracted in step S4204 is stored as the basic fee in the RAM 1002, and the flow advances to step S4211.

In step S4211, the fee correction table 3020 is searched for fee correction data in which the values in the correction printer type field 3905 and output paper type field 3906 match the input print destination printer type and corresponding paper. If the matching data is found, the value in the fee correction coefficient 3907 of the matching data is retrieved from the fee correction table 3920, and the basic fee stored in the RAM 1002 is multiplied by the correction coefficient, thus obtaining the image data use fee. If no match is found in the fee correction table 3920, the basic fee stored in the RAM 1002 is used as the image data use fee.

In this manner, the data use fee of a pay image is calculated.

<Image Retrieval Source Determination Process>

After the print order is submitted in the print order submission process, the center server 102 issues a print request to the print server 121 as the output destination. In this case, the image server 111 or print server 121, which saves print original images identified by the image IDs contained in that order, is specified. If a given print original image is present on a plurality of servers, a process for selecting a server that requires the lowest transfer cost upon sending the image to the destination print server 121 via the center server 102 is done.

The image retrieval means 405 executes this process. Upon completion of the order submission process, the image retrieval means 405 is loaded from the HDD 1009 or the like and is mapped and activated on the RAM 1002 by the order reception means 403. At this time, the order ID of the print order received by the order reception means 403 in the order submission process is passed to the image retrieval means 405.

Figure 19:
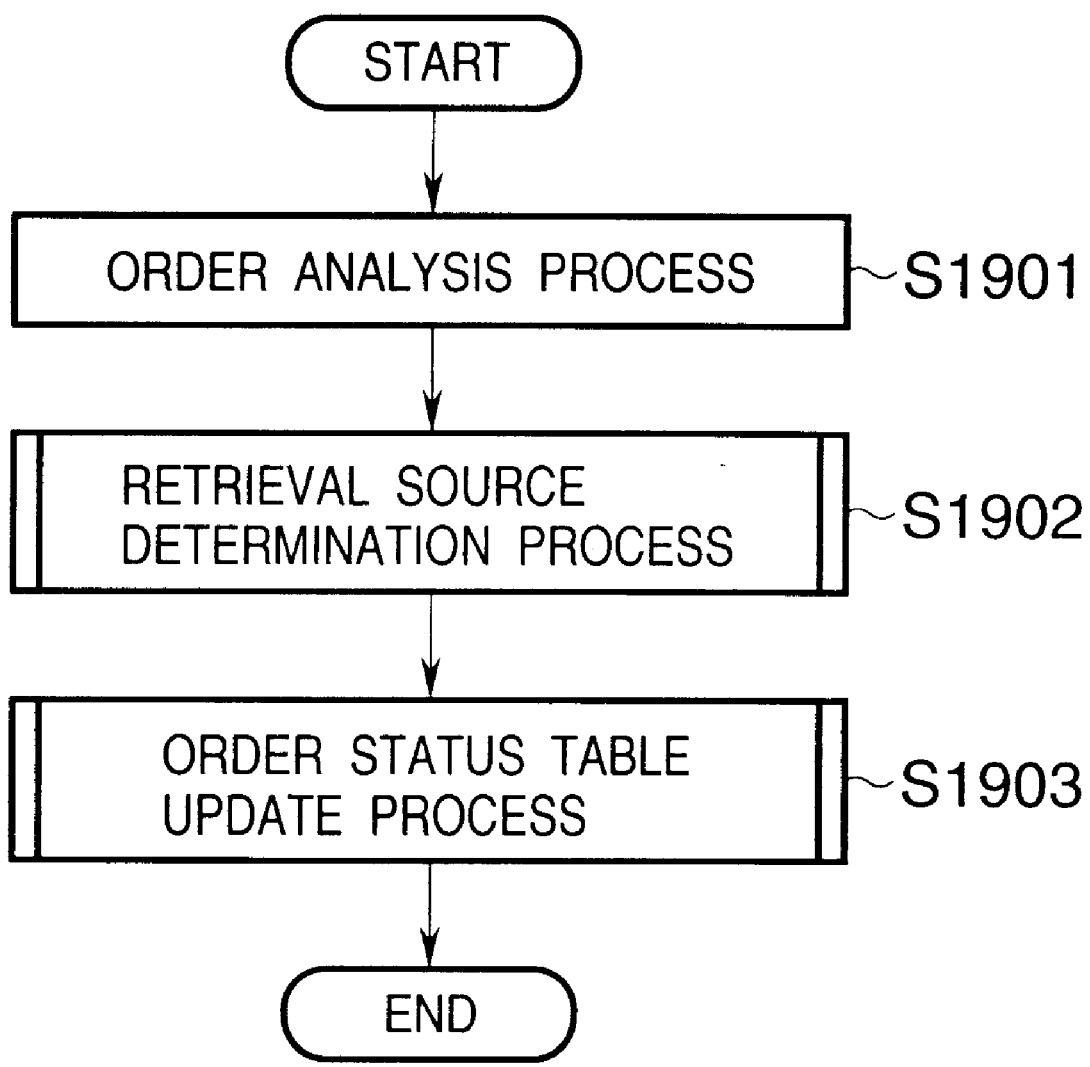
FIG. 19 is a flow chart showing an image retrieval source determination process in the center server.

FIG. 19 is a flow chart for explaining the image retrieval source determination process in the image retrieval means 405.

In step S1901, the image retrieval means 405 searches the order management table 406 on the basis of the order ID passed from the order reception means 403 to read data of the print order, stores its contents in the RAM 1002, and adds data to the order status table 415. Of the data to be added to the order status table 415, "before image retrieval" is set in the status field 204 of all data which have entries in their image ID field. Also, "image retrieval in progress" is set in the status field 204 of data which have no entries in the image ID field of the added data. This is preparation for the following process for reliably retrieving all images required for printing.

In step S1902, the data stored in the order status table in step S1901 are loaded in turn to search for storage locations of print original images, thus determining the image server 111 or print server 121 from which the original images are to be transferred. This process will be explained in detail later with reference to the processing flow chart in FIG. 20.

In step S1903, the data processed in step S1901 is checked again, and if an image need not be retrieved, the order progress management means 406 is launched to transfer the order to the print server 121. This process will be explained in detail later with reference to the processing flow chart in FIG. 21.

With the above process, processes for sending the original image transmission request to the image server 111 or print server 121 as the storage source of the image IDs in the print order, and setting the order status data are completed for the submitted print order.

Figure 20:
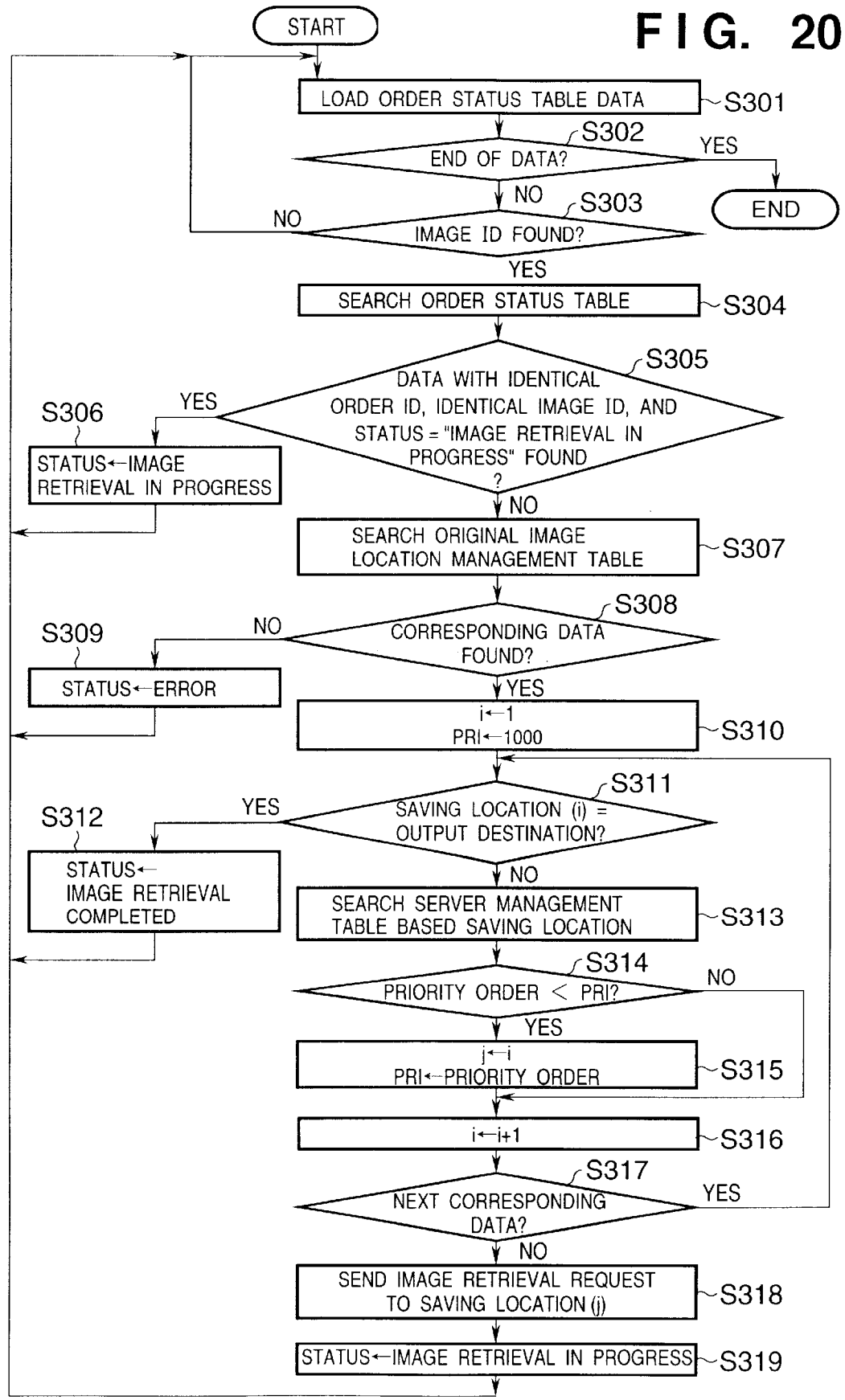
FIG. 20 is a flow chart showing a process for determining the retrieval source of a print original image in the image retrieval source determination process.

FIG. 20 is a processing flow chart for explaining the retrieval source determination process executed in step S1902 in the image retrieval source determination process.

In step S301, one data of the print order store din step S1901 in FIG. 19 is loaded from the order status table 415, and is stored on the RAM 1002.

It is checked in step S302 if all data of the print order stored in step S1901 in FIG. 19 have been loaded. If YES in step S302, i.e., if there is no data to be processed, this processing ends.

It is checked in step S303 if the image ID field 203 of the order status able data stored in step S301 has an entry. If YES in step S303, the flow advances to step S304; otherwise, the flow returns to step S301 to retrieve the next print order data.

In step S304, the order status table 415 is searched to check if data, which has the same value in the order ID field 201, the same value in the image ID field 203 as that stored in step S301, and "image retrieval in progress" in the status field 204, is present in the order status table 415 except for the current data.

In step S305, the search result in step S304 is checked. If data that matches the search conditions in step S304 is found in the order status table 415 in step S305, the flow advances to step S306; otherwise, the flow advances to step S307.

In step S306, since retrieval of an image corresponding to the image ID of interest is in progress, "image retrieval in progress" is set in the status field 204 of the order status data stored in step S301, and the flow returns to step S301.

In step S307, the original image location management table 412 is searched on the basis of the image ID in the order status data stored in step S301 to extract one or more data having the same image ID and to store them on the RAM 1002 as a data sequence.

In step S308, the search result in step S307 is checked, and if one or more matches are found in the original image location management table 412, the flow advances to step S310; otherwise, the flow advances to step S309.

In step S309, since no original image corresponding to the image ID of interest is present, "error" is set in the status field 204 of the order status data stored in step S301, and that data is written in the order status table 415. After that, the flow returns to step S301.

In step S310, the one or more original image location management table data stored as the sequence in step S307 are compared to prepare for a determination process of a server to which a print image transmission request is to be sent.

Variable i is an index value of the original image location management table data sequence stored in step S307, and "1" indicating the head of the sequence is set in this processing step. In the following description, the i-th data indicated by variable i will be expressed as "saving location (i)".

PRI is a value that stores the value of a minimum image retrieval priority order (i) in the server management table 413, and "1000" is set as a value larger than the maximum value of the image retrieval priority order field 1102 already determined in this embodiment, in this processing step. i and PRI are stored on the RAM 1002.

In step S311, the value of saving location(i) of the original image location management table data is compared with the value of the output destination print server ID of the print order stored in the RAM 1002, and if they match, it is determined that the original image need not be transferred, i.e., the original image is located on the output destination print server. Hence, the original image is set to be used in printing by the print server, and the flow advances to step S312.

In step S312, since the original table need not be retrieved, "image retrieval completed" is set in the status field 204 in the stored order status data to end the processing of that order status data, and the flow returns to step S301.

In step S313, the server management table 413 is searched for data which has the same value in the server ID field 1101 as saving location(i), and the value in the image retrieval priority order 1102 in that data is stored in the RAM 1002.

In step S314, the image retrieval priority order stored in step S312 is compared with the PRI value. If the stored image retrieval priority order is smaller than PRI, step S316 is executed using a server indicated by that data as an image retrieval source candidate.

In step S315, the value of index i is saved in a value j on the RAM 1002, and the image retrieval priority order value is stored in PRI to set the server indicated by the data found in step S314 as an image retrieval source candidate.

In step S316, the value of index i is incremented by "1" to prepare for the next original image location management data stored on the RAM 1002, and the flow returns to step S311. If all original image location management data have been processed, the flow advances to step S318.

In step S318, a transfer data file, which is formed by original image transmission request transfer data indicated by a <FTPREQ> tag in the example in FIG. 13, data that pertains to the print order indicated by an <ORDER> tag in the example shown in FIG. 13, common header data indicated by a <TRANS> tag in the example shown in FIG. 13, and the like, is prepared on the basis of the image IDs and saving location (j) stored on the RAM 1002, and is stored in the center transmission box 418, thereby sending the print image transmission request to the retrieval source server. In this embodiment, data required for print image retrieval are the image ID, actual print size of an image, order ID, print type, and corresponding paper.

In step S319, since the image retrieval request has been issued, "image retrieval in progress" is set in the status field. After that, the flow returns to step S301.

<Order Status Table Update Process>

Figure 21:
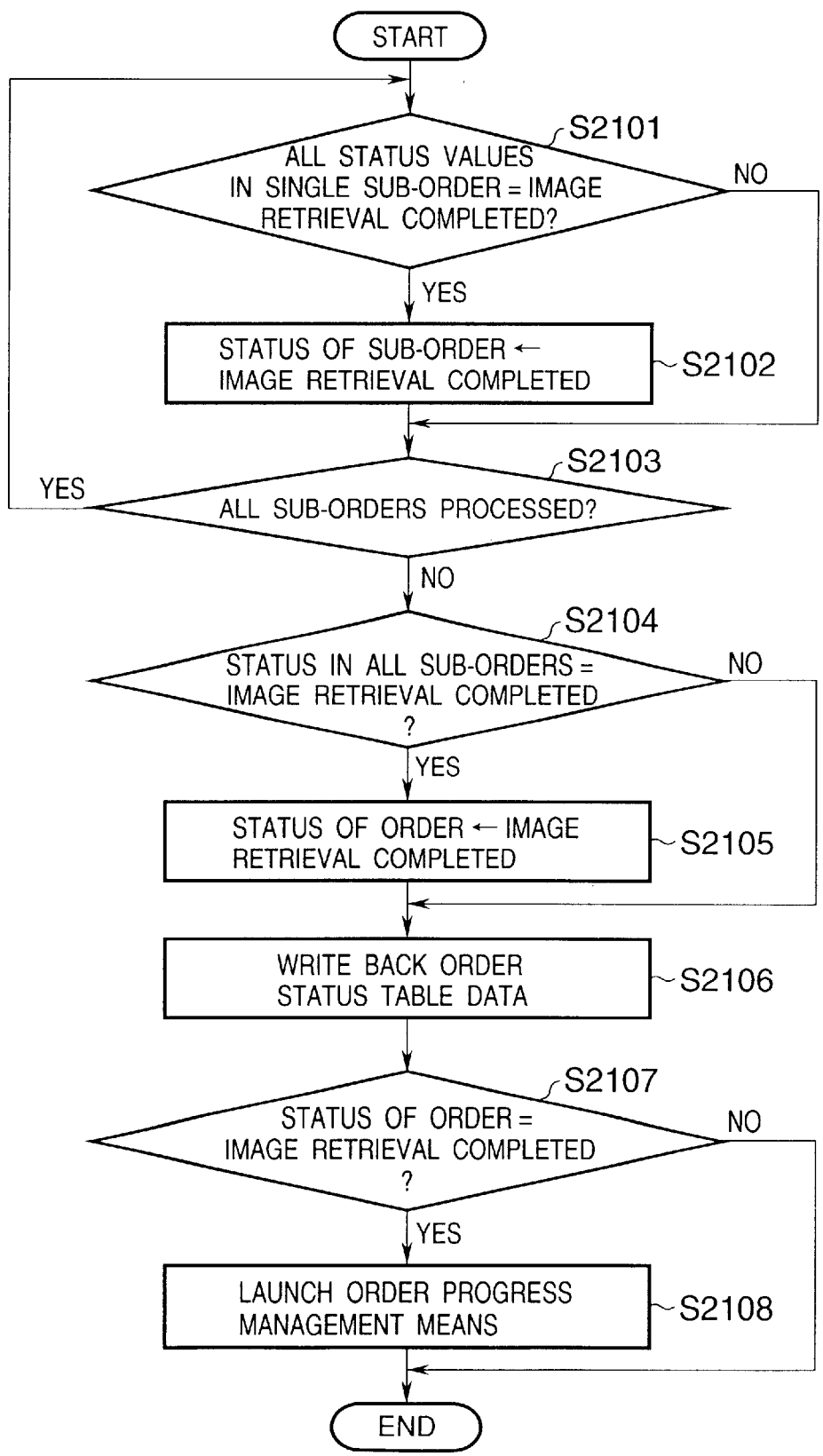
FIG. 21 is a flow chart showing an order status table update process in the image retrieval source determination process.

FIG. 21 is a flow chart showing the order status table update process executed in step S1903 in the image retrieval source determination process.

Steps S2101 and S2102 are executed in units of sub-orders of the order status data stored in the RAM 1002. In the following description, the sub-order ID of the sub-order of interest will be expressed as "sub-order ID(k)".

In step S2101, the values in the status field of order status data, which have the same sub-order ID as sub-order ID(k), are checked, and if all the values are "image retrieval completed", the flow advances to step S2102; if data which do not have "image retrieval completed" status are found, the flow jumps to step S2103.

In step S2102, "image retrieval completed" is set in the status field 204 of order status data, which has the sub-order ID=sub-order ID(k), and has no entry in the image ID field.

In step S2103, index k is incremented to process the next sub-order. If all sub-order IDs have been processed, the flow advances to step S2104; if the next sub-order ID(k+1) is present, the flow returns to step S2101.

In step S2104, all order status data, which have entries in the sub-order ID field 202 and no entry in the image ID field 203, are checked to determine if the values in the status field 204 of all the data are "image retrieval completed". If all the data have "image retrieval completed" status, the flow advances to step S2105; otherwise, the flow jumps to step S2106.

In step S2105, "image retrieval completed" is set in the status field 204 of order status data, which has no entry in the sub-order ID field 202 and the image ID field 203.

In step S2106, the order status data stored in the RAM 1002 is written back in the order status table 415.

In step S2107, order status data which has no entry in the sub-order ID field 202 and image ID field 203 is checked. If "image retrieval completed" is set in the status field 204 of that data, the flow advances to step S2108; if data set with a value other than "image retrieval completed" is found, this processing ends.

In step S2108, the order progress management means 406 is loaded from the HDD 1009 or the like, and is mapped and activated on the RAM 1002, and the order ID of the order status data is passed to the order progress management means 406.

<Print Image Transmission Process>

The image server 111 or print server 121, which has been selected as the print image retrieval source and received the image transmission request transfer data in the image retrieval source determination process, sends a print image which is identified by the image ID designated in that original image transmission request transfer data, to the center server 102. This process is done by the print image transmission means 602 on the image server 111 or the print image transmission means 705 on the print server 121. Since the print image transmission means 602 and 705 have the same functions, the processing of the print image transmission means 602 on the image server 111 will be explained below.

Figure 22:
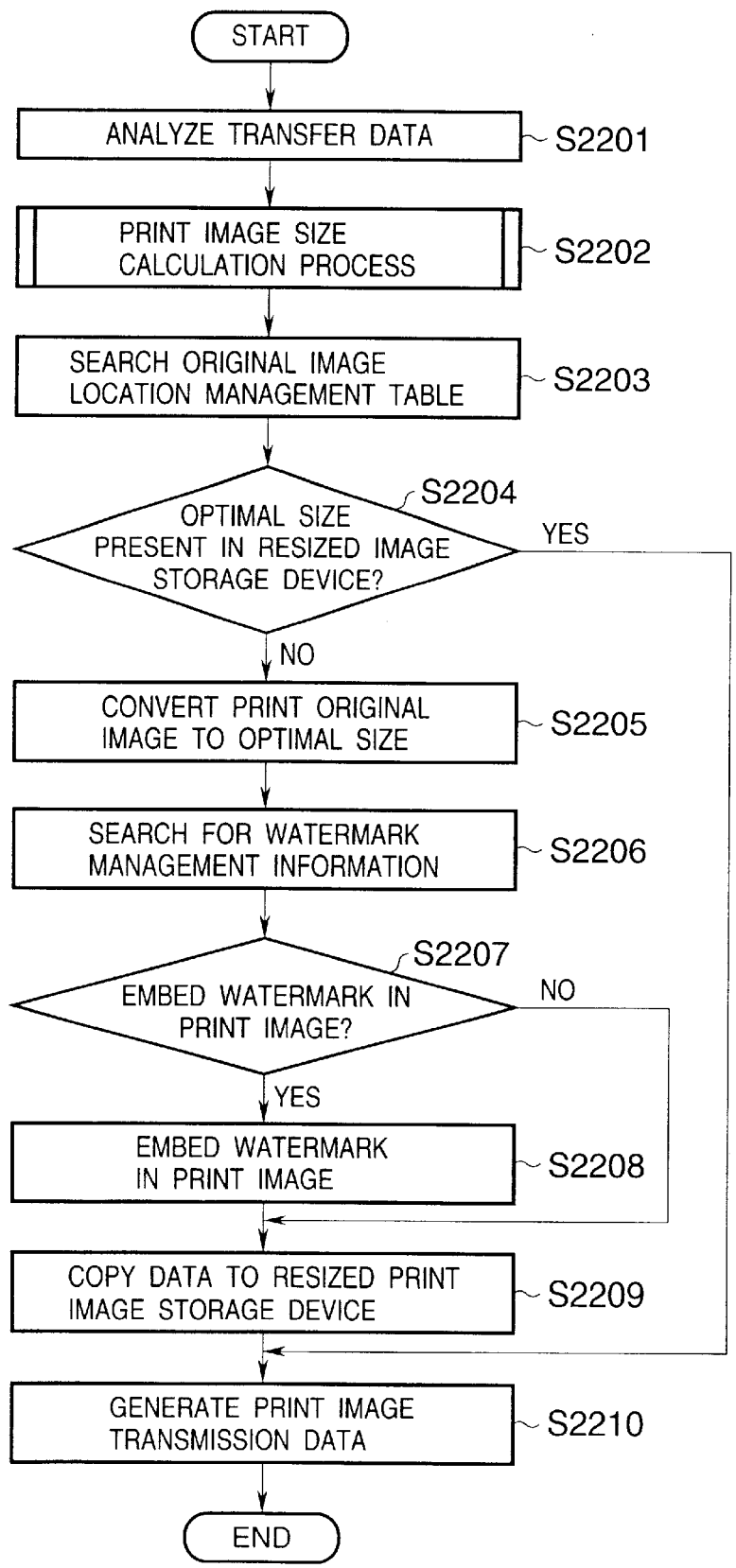
FIG. 22 is a flow chart showing an original image transmission process in the image server or print server.

FIG. 22 is a flow chart showing the process in the print image transmission means 602. The print image transmission means 602 is loaded from the HDD 1009 or the like, and is mapped and activated on the RAM 1002 by the local transmission/reception control means 603, when the local transmission/reception control means 603 receives the image transmission request transfer data file. At this time, the print image transmission means 602 receives the file name of the image transmission request transfer data file received by the local transmission/reception control means 603 therefrom via the RAM 1002.

In step S2201, the image transmission request transfer data file is read out on the basis of its file name passed via the RAM 1002 upon launching the print image transmission means 602, and the image ID, order information, and the like in the image transmission request transfer data are extracted from the file and are stored on the RAM 1002.

In step S2202, the print image size calculation means 605 is loaded from the HDD 1009 or the like and is mapped and activated on the RAM 1002, and the actual print size, the output printer type, and output paper type of the image ID, order information, and the like stored on the RAM 1002 in step S2201 are passed to the print image size calculation means 605. The print image size calculation means calculates an optimal size of a print image designated by the transmission request, and outputs the calculated size as the number of pixels. Note that the calculation process in the print image size calculation means 605 will be explained in detail later.

In step S2203, the original image location management table 612 is searched for a print image which has the optimal image size as the processing result in step S2202, and the corresponding image ID.

If it is determined in step S2204 that matching data is found as a result of the process in step S2203, the value in the saving location field 1204 is retrieved from the matching data, and is stored in the RAM 1002. After that, the flow jumps to step S2210.

If no match is found as a result of step S2203, the flow advances to step S2205, since a print image is generated from a print original image.

In step S2205, of print original image data, which have the same values in the image ID field 1201 as the image ID stored in step S2201, data having a size (the size (number of pixels) field 1202), which is larger than the optimal size as the calculation result in step S2202 and is closest to that optimal size, is read out, and is stored on the RAM 1002.

A print original image is then loaded onto the RAM 1002 based on the path name stored in the saving location field 1204 of the data stored in the RAM 1002, and is resized to the optimal size.

In step S2206, the watermark information management table 615 is searched for watermark management information, which has the image ID of the image designated by the transmission request, the use purpose="print image", and the embedding timing="transmission timing". The search result is stored on the RAM 1002.

In step S2207, the presence/absence of watermark management information for the transmission timing of the print image stored on the RAM 1002 is checked. If the watermark management information is present, it is determined that a digital watermark is to be embedded, and the flow advances to step S2208 to embed a digital watermark for the transmission timing in the print image. On the other hand, if the copyright holder determines that a digital watermark for the transmission timing need not be embedded in the print original image, since no watermark management information is registered upon registration, the flow jumps to step S2209.

In step S2208, a digital watermark for the transmission timing is embedded in the print original image. The watermark management information found by search in step S2206 is read out, and is stored in the RAM 1002. The watermarking means 604 is launched, and the storage address of the image, which is resized in step S2205 and stored on the RAM 1002, the watermark management information stored on the RAM 1002, the output destination of the image after the watermark is embedded, and external reference data if data to be embedded in the watermark management information is external reference data such as an order ID or the like, are passed to the watermarking means 604, thus requesting it to embed the digital watermark.

The watermarking means 604 embeds a digital watermark in the image in accordance with the received watermark management information, and outputs the image embedded with the digital watermark onto a location on the RAM 1002 designated by the print image transmission means 602. Upon completion of the digital watermark embedding process, the watermarking means 604 sends an end message to the print image transmission means 602, and then ends. When the type of watermark embedded by the watermarking means 604 is a removable visible watermark, removing information of the embedded watermark is output at the same time. In this embodiment, that information is embedded in the comment field of the image data, as described previously.

Upon receiving the end message, the print image transmission means deletes the watermark management information stored on the RAM 1002.

In step S2209, if no digital watermark is embedded in step S2208, the image at the storage location of the resized print image on the RAM 1002 stored in step S2205 is saved as a file in the resized print image storage device 616. On the other hand, if the digital watermark is embedded in step S2208, the image embedded with the digital watermark output from the watermarking means 604 is saved in the resized print image storage device 616 as a print image. If watermark information embedded upon transmission is external reference data, since it is likely to change in every transmission request, this step is skipped.

In step S2210, if no digital watermark is embedded in step S2208, the image at the storage location of the resized print image on the RAM 1002 stored in step S2205 is saved as a file in the local transmission box 613. On the other hand, if the digital watermark is embedded in step S2208, the image embedded with the digital watermark output from the watermarking means 604 is saved in the local transmission box 613 as a print image. On the other hand, if it is determined in step S2204 that a print image is stored in the resized print image storage device 616, a print image file is copied to the local transmission box 613 on the basis of the path name stored on the RAM 1002 in step S2204. Upon completion of copying or saving the file in the local transmission box 613, a print image transmission data file shown in an example in FIG. 23 is prepared on the basis of the print image file name, and the image ID and order information stored in step S2201, and is stored in the local transmission box 613.

FIG. 23 shows an example of the contents of the print image transmission data file prepared by the print image transmission means 602 in the original image transmission process. Print image transmission data is identified by an <FTP> tag in FIG. 23, and the use destination of the print image is specified by an <ORDER> tag.

<Print Image Size Calculation Process>

In the print image transmission process, the optimal size of the image designated by the transmission request is calculated in step S2202. The optimal size is determined based on the printer characteristics, and the actual print size of an image to be printed. Data stored in the print image size calculation table 617 used in this process are obtained by measuring printer characteristics by print tests and the like in advance. As has been explained in step S2202, the print image size calculation means receives the actual print size, output printer type, and output paper type.

Figure 43:
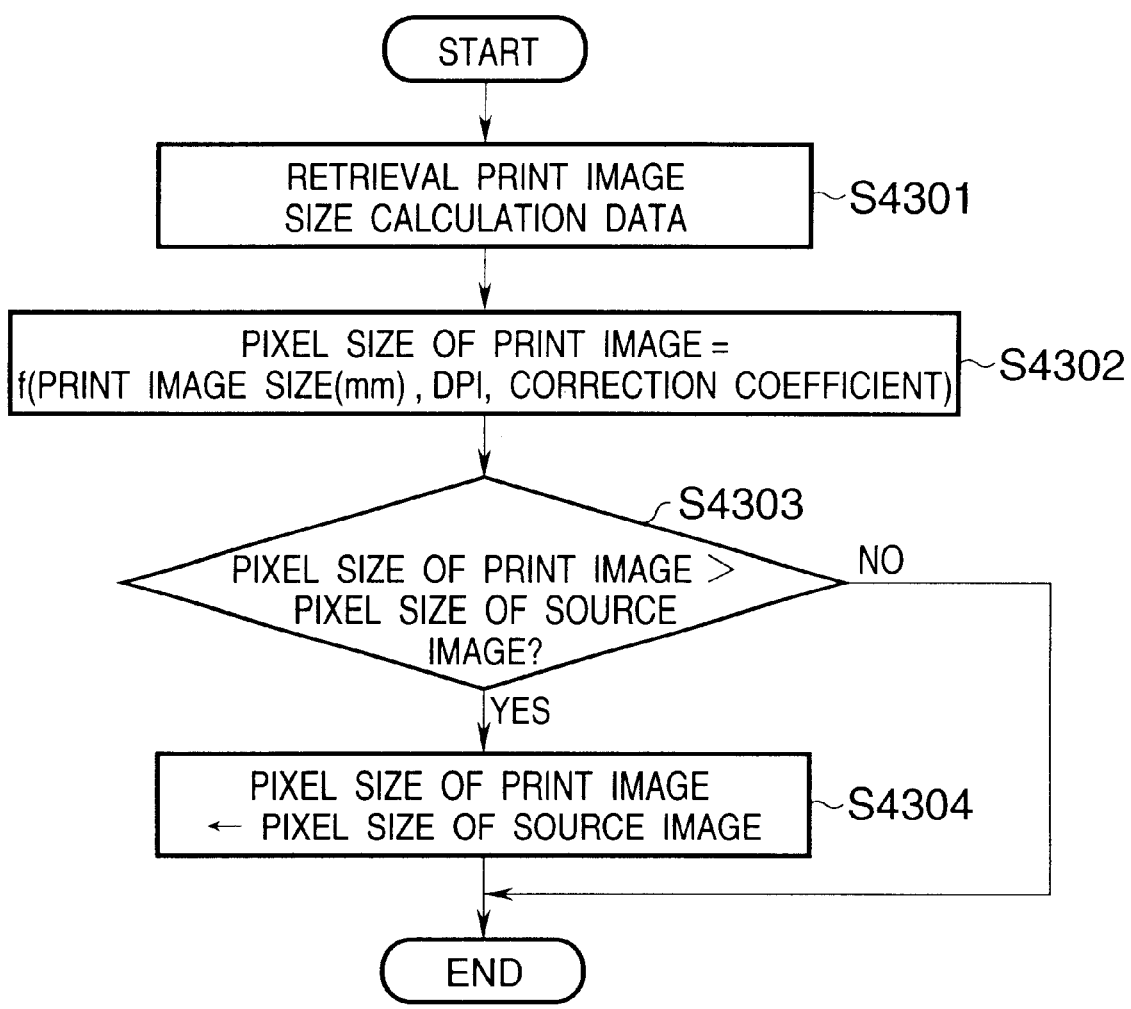
FIG. 43 is a flow chart showing a print image size calculation means process.

FIG. 43 is a flow chart for explaining the print image size calculation process. This process will be explained below with reference to FIG. 43. In the following description, a process in the image server 111 will be exemplified. Since the print server 121 executes the same process as in the image server 111, a description thereof will be omitted.

Referring to FIG. 43, in step S4301, the output printer type, output paper type, and actual print size, which are input from the print image transmission means 602, and the image size (number of pixels) of an original image which is managed in the original image location management table 612 and is subjected to the print image size calculation, are stored on the RAM 1002. Then, data, which have the same values in the printer type field 3801 and output paper type field 3802 as the stored output printer type and paper type, are extracted by search from the print image size calculation table 617, and the extracted data are stored on the RAM 1002.

In step S4302, the number of pixels as an optimal image size is calculated for each of the height and width of an image by:

Optimal size (number of pixels)=(actual print size (mm)/25.4)× printer resolution (3803)×correction coefficient (3804)

In this calculation, since the height or width of the actual print size is input as millimeter data, it is converted into inch data in correspondence with the printer resolution. The converted actual print size is then multiplied by the printer resolution to obtain the number of pixels in the vertical or horizontal direction in correspondence with the printer resolution. Finally, the obtained number of pixels is multiplied by the correction coefficient that expresses a correction value in consideration of the characteristics of the output paper type and printer itself, thus obtaining a print image size (optimal size).

In step S4303, the original image size stored on the RAM 1002 in step S4301 is compared with the print image size calculated in step S4302. In this case, both the numbers of pixels in the vertical (height) and horizontal (width) directions of the image are compared. If the calculated number of pixels in the vertical direction is larger than that of the original image, or if the calculated number of pixels in the horizontal direction is larger than that of the original image, the flow advances to step S4304.

As a result of comparison, if both the height and width of the print image size are smaller than those of the original image size, the calculation of the print image size (the numbers of pixels of the height and width) ends.

If the flow advances to step S4304, since the print image size (the number of pixels) exceeds the original image size (the number of pixels), the calculation value of the calculated print image size is corrected to the original image size.

More specifically, if it is determined in step S4303 that the number of pixels of the height of the print image has exceeded that of the original image, the vertical size of the print image is set at that of the original image. Then, to maintain the aspect ratio of the actual print size input upon calculation of the print image size, the number of pixels of the width of the print image is calculated by:

Horizontal size (number of pixels) of corrected print image=vertical size (number of pixels) of original image×{(horizontal size of actual print size/vertical size of actual print size)}

Likewise, if it is determined in step S4303 that the number of pixels of the width of the print image has exceeded that of the original image, the horizontal size of the print image is set at that of the original image. Then, the number of pixels of the print image in the vertical direction is calculated using an equation in which values for the height and width in the aforementioned equation are replaced.

Furthermore, if it is determined in step S4303 that both the height and width of the print image size have exceeded the original image size, both the correction process executed when the height has exceeded, and that executed when the width has exceeded are executed, the vertical sizes (or horizontal sizes) of the two correction results are compared to each other, and the correction result corresponding to a larger size is determined to be the print image size.

The print image size calculated by the aforementioned process is output to the print image transmission means 602.

<Print Image Reception Process>

The print image transmission data prepared by the print image transmission means 602 of the image server 111 or the print image transmission means 705 of the print server 121 in the print image transmission process is sent to the center server 102 via the local transmission/reception control means 603 or 703, and is received by the center transmission/reception control means 407 of the center server 102.

Upon receiving the print image transmission data, the center transmission/reception control means 407 stores the received data as a print image transmission data file in the center reception box 419. The means 407 then reads out the image retrieval means 405 from the HDD 1009 or the like, maps and activates it on the RAM 1002, and passes the file name of the print image transmission data file in the center reception box 419 to the image retrieval means 405. The image retrieval means 405 analyzes the print image transmission data file to save a received image file and to update the order status table.

Figure 24:
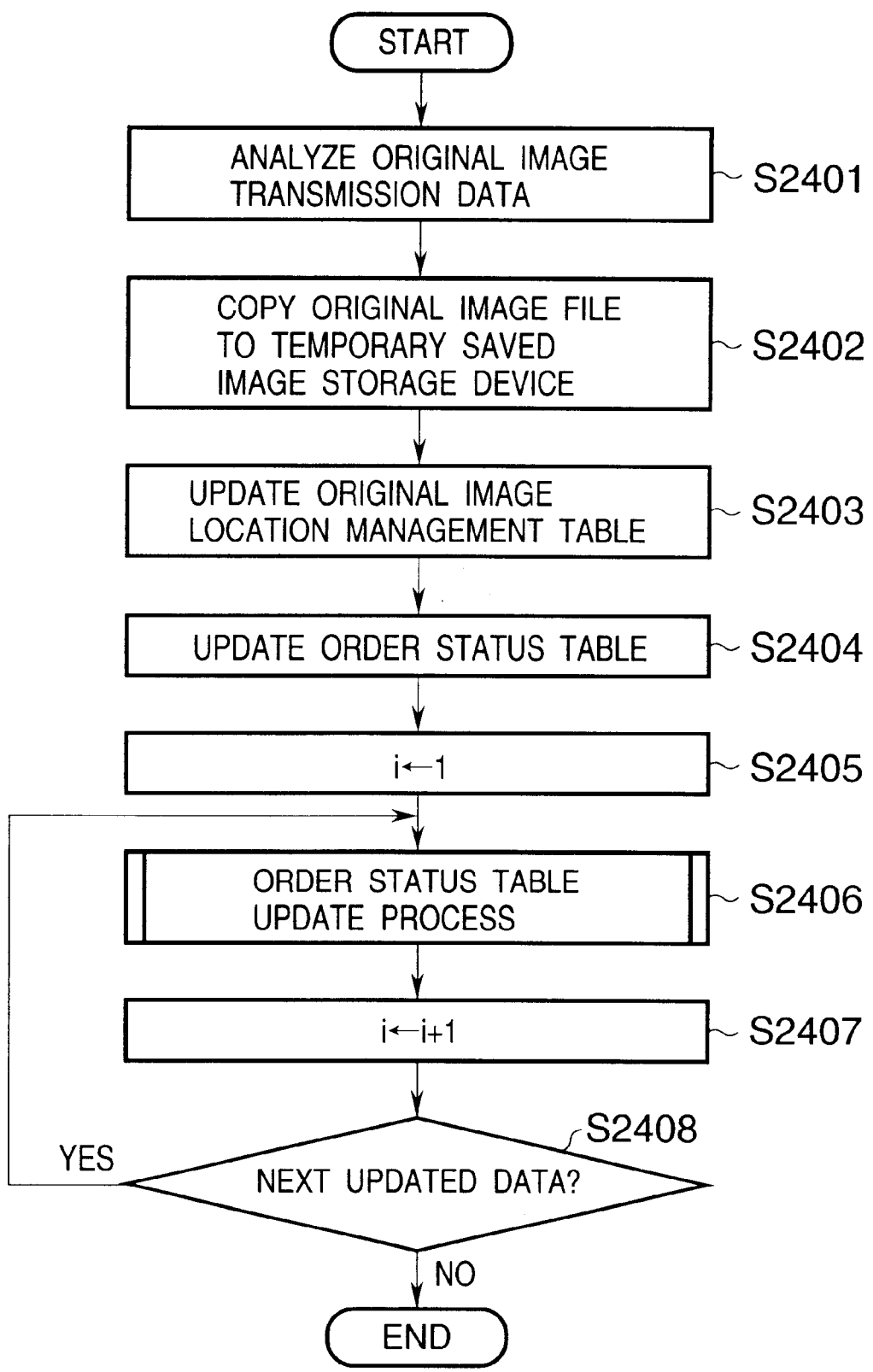
FIG. 24 is a flow chart showing an image reception process in the center server.

FIG. 24 is a flow chart showing the processing contents of the image retrieval means 405. The processing of the means 405 will be explained below with reference to FIG. 24.

In step S2401, the image retrieval means 405 reads out, on the basis of the print image transmission data file passed from the center transmission/reception control means 407 upon launching, the contents of that file onto the RAM 1002, analyzes the readout contents, and stores the image ID and order ID in order information in that file, and the file name of the received print image file on the RAM 1002.

In step S2402, the image retrieval means 405 copies a file in the temporary saved image storage device 414 on the basis of its file name stored in step S2401, and stores the path name of the copied file on the RAM 1002. In this embodiment, a print image is temporarily saved in the temporary saved image storage device to meet a resend request of data when the center server 102 has failed to send print image to the print server 121. However, when the resend request is issued, since the print image may be retrieved again from a server that stores a print original image, the present invention may be implemented without saving the print image in the temporary saved image storage device.

In step S2403, original image location management table data is prepared on the basis of the image ID and order ID stored in step S2401, and the path name of the file stored in step S2402, and is added to the original image location management table 412.

In step S2404, the order status table 415 is searched to extract all data in which values in the order ID field 201 and image ID field 203 match the order ID and image ID stored in step S2401. All the extracted order status data are stored on the RAM 1002. Then, "image retrieval completed" is set in the status field 204 of the extracted data, and the data are written in the order status table 415.

Steps S2405 to S2408 are executed for each of the order status data saved on the RAM 1002 in step S2404. In the following description, data to be processed is represented by order status data (i) which means the i-th index data.

In step S2405, index i is initialized to 1 to process the order status data in turn.

It is checked in step S2406 if "image retrieval completed" is set in the status field 204 in all data in order status data (i). If YES in step S2406, the order progress management means 406 is launched to transfer the order to the print server 121. The details of the process in step S2406 are the same as the order status table update process in the original image retrieval source determination process executed by the image retrieval means 405, which has been explained above with reference to FIG. 21.

In step S2407, index i is incremented by 1 to prepare for the process of the next order status data.

It is checked in step S2408 if order status data (i) is present on the RAM 1002. If YES in step S2408, the flow returns to step S2406; otherwise, this processing ends.

<Print Order Transmission Process>

In the image retrieval process or image reception process done by the image retrieval means 405 in the center server 102, when preparation of print images required for printing of the print order which is in progress is completed, the image retrieval means 405 launches the order progress management means 406, and passes the order ID of the print order to the order progress management means 406 via the RAM 1002.

When the order progress management means 406 receives the order ID upon launching, it generates order transfer data based on that order ID, and stores the generated data in the center reception box 418, thus sending the order transfer data to the print server 121.

Figure 25:
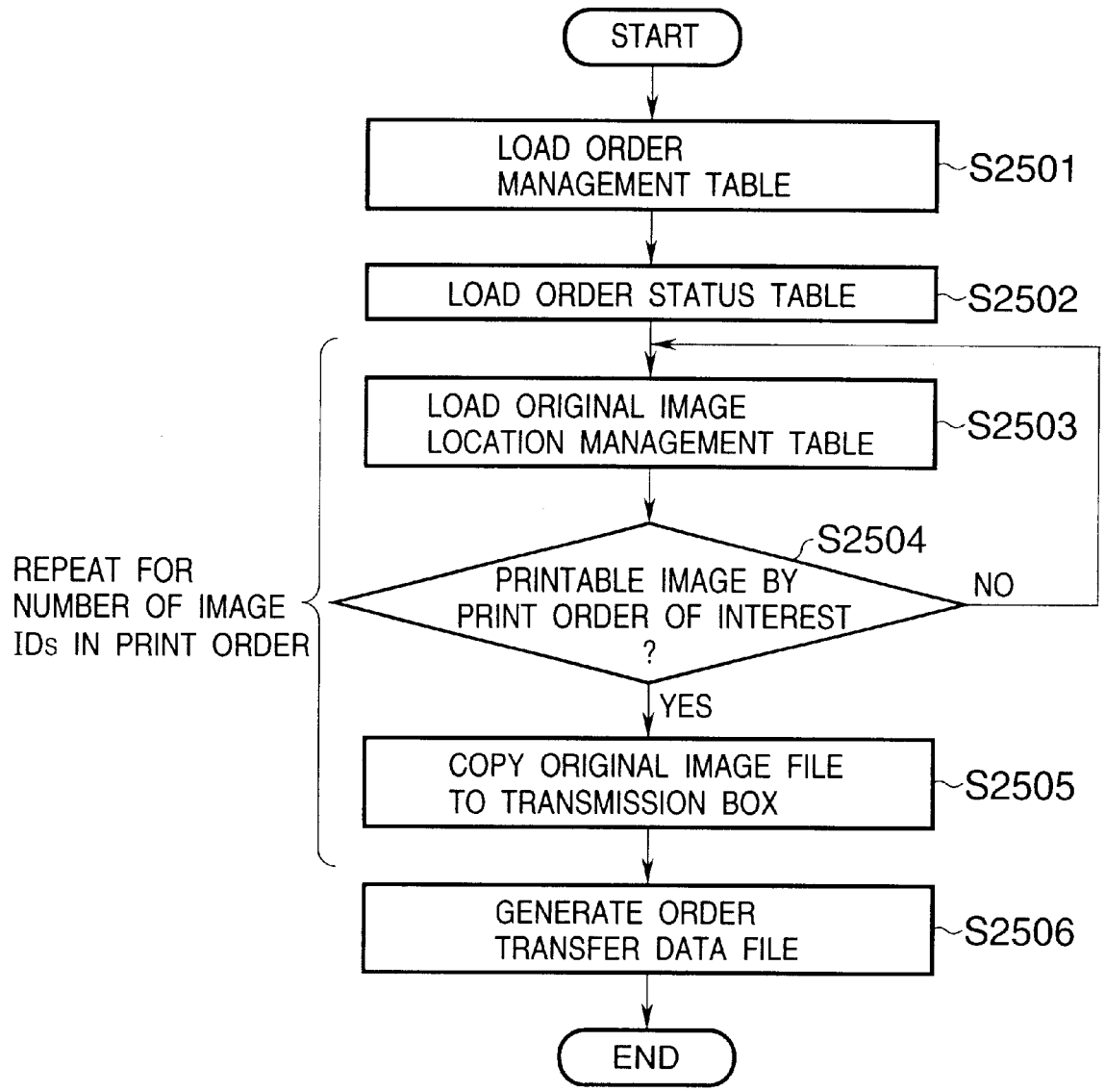
FIG. 25 is a flow chart showing a print order transmission process in the center server.

FIG. 25 is a flow chart showing the contents of the print order transmission process done by the order progress management means 406.

In step S2501, the order management table 416 is searched based on the order ID received upon launching to load print order data 801 identified by that order ID and lower-order data 802, 803, and 804, and to store them on the RAM 1002.

In step S2502, the order status table 415 is searched based on the order ID received upon launching to load all order status data in which the values in the order ID field 201 match the received order ID, and to store them on the RAM 1002.

Steps S2503 to S2505 are repeated for the order status data which are stored in step S2502 and have entries in the image ID field 203. In the following description of steps S2503 to S2505, the data value of the order status data of interest will be expressed as "image ID (i)".

In step S2503, the original image location management table 412 is searched based on image ID (i) to load one original image location management data in which the value in the image ID field 1201 matches image ID (i), and to store it on the RAM 1002.

In step S2504, the value in the saving location field 1204 in the original image location management data stored on the RAM 1002 in step S2503 is examined to check if the saving location is the path name in the temporary saved image storage device 414 and the order ID described in the additional information field 1205 matches the order ID of interest, or if the saving location matches the server ID of the print destination print server in the print order data stored in step S2501. If the above condition is satisfied, the flow advances to step S2505. On the other hand, if the above condition is not satisfied, the flow returns to step S2503, and the next original image location management data in which the value in the image ID field 1201 matches image ID (i) is loaded from the original image location management table 412.

In step S2505, a print image file is copied to the center transmission box 418 on the basis of the path name of the print image file stored in the saving location field 1204 in the original image location management data in step S2503, and the file name of the copy is stored on the RAM 1002 together with image ID (i).

In step S2506, order transfer data 1312 shown in FIG. 13 is prepared on the basis of the print order data stored in step S2501, and a plurality of image IDs and file names stored in step S2505, and a transmission/reception transfer header 1311 is appended thereto to prepare an order transfer data file. The order transfer data file is stored in the center transmission box 418. At this time, tags and parameters in the order transfer data 1312 are edited on the basis of the print order data stored in step S2501.

If the print order data has an image ID 805, and that image ID is present among the plurality of image IDs and file names stored in step S2505, the file name of the print image file, which corresponds to that image ID and is copied to the center transmission box 418 in step S2505, is edited as a <CAMLLINK> tag, as indicated by 1322 in FIG. 13, so as to designate the relationship with the print image file copied to the center transmission box 418 in step S2505.

On the other hand, if the print order data includes a script 1402 as edit data 804, the edit data is edited by being converted into the format of an internal code 1321.

Note that information such as the user name, address, and the like is appended to an actual order transfer data file by searching for user information held in the HDD 1009 of the center server 102 on the basis of the user ID as the additional information of the print order 801, so as to allow the print server 121 that receives the order to identify the user who submitted the print order. However, such information is not particularly required upon explaining the present invention, and a description thereof will be omitted.

<Print Order Reception Process>

The order transfer data prepared by the order progress management means 406 of the center server 102 in the print order transmission process is sent to the print server 121 via the center transmission/reception control means 407, and is received by the local transmission/reception control means 703 of the print server 121.

Upon receiving the order transfer data, the local transmission/reception control means 703 of the print server 121 stores that order transfer data in the local reception box 714 as an order transfer data file, and also stores a print original image file group received at the same time in the local reception box 714. The means 703 reads out the order output management means 701 from the HDD 2009 or the like, and maps and activates it on the RAM 2002. The means 703 then passes the file name of the order transfer data file in the local reception box 714 to the order output management means 701. The order output management means 701 analyzes the order transfer data file and saves the received print order data in the order management table 711.

Figure 26:
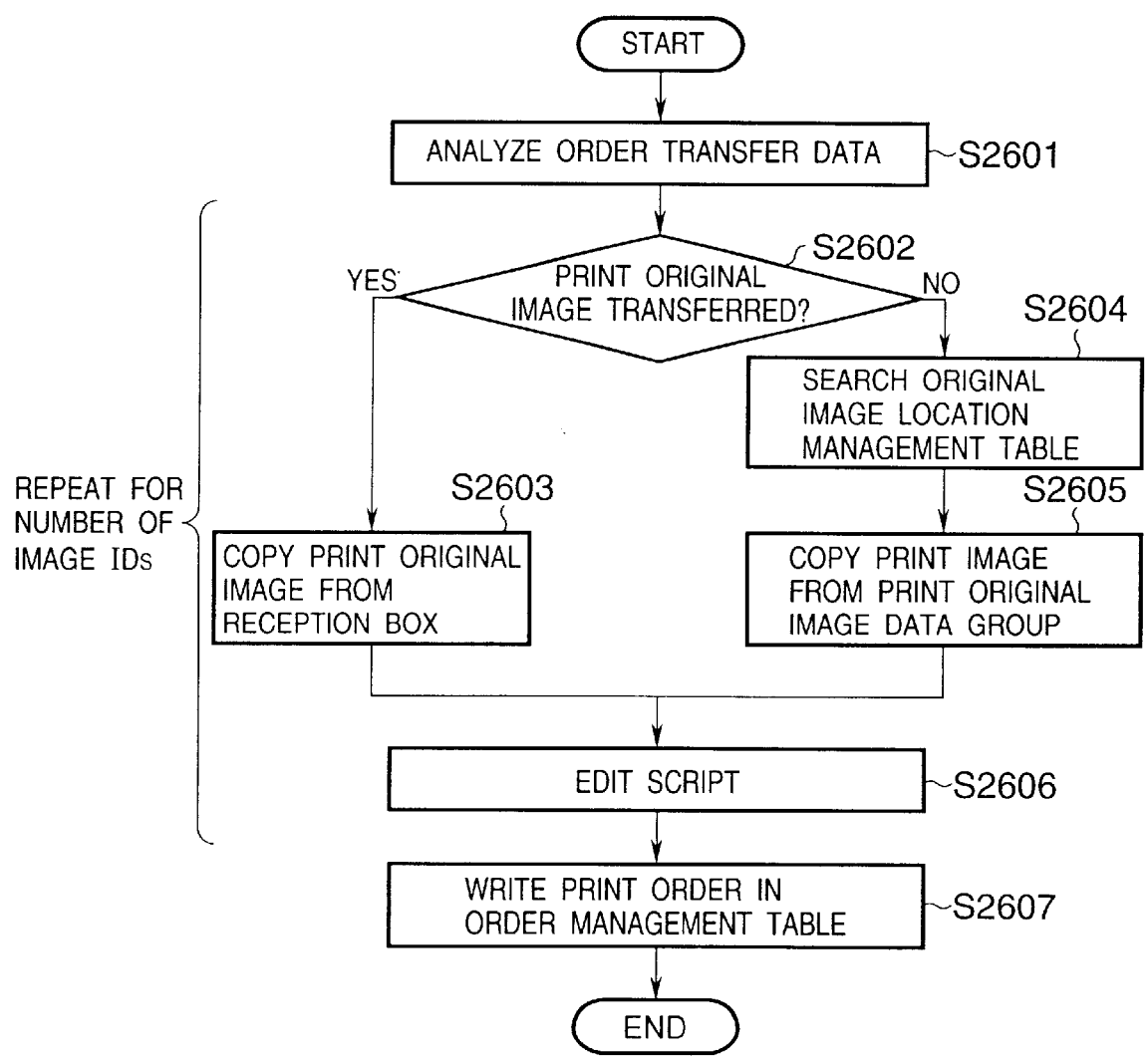
FIG. 26 is a flow chart showing a print order reception process in the print server.

FIG. 26 is a flow chart showing the print order reception process in the order output management means 701.

In step S2601, order output management means 701 loads the order transfer data file from the local reception box 714 on the basis of the file name of the order transfer data file passed from the local transmission/reception control means 703, analyzes the contents of the order transfer data file, and stores the analyzed contents on the RAM 2002 in the same format as the data structure of print order data shown in FIG. 8. Furthermore, the means 701 extracts a tag 1322 of a print image described in the order transfer data file, and stores the print image file name in that tag on the RAM 2002 as additional information of the corresponding image ID 805 of the print order data. Moreover, the means 701 restores a script 1402 described in the order transfer data file to a state before it is converted into the internal code format in the print order transmission process by the center server 102 by decoding the internal code format, and stores it in the RAM 2002.

Steps S2602 to S2606 are repeated for the individual image IDs in the print order data stored in step S2601. In the following description, the image data of interest will be expressed as "image ID (i)", and the print image file name corresponding to image ID (i) as "print image file name (i)".

It is checked in step S2602 if print image file name (i) has an entry, i.e., if the print image file is transferred from the center server 102. If YES in step S2602, the flow advances to step S2603; otherwise, the flow advances to step S2604.

In step S2603, a print image file identified by print image file name (i) is extracted from the local reception box 714, and is copied into the print spool 712. The file name of the copy is stored in the RAM 2002.

In step S2604, the original image location management table 715 is searched to load data in which the value in the image ID field 1201 matches image ID (i), and store it on the RAM 2002.

In step S2605, a print original image file identified by the file name of the print original image file stored in the saving location field 1204 of the original image location management data stored in step S2604 is extracted from the print original image storage device 716, and is copied as a print image in the print spool 712. The order ID is stored as additional information in the image file copied to the print spool. The file name of the copied image is stored on the RAM 2002.

In step S2606, data that describes the file name of image ID (i) (data expressed by "imagetab( )" in FIG. 14) is extracted from the script stored in step S2601, and the file name of the extracted data is replaced by the file name of the print image file in the print spool 712, which is stored in step S2603 or S2604.

In step S2607, the print order data stored in step S2601 is stored in the order management table 711. The print order data includes the script data edited in step S2606 as edit data 804.

<Print Process>

Figure 27:
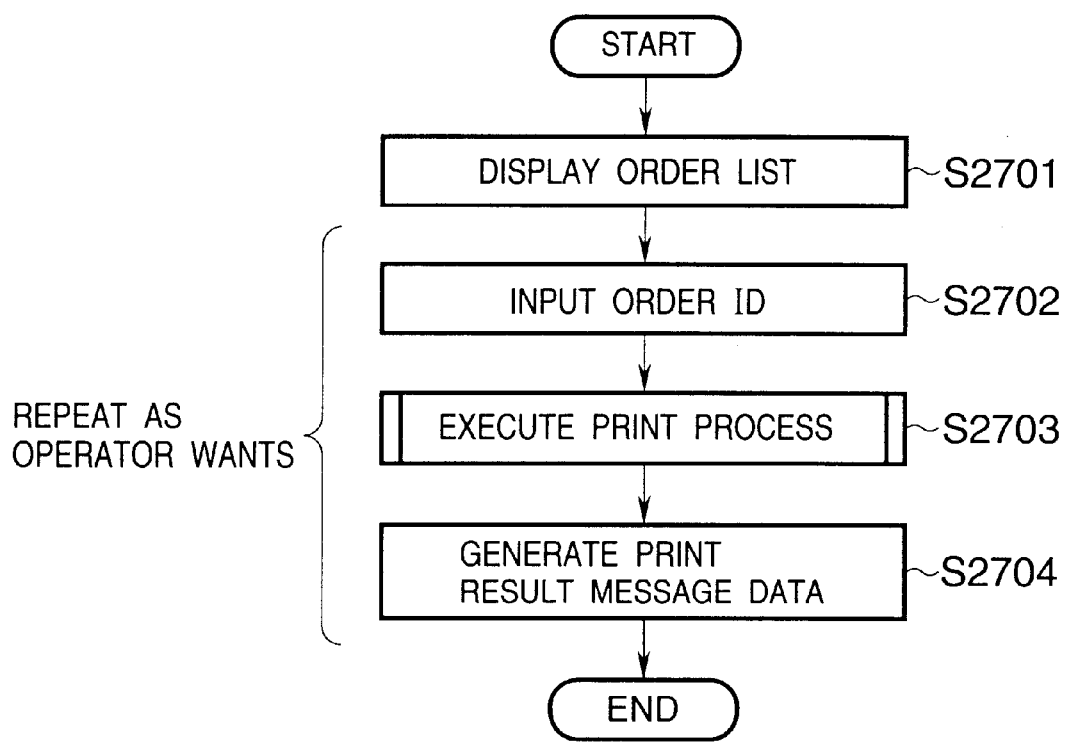
FIG. 27 is a flow chart showing a print process in the print server.

FIG. 27 is a flow chart showing the print process of a print order in the order output management means 701 in the print server 121. In the print process, the order output management means 701 is read out from the HDD 2009 or the like and is mapped on the RAM 2002 upon operation at the KB 2008 by the operator, so that the operator can use the means 701.

In step S2701, the order management means 701 loads the order management table 711, and displays the order IDs of all print orders 801 stored in the order management table 711 on the CRT 2006.

In step S2702, the operator operates the KB 2008 to select the order ID of the print order to be printed. The selected order ID is stored on the RAM 2002.

In step S2703, the print process of the selected order is done. Upon completion of this process, result data indicating if printing has succeeded or failed is returned to the order management means 701. In this process, since a print image is generated and a removable digital watermark is removed, this process will be explained in detail after the description of this flow chart.

In step S2704, print result message data 1318 in FIG. 13 is edited on the basis of the order ID stored in step S2702 and the end message received from the print control means in step S2703, and a transmission/reception header 1311 is appended to that data to prepare a print result message data file. The prepared data file is stored in the local transmission box 713. Furthermore, the print order data corresponding to the stored order ID is deleted from the order management table 711. Also, the script and image files that store the order ID as additional information, which are stored in the print spool 712 and required for printing, are all cleared.

Steps S2702 to S2704 are repeated as the operator requires.

The print process step S2703 will be described in detail below with reference to FIG. 29 as the detailed flow chart of the print process.

In step S2901, the order management table 711 is loaded on the basis of the order ID stored in step S2702, and a script as edit data 804 of the print order corresponding to the order ID is loaded and stored as a file in the print spool 712.

In step S2902, the print control means 702 is loaded from the HDD 2009 or the like and is mapped and activated on the RAM 2002. Then, the script file name is passed to the print control means 702.

In step S2903, the print control means 702 loads and analyzes the script file from the print spool 712, extracts all print image file names described in that script required for printing, and stores them on the RAM 2002.

Steps S2904 to S2906 are repeated for all the file names extracted in step S2903 and stored on the RAM 2002.

In step S2904, one of the file names extracted in step S2903 is extracted, and a print image file indicated by that file name is extracted from the print spool 712 and is stored on the RAM 2002.

It is checked in step S2905 if a removable visible watermark which must be removed upon printing is embedded in the print image stored in step S2904. If YES in step S2905, the flow advances to step S2906; otherwise, the flow advances to step S2907. In this embodiment, since the removable visible watermark has already been embedded upon processing a distribution request of a print image in the print image transmission process, and removing data of that watermark is stored in the image file, necessity of removal of the watermark is determined by checking if the removable visible watermark removing data is stored in the image file.

In step S2906, the removable visible watermark embedded in the print image upon transmission is removed. Removing information stored in the image file to be subjected to removal is extracted from the image file stored on the RAM 2002, and is stored again on the RAM 2002. The watermarking means 706 is launched, and the image file stored on the RAM 2002, removing information, and the address of the RAM 2002 used as the output destination of the image after removal are passed to the watermarking means 706, thus requesting it to remove the digital watermark.

The watermarking means 706 removes the removable visible watermark from the image to be subjected to watermark removal using the received removing information, and outputs the image after the removal process onto the designated address on the RAM 2002. The watermarking means 706 sends an end message to the print control means 702 upon completion of the removal process, and then ends. Upon receiving the end message, the print control means 702 deletes the watermark removing information stored on the RAM 2002, and the image file embedded with the removable visible watermark stored in step S2904.

It is checked in step S2907 if the processes in steps S2904 to S2906 are completed for all image files, which are extracted in step S2903 and required for printing. If YES in step S2907, the flow advances to step S2908. On the other hand, if the processes in steps S2904 to S2906 are not completed for all image files, the flow returns to step S2904 to process the next image file.

In step S2908, print data is generated on the basis of the script file and print images prepared up to step S2907. As each print image, if a removable visible watermark is removed, the image after watermark removal on the RAM 2002 as the output result of the watermarking means 706 in step S2906 is used; if the watermark removal process is skipped, the image loaded on the RAM 2002 in step S2904 is used.

In step S2909, the print data generated in step S2908 is passed to the PRTC 2011, thus printing out the print data by the PRT 2012.

In step S2910, the print control means 702 returns the print result in step S2909 to the order output management means 701 after it immediately deletes print data and watermark-removed images upon completion of printing.

Figure 29:
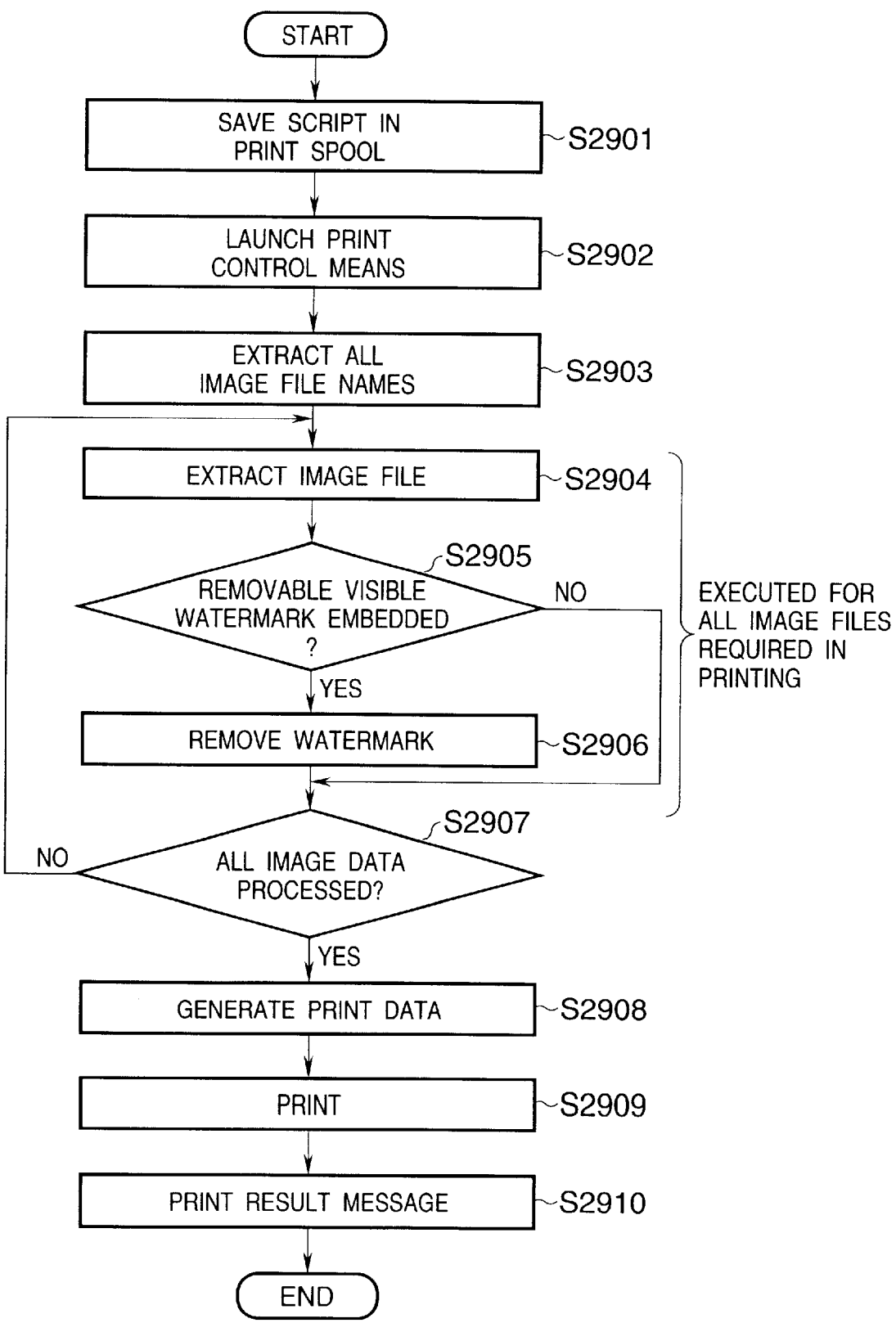
FIG. 29 is a flow chart showing details of the print process in the print server.

By processing the flow charts in FIGS. 27 and 29, the print order is printed.

At this time, during execution of the flow chart shown in FIG. 29, the operator cannot suspend the process, except for an error recovery process of a printer or the like. Even during the error recovery process, the operator cannot access print data and print images stored in the print server 121. Furthermore, the processes from a print instruction in step S2702 to print completion in step S2704 are inhibited from being interrupted by the operator's will, thus further protecting images.

In the print server 121, after a print original image is stored in the print original image storage device 716 by the print image registration means 704, and information of that image is stored in the original image location management table 715, print order data can be prepared using the print image registration means 704 or order output management means 701, and can be stored in the order management table 711. Also, the print order can be printed by the print process done by the order output management means 701 and print control means 702 on the basis of the print order data stored in the order management table 711 by the above method. In this case, data exchange with the center server 102 and the order submission process from the client computer 101 are not required.

In this manner, the print process is completed. When a preview image is displayed on the CRT 2006 to confirm the print image before execution of the print process in step S2909, a preview image is generated using the file designated by the file name extracted in step S2903, i.e., the image file embedded with the digital watermark, thus preventing illicit use of an image when the image displayed on the CRT 2006 is hard-copied.

<Print Completion Process in Center Server>

If printing has succeeded, the center transmission/reception means 407 of the center server 102 receives a print completion message data file prepared in step S2704 from the print server 121. The means 407 stores the received print completion message data file in the center reception box 419, reads out the order progress management means 406 from the HDD 1009 or the like, and maps and activates it on the RAM 1002. The means 407 stores the file name of the print completion message data file in the center reception box 419 in the RAM 1002, and passes it to the order progress management means 406 via the RAM 1002, thus executing the print completion process in the center server.

Figure 28:
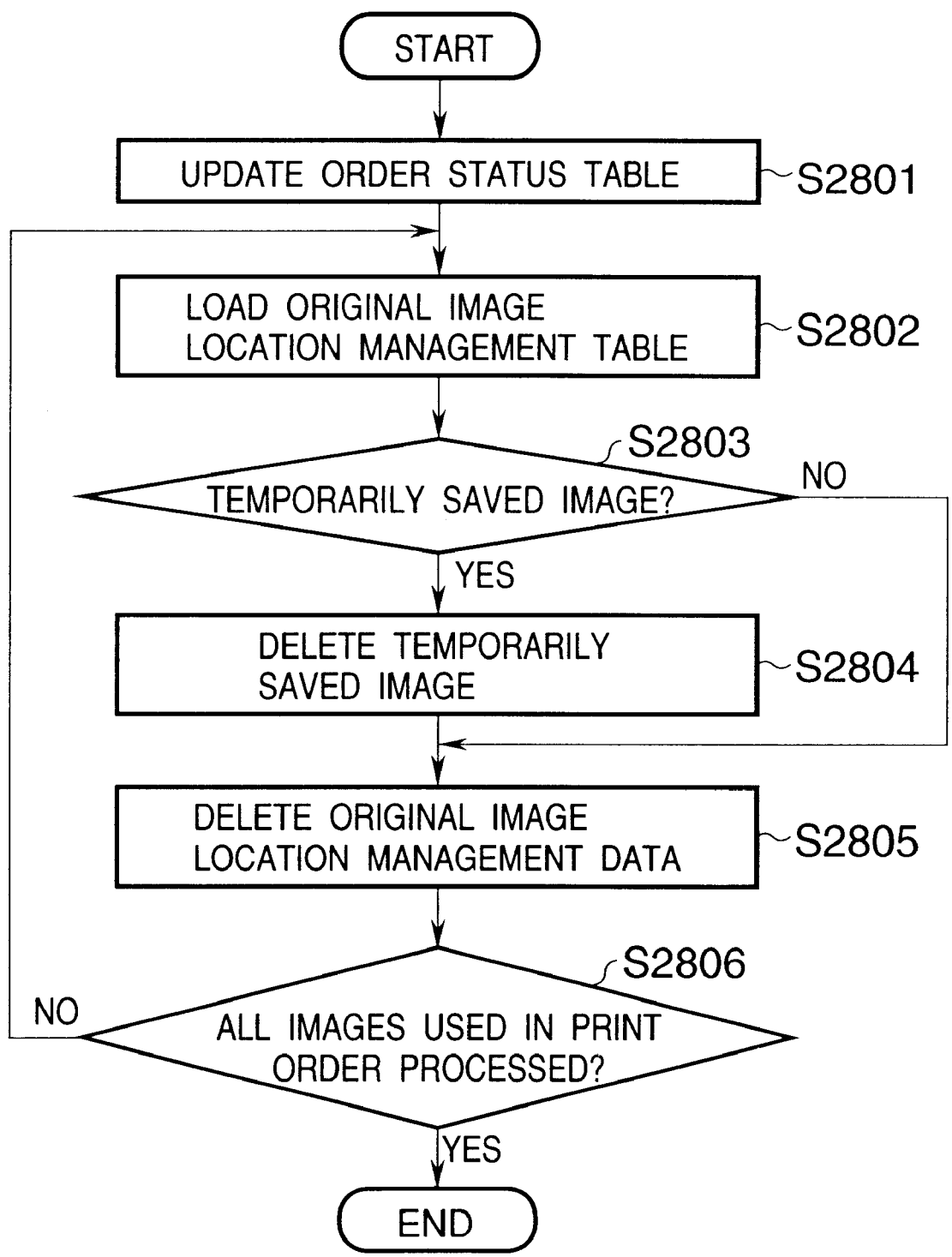
FIG. 28 is a flow chart showing a print completion process in the center server.

FIG. 28 is a flow chart showing the print completion process in the order progress management means 406 of the center server 102.

In step S2801, the order progress management means 406 reads out the print completion message data file based on its file name passed from the center transmission/reception means 407 upon launching, extracts the order ID recorded in that file, and stores the order ID on the RAM 1002. Then, the means 406 searches the order status table 415 based on the order ID to set "printing completed" in the status field 204 of all order status data in which the values in the order ID field 201 match the order ID stored in the RAM 1002, and to write these data back on the order status table. The values in the image ID field 203 of the updated order status data are stored on the RAM 1002.

Steps S2802 to S2805 are repeated for the image IDs stored in step S2801. Note that the image ID of interest of those stored on the RAM 1002 will be expressed by "image ID (i)" in the following description.

In step S2802, the original image location management table 412 is searched based on image ID (i) and the order ID to read out original image location management data in which the value in the image ID field 1201 matches the image ID (i) and the value described in the additional information field 1205 matches the order ID, and to store it on the RAM 1002.

In step S2803, saving location (j) is checked to determine if saving location (j) is the path name representing an image file in the temporary saved image storage device 414. If YES in step S2803, the flow advances to step S2804; otherwise, the flow advances to step S2806. The image that makes the flow advance to step S2806 is the one for which no print image is sent since a print original image is stored in the print server 121.

In step S2804, an image file designated by the path name of saving location (j) is deleted from the temporary saved image storage device 414.

In step S2805, the original image location management data in the original image location management table 412 is deleted.

It is checked in step S2806 if the process is completed for all the image IDs stored in step S2801. If YES in step S2805, the print completion process ends; otherwise, the flow returns to step S2802 to process the next image.

As described above, according to this embodiment, prior to transmission of an image used in printing, an optimal size is determined in correspondence with the characteristics of a printer as the print destination and the print size of the image, thus minimizing the network load and obtaining a high-quality print result.

According to another feature, the number of image data to be sent per print unit can be optimized to further reduce the network load.

According to still another feature, an optimal image size can be determined by an optimal means upon achieving the first object.

According to yet another feature, the generation time can be shortened upon generating an image with an optimal size.

Note that FIG. 1 illustrates only one client computer. However, as can be seen from the above description, a plurality of client computers may be connected. In the above embodiment, the center, image, and print servers are independent ones. However, one server may implement all or at least two of these server functions.

The client computer and various servers in the above embodiment can be basically implemented by versatile information processing apparatuses such as personal computers and the like, although they require hardware for communications, printing, and the like. Hence, the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, a service which allows the user of the client apparatus that submits a print request to visually confirm an image to be printed, and can reduce the information volume with the client apparatus to achieve quick response, and prints a high-quality image with the requested size can be provided.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus which serves as a server connected to a predetermined network, comprising:

image saving means for saving first image data for display, and second image data having a higher resolution than the first image data;

transmission means for sending the first image data to a client via the network in accordance with a request from the client on the network;

reception means for receiving a print request including a print size from the client via the network;

calculation means for calculating a size of print image data, which is to be generated from the second image data corresponding to the first image data, on the basis of the print size included in the print request, when the print request is received;

processing means for processing the second image data to obtain print image data in accordance with the size calculated by said calculation means; and output means for outputting the print image data obtained by said processing means to predetermined print means.

2. The apparatus according to claim 1, wherein another print server connected to the network has the print means, and said output means outputs the print image data to the print server.

3. The apparatus according to claim 1 or 2, wherein another image server connected to the network has said image saving means for the second image data, said calculation means, and said processing means, and said output means includes means for receiving the print image data processed by the image server, and outputs the received print image data to the print means.

4. The apparatus according to claim 3, wherein when the print request from the client refers to an identical print image a plurality of times, a transmission request of print image data having a maximum size of the print images is sent to the image server.

5. The apparatus according to claim 4, wherein the image server has means for saving a plurality of images having different numbers of pixels, and when the print image is generated, an image having the smallest number of pixels which is larger than the number of pixels of the requested image size is retrieved and the print image is generated based on the retrieved image.

6. The apparatus according to claim 1, wherein said calculation means calculates the size of the print image data also with reference to output characteristic information of the print means.

7. The apparatus according to claim 1, further comprising correction means for correcting the size of the print image data, which is calculated by said calculation means, in accordance with a size of the second image data, when the size of the print image data calculated by said calculation means is larger than the size of the second image data based on which the print image data is to be generated.

8. A method of controlling a data communication apparatus which serves as a server connected to a predetermined network, comprising:

the step of saving first image data for display, and second image data having a higher resolution than the first image data in image saving means;

the transmission step of sending the first image data to a client via the network in accordance with a request from the client on the network;

the reception step of receiving a print request including a print size from the client via the network;

the calculation step of calculating a size of print image data, which is to be generated from the second image data corresponding to the first image data, on the basis of the print size included in the print request, when the print request is received;

the processing step of processing the second image data to obtain print image data in accordance with the size calculated in the calculation step; and the output step of outputting the print image data obtained in the processing step to predetermined print means.

9. A storage medium storing a program code that makes a computer, which loads and executes the program code, serve as a server connected to a predetermined network, said medium storing program codes making the computer function as:

image saving means for saving first image data for display, and second image data having a higher resolution than the first image data;

transmission means for sending the first image data to a client via the network in accordance with a request from the client on the network;

reception means for receiving a print request including a print size from the client via the network;

calculation means for calculating a size of print image data, which is to be generated from the second image data corresponding to the first image data, on the basis of the print size included in the print request, when the print request is received;

processing means for processing the second image data to obtain print image data in accordance with the size calculated by said calculation means; and output means for outputting the print image data obtained by said processing means to predetermined print means.

10. An image server which saves high-resolution image data, generates print image data based on the stored image data in accordance with a request from a main server on a network, and sends the print image data to the main server, comprising:

reception means for receiving from the main server information which pertains to request information including a print size requested by a client on the network;

processing means for retrieving image data to be printed from a predetermined storage device on the basis of the received information, and processing the retrieved image data to have the requested size; and transfer means for transferring print image data obtained by said processing means to the main server.

11. A method of controlling an image server which saves high-resolution image data, generates print image data based on the stored image data in accordance with a request from a main server on a network, and sends the print image data to the main server, comprising:

the reception step of receiving from the main server information which pertains to request information including a print size requested by a client on the network;

the processing step of retrieving image data to be printed from a predetermined storage device on the basis of the received information, and processing the retrieved image data to have the requested size; and the transfer step of transferring print image data obtained in the processing step to the main server.

12. A storage medium storing a program code that makes a computer, which loads and executes the program code, serve as an image server which saves high-resolution image data, generates print image data based on the stored image data in accordance with a request from a main server on a network, and sends the print image data to the main server, said medium storing program codes making the computer function as:

reception means for receiving from the main server information which pertains to request information including a print size requested by a client on the network;

processing means for retrieving image data to be printed from a predetermined storage device on the basis of the received information, and processing the retrieved image data to have the requested size; and transfer means for transferring print image data obtained by said processing means to the main server.

13. A system which is built by a center server connected to a network, an image server for storing high-resolution image data, and a print server for printing an image using print means, and prints an image using the center, image, and print servers in accordance with a request from a client on the network, the center server comprising:

saving means for saving display image data having a lower resolution than the image data stored in the image server, means for transferring display image data requested from the client to the client, means for receiving a print request including a print size from the client, means for informing the image server to generate print image data having a print size on the basis of the received print request, and means for receiving print image data sent from the image server, and sending the received print image data to the print server to print;

the image server comprising:

means for retrieving image data requested from the center server from predetermined storage means, and generating print image data having the number of pixels which matches the requested print size, and means for sending the generated print image data to the center server; and said print server comprising:

print means for printing on the basis of the print image data sent from the center server.

\* \* \* \* \*